US008451716B2

(12) United States Patent
MeLampy et al.

(10) Patent No.: US 8,451,716 B2
(45) Date of Patent: *May 28, 2013

(54) SYSTEM AND METHOD FOR ASSISTING IN CONTROLLING REAL-TIME TRANSPORT PROTOCOL FLOW THROUGH MULTIPLE NETWORKS

(75) Inventors: Patrick J. MeLampy, Pepperell, MA (US); Andrew D. Ory, Cambridge, MA (US); Clifford M. Spencer, Lexington, MA (US); Robert F. Penfield, Concord, MA (US); Peter S. Commerford, Belmont, MA (US); Stephen T. Voto, Salem, MA (US); Cynthia E. Arens, Arlington, MA (US); Rebecca A. Pedersen, West Newbury, MA (US)

(73) Assignee: Acme Packet, Inc., Bedford, MA (US)

( * ) Notice: Subject to any disclaimer, the term of this patent is extended or adjusted under 35 U.S.C. 154(b) by 116 days.

This patent is subject to a terminal disclaimer.

(21) Appl. No.: 12/580,403

(22) Filed: Oct. 16, 2009

(65) Prior Publication Data

US 2010/0034200 A1 Feb. 11, 2010

Related U.S. Application Data

(63) Continuation of application No. 11/314,349, filed on Dec. 20, 2005, now Pat. No. 7,620,053, which is a continuation of application No. 09/844,204, filed on Apr. 27, 2001, now Pat. No. 7,072,303.

(60) Provisional application No. 60/254,840, filed on Dec. 11, 2000.

(51) Int. Cl.
*G01R 31/08* (2006.01)
*H04L 12/26* (2006.01)

(52) U.S. Cl.
USPC .......................................... 370/224; 370/252

(58) Field of Classification Search
None
See application file for complete search history.

(56) References Cited

U.S. PATENT DOCUMENTS 5,444,693 A * 8/1995 Arslan et al. .................. 370/221
5,999,518 A 12/1999 Nattkemper et al.
(Continued)

FOREIGN PATENT DOCUMENTS

WO WO9933227 7/1999

OTHER PUBLICATIONS

RFC 3219, Telephony routing over IP, published Jan. 2002.*

(Continued)

*Primary Examiner* — John Blanton
(74) *Attorney, Agent, or Firm* — Thomas|Horstemeyer, LLP

(57) ABSTRACT

Methods and systems for routing call signaling messages are disclosed. One such method is performed in a session router. The method includes: maintaining a telephony route information base (TRIB) stored in the session router as a result of participation of the session router in telephony routing over internet protocol (TRIP). The TRIB allows multiple routes to the same destination. The method further comprises: using the TRIB to route the received call signaling messages to another session router. One such system includes memory and a processor. The processor is configured by instructions retrieved from the memory to: build and maintain, as a result of participation of the router in telephony routing over internet protocol (TRIP), a telephony route information base (TRIB) that allows multiple routes to the same destination; and use the TRIB to route a received call signaling message to another router.

8 Claims, 20 Drawing Sheets

U.S. PATENT DOCUMENTS

| | | | |
|---|---|---|---|
| 6,078,586 A | 6/2000 | Dugan et al. | |
| 6,084,855 A | 7/2000 | Soirinsuo et al. | |
| 6,085,245 A | 7/2000 | Kaycee et al. | |
| 6,307,855 B1 | 10/2001 | Hariguchi | |
| 6,335,927 B1 | 1/2002 | Elliott et al. | |
| 6,538,991 B1 | 3/2003 | Kodialam et al. | |
| 6,584,093 B1 | 6/2003 | Salama et al. | |
| 6,754,181 B1 | 6/2004 | Elliott et al. | |
| 6,765,931 B1 | 7/2004 | Rabenko et al. | |
| 6,775,269 B1 | 8/2004 | Kaczmarczyk et al. | |
| 6,778,531 B1 | 8/2004 | Kodialam et al. | |
| 6,882,643 B1 * | 4/2005 | Mauger et al. | 370/389 |
| 7,092,390 B2 | 8/2006 | Wan | |
| 7,620,053 B2 * | 11/2009 | MeLampy et al. | 370/395.31 |
| 2002/0027915 A1 | 3/2002 | Foti et al. | |
| 2002/0065921 A1 | 5/2002 | Davidson et al. | |
| 2002/0112073 A1 | 8/2002 | MeLampy et al. | |
| 2002/0114282 A1 | 8/2002 | MeLampy et al. | |
| 2002/0137490 A1 | 9/2002 | Gallant | |
| 2002/0169887 A1 | 11/2002 | MeLampy et al. | |
| 2003/0014644 A1 | 1/2003 | Burns et al. | |
| 2004/0223488 A1 | 11/2004 | Roy et al. | |

OTHER PUBLICATIONS

Rosenberg, et al., "A Framework for Telephony Routing Over IP", Internet: www.faqs.org/rfcs/rfc2871.html, Jun. 2000, pp. 1-19.

Rosenberg, et al., "A Border Gateway Protocol 4 (BGP-4)", Internet: www.faqs.org/rfcs/rfc1771.html, Mar. 1995, pp. 1-2.

Rosenberg, et al., "Telephony Routing over IP (TRIP)", Internet: www.faqs.org/rfcs/rfc3219.html, Jan. 2002, pp. 1-79.

* cited by examiner

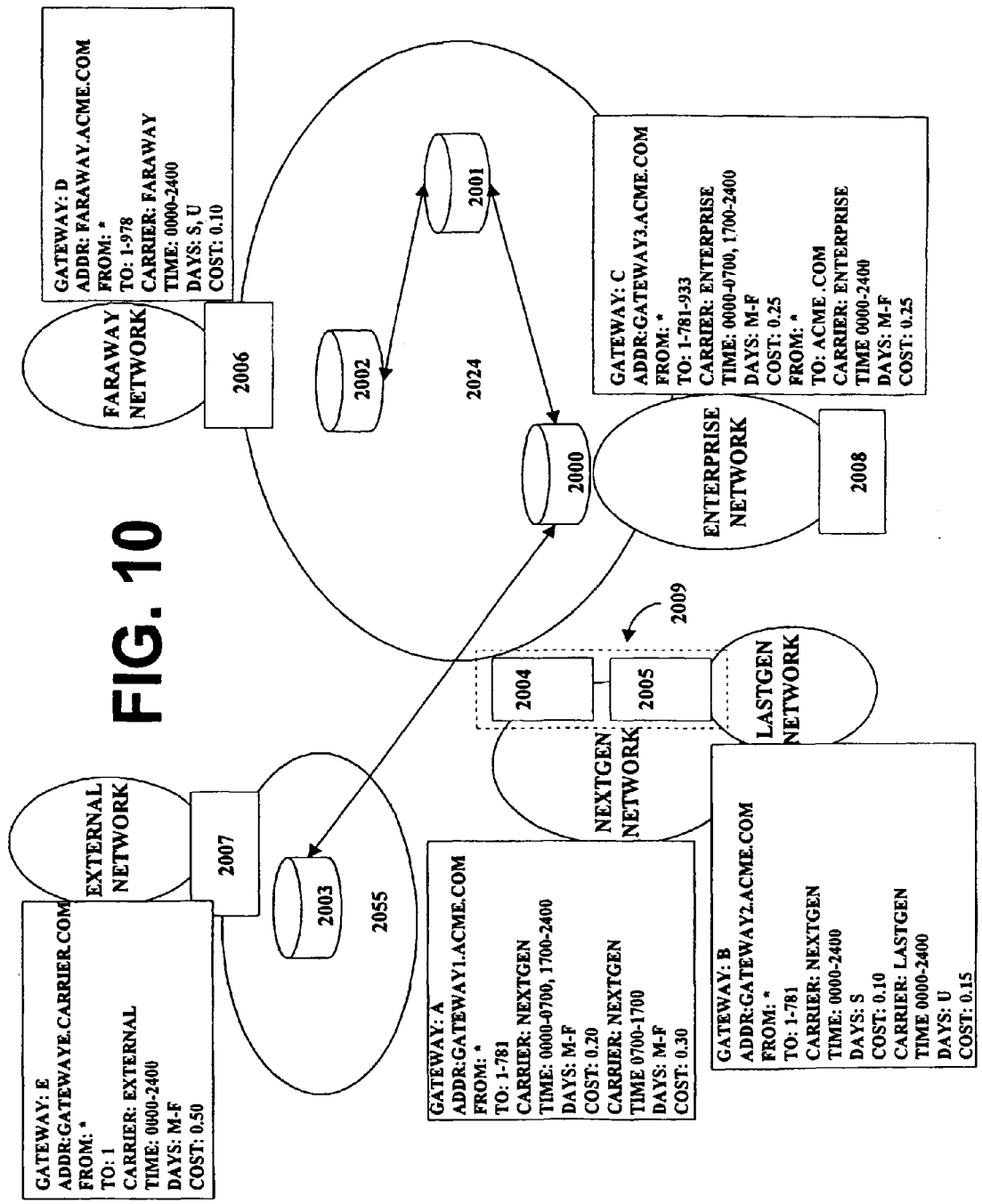

SYSTEM AND METHOD FOR ASSISTING IN CONTROLLING REAL-TIME TRANSPORT PROTOCOL FLOW THROUGH MULTIPLE NETWORKS

CROSS-REFERENCE TO RELATED APPLICATION

This application is a continuation of application Ser. No. 11/314,349, filed Dec. 20, 2005, which is a continuation of application Ser. No. 09/844,204, filed Apr. 27, 2001, now U.S. Pat. No. 7,072,303, which issued Jul. 4, 2006, which claims the benefit of U.S. Provisional Application No. 60/254,840, filed Dec. 11, 2000. Each of these applications is incorporated by reference herein in its entirety.

FIELD OF THE INVENTION

The present invention generally relates to telecommunication networks, and more particularly, is related to a system and method for providing a session router that assists in controlling real-time transport protocol flow through multiple networks.

BACKGROUND OF THE INVENTION

The public switched telephone network (PSTN) has evolved into an efficient real-time, multi-media communication session tool wherein users can pick up any one of nearly one billion telephones and dial any one of nearly one billion endpoints. Several developments have enabled this automated network, such as numbering plans, distributed electronic switching and routing, and networked signaling systems.

Numbering plans have developed over the years under the auspices of local, regional, and national authorities. Currently, based on an ITU-T standard called E.164, these numbering plans provide a generally hierarchical plan that can be used to route calls. The following provides an example of the North American numbering plan (NANP) hierarchy. For telephone number 1-978-933-6166: 1 indicates that the number is part of the NANP; 978 indicates that it is an area code in Massachusetts; 933 indicates that it is an exchange associated with Woburn, Mass.; and 6166 indicates that it is the number assigned to Acme Packet, located on 130 New Boston Street.

In a related manner, every telephone number in the world can be broken down into similar components, and a geographic determination can be made as to which network element (e.g., telephone switch) can terminate the communication. In recent years, portable number technology has been implemented to allow companies to make their numbers mobile in instances where they, for example, moved or relocated. Initially, this technology was directed toward toll-free numbers (e.g., 1-800-FLOWERS™) to permit the owner to change long distance carriers. In the development of portable number technology, the 800 exchange was recognized as a toll-free exchange and translated into a "real" network number that adhered to the fixed hierarchy at a database (i.e., service control point (SCP)). The process of resolving an 800 or toll-free number into a real number (i.e., shadow address) is known.

More recently, there have been further developments to make local numbers portable. The technology is similar to the toll-free technology discussed herein above in that an exchange is declared portable and a database (i.e., SCP) is used to get the location of the "real" address. The location returned is actually the telephone number of a terminating switch. The call is then placed to this phantom number on a signaling system #7 (SS7) network, with the real number carried passively as a separate information element to the endpoint in an initial address message (IAM). Once again, the number used to route the call was a real number that adhered to the fixed hierarchy. This mechanism for local number portability (LNP) is also known.

In wireless networks, a home location register (HLR) and visitor location register (VLR) mechanism is used. It should be noted that within wireless networks a telephone periodically registers on the networks with which it is capable of communicating. This registration informs the network of the location of the telephone so that calls can be appropriately directed to the user. To route calls to telephones that are within a local system (i.e., non-roaming), the equipment is capable of routing the call to/from a correct base station. To route calls between systems, a phantom number is allocated and a new call is directed to the new system, which then connects the telephone to a new endpoint. Within the wireless networks, the allocated phantom number is required to adhere to the established hierarchy.

Unfortunately, the PSTN is not currently capable of routing an actual communication session on anything other than an address that conforms to the hierarchy present in the PSTN since telephone numbers and their parts are used to discover a path to an endpoint of the communication. Portability mechanisms require a phantom or shadow number to direct the communication through the network.

Similar to the manner in which the PSTN is based on a hierarchy, the Internet is based on an Internet Protocol (IP). IP messages are routed or forwarded from one link to the next (i.e., from a source of the data flow to a destination of the data flow). Each IP packet contains an IP address, which, in Internet protocol version 4 (IPv4), has 32 bits. Each IP address also has a certain number of bits dedicated to a network portion and a certain number of bits dedicated to a host portion.

IP routers are used to take a packet from one network (or link) and place it onto another network (or link). Tables are located within IP routers that contain information or criteria used to determine a best way to route a packet. An example of this information may be the state of network links and programmed distance indications. Unfortunately, IP routers typically route packets by destination IP address, which does not assist in finding a proper route for transportation. There are some exceptions to this routing system, however. By using intelligent devices on both sides of a network domain, it is possible to allocate a temporary address to route a packet through a network and restore the original address on the far side of the network when the packet leaves the network. This is the basis for many current virtual private network (VPN) products and is understood in the art.

Another exception to the routing system includes multiprotocol label switching (MPLS). MPLS is based on a technology developed by Cisco Systems, Inc. of San Jose, Calif., called tag switching. This method of routing IP packets allows a destination IP address to potentially be separated from the route that the packet actually takes through a network. One of the best uses of MPLS is to create a VPN or virtual leased lines (VLL). The MPLS tags can effectively encapsulate the routing of data packets through a network.

In summary, it is concluded that data networks base all real forwarding of IP packets on IP destinations. IP destinations, in turn, are associated with network topology and, like the telephone network, are used to deliver packets. MPLS tags and paths can provide override forwarding for IP packets based on a set of rules that is tied to the IP address portion used for routing, such as, for example, a forward equivalence class (FEC).

Distributed electronic switching and routing is important to making networks scale to required sizes. Distributed electronic switching and routing equipment need to have a defined role in a communication session. Networks simply would not scale if every endpoint had to manage a connection to every other endpoint. The distribution of control into a hierarchical scheme further emphasizes difficulty in changing underlying addressing.

To ensure that the network elements (e.g., switches in the telephone network, routers in the data network) can perform their associated tasks, they must know the status of adjacent communication links and available routes; signaling systems are used to provide this information. In telephone networks, signaling systems used are either SS7 or are equivalent to SS7. The signaling system provides information about individual links, link sets, routes, etc. In data networks, protocols such as border gateway protocol (BGP), interior gateway protocol (IGP), open shortest path first (OSPF), etc., are used to determine link states and routes.

In the telephone networks, the signaling system is also used to establish an end-to-end path (i.e., ISDN User Part (ISUP)) through the network. Unfortunately, in IP networks, there is no end-to-end path allocation. Instead, to engage in a communication session, there must be a system to associate endpoints with names or purposes.

Today's telephone networks use yellow pages, white pages, 411 directory systems, and other directory-like services to help users of the network find destinations. As businesses change telephone numbers or people move, the directories are updated. Additionally, most telephone networks will either forward calls or inform callers that the old user of an address has changed to a new address. Similarly, today's data networks use online directories to help users find other Internet users, but these directories are insufficient for many reasons. These reasons include, but are not limited to, the poor quality of information since most of the directories are built up from electronic-mail (e-mail) servers, the directory information is not maintained as part of a billing process, which leads to stale entries in most e-mail systems, and not all e-mail systems provide data to the directory providers.

In addition, Internet directories do not include a geographic location since geographic locations are not part of Internet domain addresses, unless the directory entry is entered manually. When trying to locate a user on a telephone network, the search can be narrowed if the city or town is known, but this type of search is not as easy in Internet directories. Uniform resource locators (URLs) typically define endpoints or locations on the Internet. A user name followed by a domain name is the current method to address users, wherein the domain name is owned by an entity that allows the user to employ it.

There are currently no known universal registries on the Internet. A universal registry with the domain name E164.com has been proposed by NetNumber.com, Inc. of Lowell, Mass. This universal registry development is based on a proposal by NueStar, Inc., which is now responsible for administering the NANP. This proposal calls for using the current domain name service (DNS) and formatting the numbers into URLs in a way that can be resolved using DNS servers. In this manner, each telephone number could be registered into a DNS server and distributed to all other DNS servers. The tail end of a DNS query could be a resource record, which points to a lightweight directory access protocol (LDAP) directory server.

The suggestion from the ITU to use Universal Portable Telephone (UPT) numbers for IP endpoints to avoid overlapping traditional wired telephone numbers is valid and would allow for addressable IP endpoints. It is possible to combine the above two proposals to enable Internet calling to and from the PSTN. Unfortunately, there are several limitations to this technology. These limitations include the following: DNS distribution and replication has significant latency; DNS address resolution can be slow; DNS servers may not be capable of handling the number of projected addresses; DNS servers are incapable of managing duplicate entries (except through round robin techniques); DNS employs parallel update mechanisms, which may result in unintentional duplicate entries; private network addresses or addressing gateways may result in duplicate entries or matches; no policy exists to handle the management of the resources requested; and, no solution exists to handle the number overlap between the PSTN and the data networks.

Due to most current telecommunication endpoints receiving service through a PSTN-based system, a gateway is used to facilitate a media flow between a packet data network and a PSTN. Gateways are installed at edges between data networks and voice networks, wherein the gateways are used to convert media (and signaling) to ensure communication. There are several strategies for routing calls received by gateways to other gateways described in the art. Two of these strategies are full mesh routing and hierarchical routing. Full mesh routing is the standard method described in most of the softswitching architectures. Session initiation protocol (SIP) is the inter-softswitch signaling system because it supports an anywhere-to-anywhere signaling model. In this model, all softswitches have a virtual connection to all other softswitches for completing calls. Routing tables are instantiated that can be used to direct traffic to a softswitch based on policy provided by the softswitch maker.

Unfortunately, when running a network that consists of many softswitches, the owner of the network has many different points of policy management that need to be maintained to create a full mesh. Such policy management issues include assuring that each softswitch "knows the IP address of each other softswitch and what telephone numbers or PSTN to which they connect." When running softswitches from multiple vendors, further management issues arise. The management issues are then more complicated due to the fact that the equipment may be managed through different interfaces.

When the number of softswitches deployed grows large, the sharing of different routes is likely. In the full mesh routing arrangement, the routing of calls may be difficult since several different egress softswitches may be full or not functioning. For example, if a carrier has 30 softswitches that can handle national long distance, and the network is running at about 50% full, then each originating softswitch will likely have to try an average of 15 separate softswitches before finding one with a non-blocked route. This search effort can be greatly reduced if a pure random distribution is implemented; however, it is assumed that some routes would be preferred over others due to cost or quality, thereby exacerbating the problem.

Certain simple gateways, such as, but not limited to, the Cisco AS5300, can forward SIP-based call requests to a SIP proxy server. Unfortunately, these gateways have low densities and frequently lack the sophistication of softswitches in setting up routing policies. These routers, therefore, cannot be interconnected to create networks without a softswitch controller.

In hierarchical routing, networks are segmented into different layers. The layers are interconnected into a pyramid to enable anywhere-to-anywhere routing. This method is the basis of the current PSTN. The hierarchical routing method uses a tiered model wherein the number of tiers in the hierarchy depends on the size of the network. The Internet today does not conform to a hierarchy. In fact, much of the Internet could be described as a full mesh, with many possible routes going from one place to another. One of the principal design goals of BGP is to avoid multiple circuitous routes, which indicate just how many different interconnections exist.

The hierarchical approach to networks was fairly standard in the PSTN, based on the local, national long distance, and international telephone networks; the business and political boundaries helped enforce this hierarchical model. Initial deployments of Voice over Internet Protocol (VoIP) that were based on the standard H.323 protocol drifted towards a hierarchical model when deployed en-mass.

Unfortunately, the hierarchical model can be complex when trying to apply it to today's peering environment. While the higher levels of the hierarchy are owned by some entity, from a business or political environment, it is hard to imagine how ownership and peering issues can be resolved since the data networks do not adhere to a hierarchy. Because the data network owners are competing for the same business, it is unlikely that peering arrangements, which are not mutually beneficial, can be established. The hierarchical model also creates single points of failure that can lead to larger ripple effects. The public data network (PDN) has evolved with no single points of failure, and largely subscribes to a distributed peer arrangement. Given this, single softswitches, which could affect large pieces of a network, are ill advised.

The hierarchical model also uses careful route configuration at every point in the hierarchy (i.e., no two softswitches can have the same configuration and no two softswitches can predict the route that a particular communication will traverse). A hierarchical routing system therefore uses a distributed route plan in an incredibly coordinated manner. Finally, the hierarchical model has all vendors adhere to similar signaling systems to ensure proper routing, end-to-end. For example, to enable proper routing, each softswitch would have to share information about circuit availability to ensure proper route-around functionality as the network becomes full. Since there are currently no standards for accomplishing this, vendors have been building proprietary methods, and these proprietary methods may not interoperate correctly.

BRIEF DESCRIPTION OF THE DRAWINGS

The invention can be better understood with reference to the following drawings. The components of the drawings are not necessarily to scale, emphasis instead being placed upon clearly illustrating the principles of the present invention. Moreover, in the drawings, like referenced numerals designate corresponding parts throughout the several views.

FIG. 10 is a block diagram that provides an example of an ITAD topology comprising session routers such as those illustrated by FIGS. 1 and 4.

DETAILED DESCRIPTION OF THE PREFERRED EMBODIMENT

The present invention provides a controlling system for assisting in controlling real-time transport protocol flow through multiple networks. The controlling system of the present invention can be implemented in software, firmware, hardware, or a combination thereof. In the preferred embodiment of the invention, which is intended to be a non-limiting example, a portion of the controlling system is implemented in software that is executed by a computer, for example, but not limited to, a personal computer, workstation, minicomputer, or mainframe computer.

The software portion of the controlling system, which comprises an ordered listing of executable instructions for implementing logical functions, can be embodied in any computer-readable medium for use by, or in connection with, an instruction execution system, apparatus, or device such as a computer-based system processor-containing system, or other system that can fetch the instructions from the instruction execution system, apparatus, or device and execute the instructions. In the context of this document, a "computer-readable medium" can be any means that can contain, store, communicate or transport the program for use by or in connection with the instruction execution system, apparatus or device. The computer-readable medium can comprise any one of many physical media such as, for example, but not limited to, electronic, magnetic, optical, electromagnetic, infrared, or semiconductor media. More specific examples (a non-exhaustive list) of the computer-readable medium would include the following: a portable computer diskette (magnetic), a random access memory (RAM) (magnetic), a read-only memory (ROM) (magnetic), an erasable programmable read-only memory (EPROM or Flash memory) (magnetic), and a portable compact disk read-only memory (CD ROM) (optical).

Figure 1:
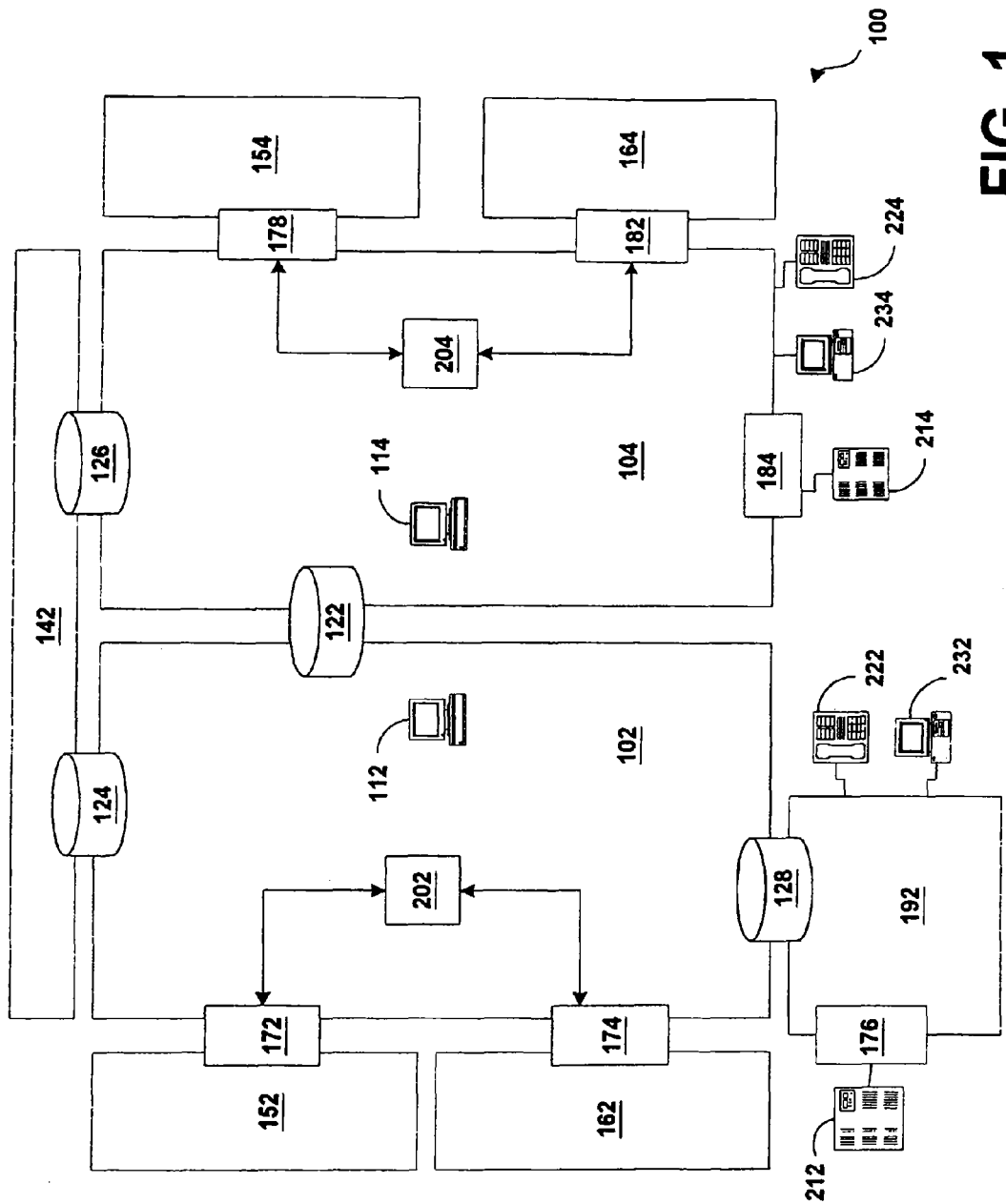
FIG. 1 is a block diagram that illustrates a multiple domain communication network, in accordance with the preferred embodiment of the invention.

FIG. 1 is a block diagram illustrating a multiple domain communication network 100, in accordance with the preferred embodiment of the invention. In essence, FIG. 1 is representative of many of the typical types of internetworking used to make voice over Internet protocol (VoIP) deployments feasible and scalable. A first and a second autonomous system (AS) 102, 104 are illustrated and are connected by a first session router 122. As known in the art, an autonomous system is a set of routers under a single technical administration, using an interior gateway protocol and common metrics to route packets within the AS, and using an exterior gateway protocol to route packets to other ASs. ASs are typically a set of border gateway protocol-4 (BGP4) routers grouped by a common administrative authority. It should be noted, however, that the ASs may instead be Internet telephony administrative domains (ITADs). ITADs are similar to BGP-4 ASs, however, they are used to denote a group of telephony routing over Internet Protocol (TRIP) routers (further described herein below) sharing a common administrative entity for the purposes of session routing. Hereinafter, reference shall be made to the presence of ITADs 102 and 104, instead of ASs 102 and 104 respectively; however, it should be noted that references to ITADs are interchangeable with ASs.

A first management station 112 is located within the first ITAD 102, and a second management station 114 is located within the second ITAD 104. The management stations 112, 114 provide provisioning, monitoring, and diagnostics for session routers within each respective ITAD 102, 104. The management stations 112, 114 preferably run a Java virtual machine and receive a Java application from a session router. The Java application communicates by formulating requests and processing responses that are XML-formatted.

An IP carrier 142 is connected to the first ITAD 102 via a second session router 124. The IP carrier 142 is also connected to the second ITAD 104 via a third session router 126. It should be noted that the first session router 122 provides a peering relationship between the first ITAD 102 and the second ITAD 104. Further, the second session router 124 provides a peering relationship between the first ITAD 102 and the IP carrier 142, and the third session router 126 provides a peering relationship between the second ITAD 104 and the IP carrier 142.

A first long distance carrier 152 is connected to the first ITAD 102 via a first gateway 172. Long distance carriers provided herein preferably use a PSTN system, wherein the telephone system is based on copper wires carrying analog voice data. Alternatively, the long distance carrier may also provide digital data or a combination of analog and digital data. Further, gateways provided herein preferably provide both media and signaling gateway support between PSTN-based networks and packet-based data networks. A first incumbent local exchange carrier 162 is also connected to the first ITAD 102 via a second gateway 174. A first soft-switch, or call agent, 202, located within the first ITAD 102, is connected to both the first long distance carrier 152 and the first incumbent local exchange carrier 162, via the first and second gateways 172, 174, respectively. Soft-switches provided herein control the gateways through a media gateway communication protocol (MGCP), or an equivalent protocol. Alternatively, an intelligent gateway may not need a soft-switch, but instead, may directly communicate with an ITAD by creating session initiation protocol (SIP) based telephone calls without the use of a soft-switch.

SIP is a protocol that has a number of key mechanisms defined. A first SIP mechanism is called a "register" message. When sent to a SIP proxy server, this message indicates that the endpoint is capable of receiving a communication for a specific user. This "register" message binds the physical IP address to the user using the IP address. A second SIP mechanism is the "invite" message. This message is sent to another endpoint to request a communication session. The "invite" message is sent all the way to the endpoint of the receiver of the communication. The receiver of the "invite" will then respond with an OK message indicating that the communication is accepted. When there are more than a few endpoints, or when there are endpoints that require certain features, a SIP proxy server acts as a go-between. The SIP proxy server receives and forwards the "invite" messages that are received for its users that have previously sent a "register" message.

Figure 2:
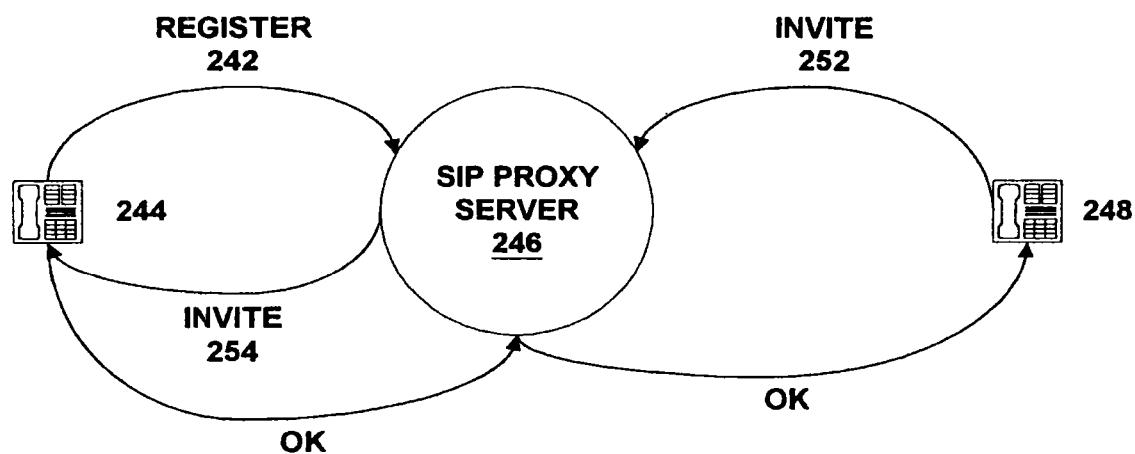
FIG. 2 is a block diagram that illustrates interaction by the SIP protocol.

FIG. 2 provides a detailed illustration of interaction between two SIP agents via a SIP proxy. For example, if a user sends a "register" message 242 from a first SIP user agent 244, a SIP proxy server 246 acknowledges the registration. Then, if a second SIP user agent 248 sends an first "invite" message 252 for the user that transmitted the "register" message" 242, the first "invite" message 252 is received by the SIP proxy server 246. The SIP proxy server 246 then transfers a second "invite" message 254 to the first SIP user agent 244. If the first SIP user agent 244 is willing to accept communication from the second SIP user agent 248, the first SIP user agent 244 transmits a message of approval to the SIP proxy server 246 which is then transmitted to the second SIP user agent 248.

A third SIP mechanism is the "bye" message, which unilaterally sends a communication session, and frees all of the network resources in use. Either side of a communication can send a "bye" message at any time. One notion embodied in the SIP architecture is that the user has mobility wherein the user can send a "register" message from any IP address or location to his home SIP proxy server and begin receiving communications. A detailed description of SIP is provided in "SIP: Session Initiation Protocol," by Handley et al., which is an Internet draft having draft number rfc2543, dated March 1999, the disclosure of which is incorporated herein by reference. Further discussion of the SIP protocol is provided herein below.

Returning to FIG. 1, an enterprise network 192 is connected to the first ITAD via a fourth session router 128. The enterprise network 192 comprises a third gateway 176 that provides connectivity to a first private branch exchange (PBX) 212. As known to those skilled in the art, users of a PBX share a certain number of outside lines for making telephone calls external to the PBX. A SIP phone 222, such as those produced by Pingtel of Massachusetts, and a SIP user agent 232 (i.e., a computer), such as those produced by Dynamicsoft of New Jersey, U.S.A., may be located within the enterprise network 192 that are connected to the first ITAD via the fourth session router 128.

A second long distance carrier 154 is connected to the second ITAD 104 via a fourth gateway 178. In addition, a second incumbent local exchange carrier 164 is connected to the second ITAD 104 via a fifth gateway 182. A second soft-switch, or call agent, 204 located within the second ITAD 104, is connected to both the second long distance carrier 154, and the second incumbent local exchange carrier 164 via the fourth and fifth gateways 178, 182, respectively. As with reference to the first ITAD 102, an intelligent gateway may not require a soft-switch, but instead, may directly communicate with an ITAD by creating SIP-based telephone calls without the use of a soft-switch.

A second PBX 214 may be connected to the second ITAD 104 via a sixth gateway 184. In addition, a second SIP user agent 234 and a second SIP phone 224 may be connected to the second ITAD 104. It should be noted that the number of session routers, IP carriers, long distance carriers, incumbent local exchange carriers, enterprise networks, PBXs, SIP phones, SIP user agents, ITADs, management stations and gateways are not intended to be limited in number or relationship based upon FIG. 1. Instead, any number of the previously mentioned devices may be used. In fact, certain of the devices may be excluded, yet still fall within the category of a multiple domain communication network.

Each session router 122, 124, 126, 128, utilizes several protocols. These protocols include, but are not limited to, SIP (introduced herein above and further discussed herein below), session description protocol (SDP), user/universal datagram protocol (UDP), and telephony routing over Internet protocol (TRIP). SDP is used to describe session endpoints and resources in use by the endpoints. Therefore, SDP is a flexible way to interact with media endpoints in an open manner. UDP is used to transport SIP messages from one signaling point to another, including SIP user agents and SIP proxy servers.

Currently, TRIP is in Internet draft form. The proposal of TRIP is to use a protocol similar to BGP-4 to share information about reachable telephone destinations across domains based upon policies. Furthermore, the proposal describes an internal system of routing information sharing within a domain. Like BGP-4, the protocol supports route aggregation and propagation (i.e., flooding) between participating entities. These features create a scalable solution for telephone number routing TRIP was designed to help the originators of telephone calls on an IP network find a gateway to the PSTN. Additionally, the protocol helps calls that ingress into a data network, find an optimal egress gateway based on a particular policy.

TRIP has several attributes that can be briefly described, as follows. A first attribute of TRIP is route advertisement. Each TRIP server can be provisioned with supported routes, wherein these supported routes can be advertised to each adjacent neighbor as part of a TRIP "update" message. A second attribute of TRIP is route aggregation. Specifically, when the routes are advertised to adjacencies that are from different networks, the collection of input routes can be aggregated to simplify the information transfer to neighbors. A third attribute of TRIP is policy at the borders. Since each router can have a programmable set of routes that are advertised, and since each border router can be programmed to accept or decline routes that are received, a complete policy management system is provided.

Unfortunately, TRIP currently does not support the following: routing by to-from (i.e., origination-destination) pairs; routing by requested carrier; routing by time of day/day of week; resolution of DNS/ENUM destinations, wherein ENUM refers to the use of an E.164 number (the international telephone numbering plan), in reverse, with domain notation (i.e., dotted); and routing based on current endpoint capacity. TRIP also fails to specify how the TRIP information should be used to route SIP messages from one location to another. Therefore, the implementation of systems to use the sent/received information via TRIP is not disclosed publicly.

The use of TRIP in accordance with the preferred embodiment of the invention addresses these mentioned shortcomings of TRIP. In fact, the preferred embodiment of the invention utilizes a form of TRIP that advertises the availability of network routes for ranges including E.164 style numbering, Internet style addresses of endpoints (URI), and traditional telephone addresses (SIP and non-SIP). As mentioned herein below, best routes to endpoints are selected based upon cost, time of day, and quality of service. In addition, routing by to-from (i.e., origination-destination) pairs and routing by requested carrier are provided. The preferred embodiment of the invention also provides the ability to set a future date at which time a policy is advertised or withdrawn.

For a session router to route SIP invitations to a correct location, a telephone routing information base (TRIB) is established at each forwarding point, or, in accordance with the preferred embodiment of the invention, at each session router. The TRIB contains a set of policies that are examined upon receipt of a SIP invitation to select a set of potential rules. In accordance with the preferred embodiment of the invention, a policy comprises one or more origin addresses sharing one or more destination addresses, a common next hop, and one or more carriers.

Figure 3A:
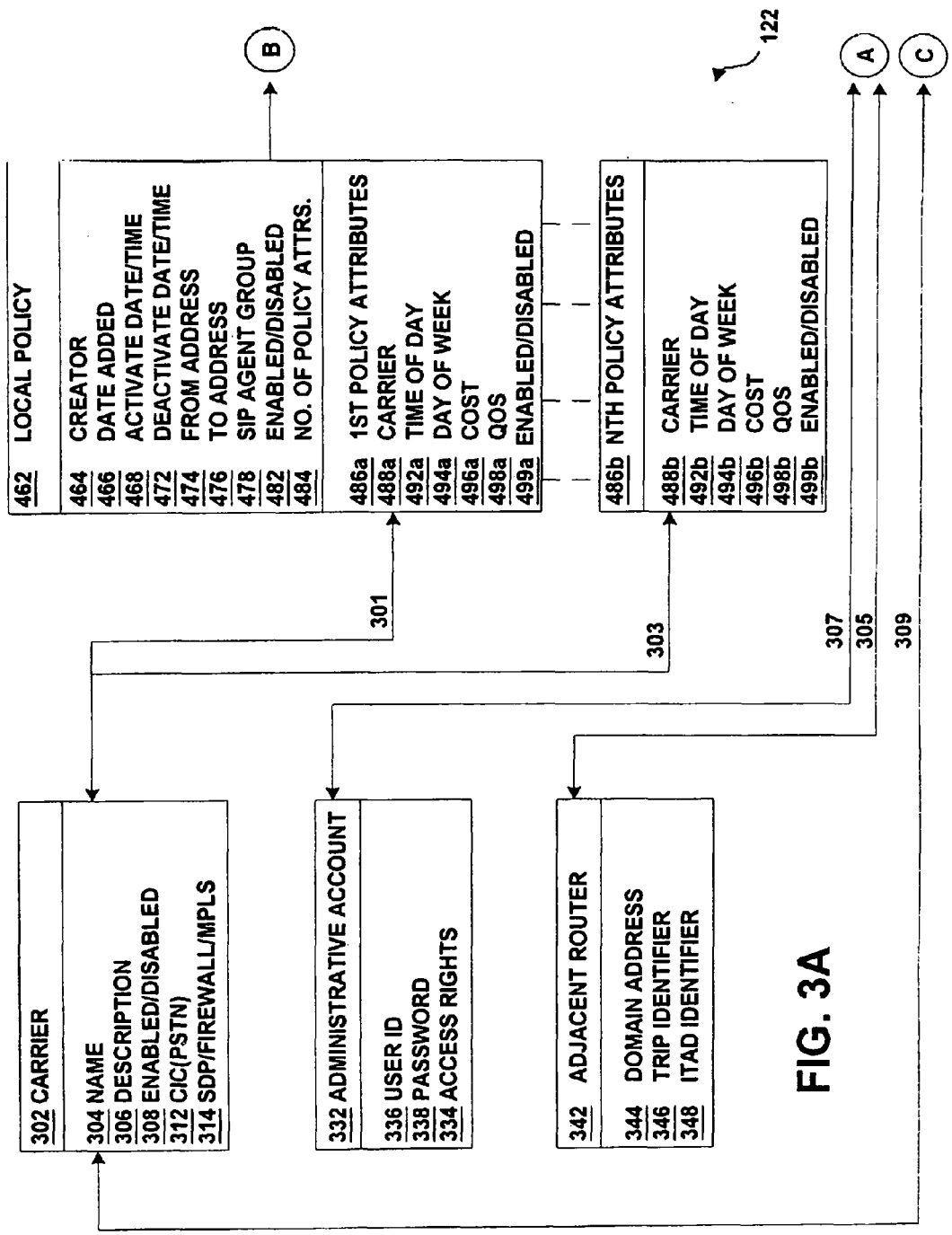
FIG. 3A is a block diagram of a data map that shows policies stored on a session router located within the network of FIG. 1.
Figure 3B:
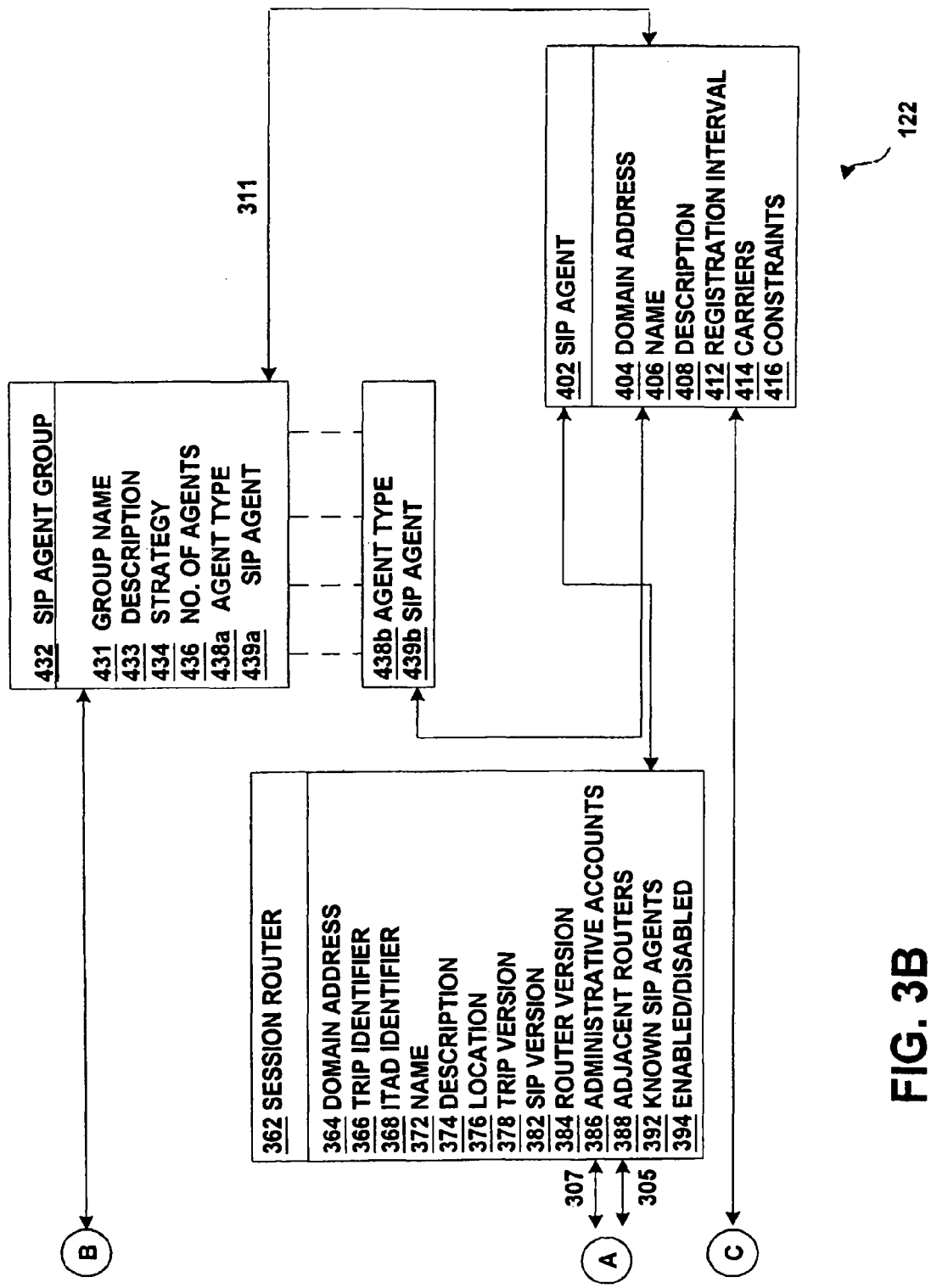
FIG. 3B is a block diagram continuing the data map illustrated by FIG. 3A.

To compute a TRIB, local policies need to be defined and established. FIGS. 3A and 3B illustrate a data map that shows policies stored on a session router, in accordance with the preferred embodiment of the invention. As shown by FIGS. 3A and 3B, the policy comprises the following data objects: carrier 302; administrative account 332; adjacent router 342; session router 362; SIP agent 402; SIP agent group 432; and local policy 462.

The carrier data object 302 is a configured entity used to organize and manage relationships with upstream and downstream networks. Each carrier is given a name 304 for references in other data objects. As an example, line 301 and line 303 illustrate how the carrier name 304 is used within the local policy 462 definition. A carrier description 306 is used to provide demographic or descriptive information about the carrier. An enabled/disabled 308 flag is used to disable or enable a carrier and all of its associated policy attributes 486 in a single place. This functionality is useful for managing carrier contracts. A carrier indicator code (CIC) (PSTN) 312 defines a string of digits used by the PSTN to uniquely identify carriers in the numbering plan in use. As an example, in North America, the CICs are determined and allocated by the NANP authority (e.g., AT&T Corp. has a CIC of 1010288). A SDP/firewall/MPLS 314 field contains SDP formatting instructions for use at either network boundaries or for originating sources.

The administrative account data object 332 is used to define administrative abilities for users that are trying to modify or configure an SR. Each administrative user can have different access rights 334. In accordance with the preferred embodiment of the invention, access rights 334 are determined when an administrator accesses and authenticates himself through a management station 112, 114 (FIG. 1), otherwise referred to as an interface. In accordance with the preferred embodiment of the invention, the administrator administers and maintains the current router. A userID 336 is used in combination with a password 338 to authenticate the administrator. It is also possible to use radius authentication as is known in the art. Line 307 references a list of accounts contained as part of a session router (identified by the SR data object 362) configuration; each session router 362 has one or more of the administrative accounts 332 Table 1, provided below, identifies different types of access rights that may be part of an SR.

TABLE 1

| Access Rights | Description |
|---|---|
| Parental | This right provides the ability to create new administrative accounts with the same or more limited set of access rights. |
| Super User | This right provides the ability to access and change anything. This is the highest (i.e., most permissive) access right level. |
| Shell | This right provides the ability to access an SR operating system directly for diagnostic and debugging. |
| View Carriers | This right provides the ability to access carrier configurations. |
| Update Carriers | This right provides the ability to add, delete, or modify carrier configurations. |
| Adjacent Router | This right provides the ability to add, delete, or modify adjacent router configurations. |
| View Policies | This right provides the ability to view and check any existing policies. |
| Update Policies | This right provides the ability to add, delete, or modify any established local policies. |
| Session Router | This right provides the ability to configure this SR. |
| Agent Groups | This right provides the ability to configure adjacent SIP Agents. |
| PIB | This right provides the ability to view and modify adjacent ITADs and their associated Inbound and Outbound Policy Screens. |

The adjacent router data object 342 describes SRs that are adjacent to the present SRs. This object is used to describe every SR's TRIP peer, which includes both internal peers (i.e., within the same ITAD 112, 114) and external peers. A domain address 344 field signifies the address (either a domain name or dotted IP address) to which a TCP/IP connection needs to be established for exchanging TRIP data. A TRIP identifier 346 field is also used within the adjacent router data object 342, which is a locally assigned SR number within the same ITAD 112, 114. Any integer value can be used as the TRIP identifier 346; however, the TRIP identifier 346 is preferably a four-octet unsigned integer. An ITAD identifier 348 is provided within the adjacent router data object 342, which is preferably an integer.

The SR data object 362 describes a configuration for a specific SR, namely, the present SR, wherein each SR preferably has only one SR data object 362. A domain address field 364 stores the address from which the present SR is operating. Preferably, each SR listens on port 6069 for TRIP connections on the domain address. Further, the domain address 364 is used for sending and receiving SIP messages on a recommended SIP port, preferably, port 5060. A TRIP identifier 366 is an integer assigned to the present SR, which is unique within the same ITAD 112, 114. An ITAD identifier 368 is provided within the SR data object 362 providing an integer for identification purposes. A name 372 field, provided within the SR data object 362, contains a text name given to the current SR. The management stations 112, 114 use the text name 372 for presentation purposes.

A description field 374 is used to further describe the SR and can contain any text related to the SR. A location field 376 is a geographic (latitude and longitude) configuration used to properly locate the SR from the management stations 112, 114. A TRIP version field 378 is the current TRIP protocol version supported by the SR. A SIP version 382 field refers to the current SIP version supported by the SR. A router version 384 refers to the installed software version for the servers and clients that make up an SR. An administrative accounts 386 field provides an array of administrative accounts that have access to the current SR as shown by line 307. An adjacent routers 388 field provides an array of adjacent routers 342 that have a configured adjacency to the current SR, as illustrated by line 305. A known SIP agents 392 field provides an array of SIP agents that are known to the current SR. It should be noted that any SIP agent that is to be communicated with is to be on this list, since this list is used to provide for such communication. An enabled/disabled 394 field provides a flag that indicates whether or not the current SR should be active and interactive, or passive and non-interactive with its peers, including, for example, SIP agents 402, and adjacent routers 388.

A SIP agent data object 402, provided within the SR, describes a specific SIP endpoint, such as, but not limited to, a SIP phone or a SIP user agent. Preferably, the SIP endpoint is a proxy server. Proxy servers can be either stateful or stateless. When stateful, a proxy remembers the incoming request that generated outgoing requests, and the outgoing requests. A stateless proxy forgets all information once an outgoing request is generated. As an example, a forking proxy should be stateful and proxies that accept TCP connections should be stateful. The SIP endpoint may also be a user agent. A domain address 404 field provides the Internet address of the SIP endpoint. A name 406 field provides a text name for the SIP endpoint and is used for administrative purposes. A description 408 field within the SIP agent data object 402 provides additional demographic information regarding the SIP endpoint. A registration interval 412 field is the expected registration interval for SIP agents that are registering with the SR. Exceeding this interval preferably results in the SR considering the SIP endpoint to be out of service. Therefore, for every SIP agent 402 configured with a non-zero registration interval 412, the endpoint will be considered available for traffic if a "register" message, is received within the interval defined by the registration interval 412 field. For endpoints that have an interval set to zero, no registration is expected or required.

A carriers 414 field is located within the SIP agent data object 402, which provides an array of carrier name(s) 304, as illustrated by line 309. The list of carrier names is optionally used to provide one or more carrier associations with inbound traffic from the SIP endpoint. The carrier associations, when compared to carrier attributes of outbound routes, can be used to provide a routing policy, as illustrated herein below. The carrier associations can also be used to seed specific CICs 312 with inbound sessions that otherwise would not have one. In cases where the inbound sessions require a CIC to be routed correctly, the first carrier in the array defined by the carriers 414 field is used to provide a CIC. A constraints 416 field contains a definition of any known constraints for the present agent. Preferably, each agent has at least one constraint defined. Table 2, provided herein below, provides examples of constraints. It should be noted, however, that other constraints may also be considered.

TABLE 2

| Constraint Examples | |
|---|---|
| Constraint | Description |
| Outbound Sessions = 24 | This constraint indicates that the agent is capable of handling only 24 outbound simultaneous sessions. |
| Sessions = 24 | This constraint indicates that the agent is capable of handling only 24 inbound or outbound sessions. |

TABLE 2-continued

Constraint Examples

| Constraint | Description |
| --- | --- |
| Maximum Burst = 5 | This constraint indicates that if the number of sessions placed through a particular SIP Agent exceeds a rate that exceeds the burst interval, which is fairly short (possibly 30 seconds or less), the request should be rejected. |
| Maximum Sustained Rate = 160 | This constraint is used to limit the maximum sustained rate of sessions through a particular SIP Agent over the sustained rate interval, which is 10 or more times greater than the burst interval (usually five minutes). |

A SIP agent group 432 data object is also provided within the SR, which defines a collection of one or more SIP agent(s) 402. The SIP agent group 432 data object provides a means of grouping and specifying strategies for using SIP agent(s), as identified by a group name 431 and a description 433. A strategy field 434, located within the SIP agent group 432 data object, defines the method of selection of SIP agent(s) 402 when routing communication requests. The strategy field is applicable when there are two or more members in the SIP agent group. Table 3, provided herein below, provides examples of strategies for selecting SIP agents to which to route.

TABLE 3

Strategy Examples

| Strategy | Description |
| --- | --- |
| Hunt | The hunt strategy selects agents in the order in which they are listed. As an example, if the first agent is online, working, and has not exceeded any of the defined constraints, then all traffic will be sent to the first agent; if the first agent is offline or if it exceeds any defined constraint, the second agent is selected; if the first and second agents are offline or exceed any defined constraints, the third agent is selected; etc. |
| Round Robin | The round robin strategy selects each agent in order, distributing the selection of each agent evenly over time. |
| Least Busy | The least busy strategy selects the agent that has the fewest number of sessions relative to the constraint. |
| Proportional Distribution | The proportional distribution strategy is based on programmed, constrained session limits, and proportionally distributes traffic. |
| Lowest Sustained Rate | The lowest sustained rate strategy is based on observed sustained session request rates, and routes to the SIP agent with the lowest sustained rate of session initiations/invitations. |

Returning to the SIP agent group 432 data object, a number of agents field 436 defines the number of members in the SIP agent group. Preferably, although not necessarily, the minimum field value is 1. If the minimum field value is zero (0) the group is deemed empty and meaningless. An agent type field 438*a*, 438*b* describes whether the agent is a SIP agent or a SIP agent group. Acceptable values for the agent type field may be group or agent. The SIP agent group 432 can contain another agent group within its agent list. This nesting of groups permits a scaleable arrangement, where SIP agents can be clustered, and clusters can be clustered, etc. A SIP agent 439*a*, 439*b* field defines a pointer to another SIP agent group or an actual SIP agent configuration, illustrated as line 311. This referential manner of accessing configured SIP agents allows for flexible configuration. A single SIP agent can be in several SIP agent groups and, when any aspect of the SIP agent changes (e.g., its domain address 404), all group references are updated simultaneously. This mechanism is memory-efficient and avoids duplication.

The local policy data object 462 describes policies used by the present SR. Policies are added and removed using the management station 112, 114. A creator field 464 contains the name of an administrator, otherwise referred to as the user ID 336. The creator field 464 is not a pointer or reference, since administrators may be removed from the system, but the instantiated policies may continue to be used. A date added field 466 describes the actual date that the policy was added to the SR. An activate date/time field 468 contains the exact date and time that the policy is to be enabled, which is also shared with peers. This permits the creation of policies that are not currently effective. A deactivate date/time field 472 defines the exact date and time that this policy needs to be withdrawn and removed from the network.

A from address field 474 describes a partial origination address, such as, but not limited to, a uniform/universal resource identifier (URI), which, in TRIP, is a partial telephone number. The from address 474 may also be any valid network address. By instantiating and permitting policies that are not just telephone numbers, this present invention provides substantial improvements over the present version of TRIP, as described herein below.

The from address field 474 is an attribute associated with the "update" message that is optional. When a from address attribute is not in an "update" message, then the policy is for "any originations," but when there is a from address attribute present, the policy or route will only apply to those communications with a complete partial match described above. The address attribute comprises an address family field, an application protocol field, a length field, and a from address field. The address family field provides the type of address for the originating address attribute. An example of two standard address families includes plain old telephone service (POTS) numbers and routing numbers. To support Internet-style from (i.e., origination) addresses, address family code 254 has been added for addresses that are partial domain addresses (referred to as URI).

The partial domain address preferably does not contain usernames (i.e.: do not have the form username@sr.acmepacket.com). Sr.acmepacket.com is a valid address. Furthermore, the address also preferably does not contain raw IP addresses such as, 192.168.0.1.

The application protocol field provides the protocol for which the from address 474 is provided. Examples of protocols include, but are not limited to, SIP, and H.323-H.225.0-Q.931. Since this preferred embodiment of the invention is focused primarily on SIP-based signaling systems, the application protocol is set at SIP. The length field contains the length of the from address field, preferably, in bytes. The from address field contains the address that the policy or route that is being updated will use as a partial or full from address.

A to address 476 field is a partial address indicating a destination for a particular policy. The address is also permitted to be either a telephone number or any other valid URI. The from address 474-to address 476 combinations are used for selecting valid policies. Preferably, to provide wildcard-like entries, an empty from address field 474 or to address field 476 is specified by either " ", NULL, "*", or any other commonly understood way of indicating an empty field.

When matching addresses with the originating and destination address in policies, the best and longest match is sought. If the address is a telephone number, digits are matched from left to right; the session address and the address in the policy should match the left-most digits. The telephone address with the most digits matched is the longest and best. If, instead, the address is a domain address, whole words (separated by dots) in the host name are matched from right to left.

A SIP agent group field 478, located within the local policy data object 462, describes the SIP agent that is the next hop server for the present policy. Note that the SIP agent group, as specified by the SIP agent group data object 432, may contain one or more SIP agents 402. Also, it should be noted that if there is more than one SIP agent, the above strategy is used to select the correct agent. An enabled/disabled field 482 indicates whether the policy will be used or not. If the field 482 is set to enabled then the policy will be used, however, if the field 482 is set to disabled, then the policy is not used.

A number of policy attributes field 484 indicates the number of attributes of the policies defined by the from address 474, to address 476, SIP agent group 478, and enabled/disabled 482 fields. The policy attributes are used to compare what are otherwise equal policies. Each policy attribute 486a, 486b, namely the first policy attribute 486a to the nth policy attribute 486b, contains information that is used to compare these equal policies. The following fields are located within the first policy attributes 486a through the nth policy attributes 486b.

A carrier field 488a, 488b should match one of the desired or requested carriers for the policy to be included. The carrier field, which is optional, provides routing policies based on the user selection of a carrier. The carrier field provides a means of specifying the carrier as part of an advertised path. Originators of reachable routes can indicate the available carriers by time of day and day of week parameters. Additionally, each route originator can assign a relative cost attribute for the route, which will help to select the lowest cost route; each route originator can also assign a QoS attribute for the route, which will help select the best quality for the route. It should be noted that multiple carrier entries can be added to a single carrier attribute; however, it is preferred that only one carrier attribute is permitted per update message. Additional carrier entries may simply be appended to the previous carrier entry.

Each carrier field 488a, 488b may be associated with the following carrier attributes: carrier length; carrier; time of day length; time of day; day of week length; day of week; cost; QoS latency/QoS Jitter; and QoS encoding scheme. The carrier length attribute provides the length of the carrier entry, preferably in bytes. The carrier attribute contains a text entry (alphanumeric) that describes the carrier. A configuration of specifics for the carrier can be established on an SR basis by using the management station interface. Specifically, the carrier data object 302 (FIGS. 3A and 3B) exists if the SR is to generate a CIC or provide special MPLS capabilities associated with the carrier.

The time of day length attribute 492a, 492b contains the length (in bytes) of the time of day attribute. The time of day attribute is a comma-separated list of military time ranges. The format includes "0000-2400" time ranges, where 2400 is the end of the day entry. Time ranges are separated by commas and do not overlap, with the exception of the boundary second. For example, "0000-0700, 0700-2400" is a valid entry, even though 0700 from the first range overlaps with 0700 from the second range. In general, however, these ranges will not overlap. There is no limit to the number of ranges.

The day of week length attribute 494a, 494b contains the length (in bytes) of the day of week attribute. The day of week attribute contains a comma-separated list of weekday ranges. The following characters are an example of characters that may be used to specify each weekday: U—Sunday; M—Monday; T—Tuesday; W—Wednesday; H—Thursday; F—Friday; and S—Saturday. The specification for the days of week attribute includes non-overlapping ranges. For example, a specification of U-S includes all of the days of the week (including weekends); M-F indicates every weekday; M,H,S indicates Monday, Thursday, and Saturday; U-W,F-S indicates every day of the week, except Thursday.

The cost attribute 496a, 496b preferably contains a 32-bit integer with a cost value. This value may contain a system-wide divisor in an attempt to reflect actual currency. For the purpose of advertising routes, there is preferably one universal currency and no decimal point. The originators of routes can offer the route for any cost wherein the lower the cost, the more desirable the route. The QoS attribute 498a, 498b comprises two parts, namely, a relative QoS indicator and an indicator of the compression available.

The QoS latency/QoS jitter 498a, 498b contain the level of quality that is available when this route is advertised. Values for this field may selected from the group comprising: 1—super high quality (SHQ)—latency under 100 milliseconds, near zero (0) jitter; 2—high quality (HQ)—latency under 200 milliseconds, little jitter; 3—normal quality (NQ)—latency under 300 milliseconds, occasional jitter; 4—low quality (LQ)—latency under 500 milliseconds, frequent jitter; and, 5—very low quality (VLQ)—latency under 1,000 milliseconds, frequent jitter.

The QoS encoding scheme attribute contains the recommended encoding scheme for communication on the advertised route. Preferably, no request is routed that uses a lower level of compression than the advertised policy provides. As an example, if G.711 is requested, but the route only supports G.729, then the session request should seek another route.

A time of day 492a, 492b field and a day of week field 494a, 494b are used to see if the carrier/cost pair is valid and available. The time of day field 492a, 492b preferably contains a text string with a comma-separated list of times in military format. The end of the day is indicated by 2400 hours, which is not a valid time, but indicates the last second of the day. As an example, the time of day entry might be 0000-0700, or 1700-2400. The day of week 494a, 494b field holds a comma-separated list of weekday ranges. Preferably, for this field, a U specifies Sunday and an H specifies Thursday. As an example, a valid day of week entry might be U, T-H, S, which indicates Sunday, Tuesday through Thursday, and Saturday.

A cost field 496a, 496b is a decimal integer that contains some indication as to the relative costs or preferences of various policies. A quality of service (QoS) 498a, 498b field contains information that describes a minimum QoS expected by the policy attribute. Table 4, provided herein below, provides an example of indication types that may be contained by the QoS field 498a, 498b.

TABLE 4

| QoS Indications | |
| --- | --- |
| QoS Indication | Description |
| SHQ-G.711 | This quality indicates no or low latency, as well as no compression. |
| HQ-G.711 | This quality indicates some latency and no compression. |
| LQ-G.711 | This quality indicates some latency and jitter and no compression. |
| HQ-G.729 | This quality indicates no or low latency, as well as moderate compression. |

The above table is not exhaustive; instead there are many types of quality considerations. When a SIP "invite" message is received, the SDP portion of the "invite" message, as further defined herein below, defines both a media type and a bandwidth indicator. By reviewing the inbound media type and bandwidth indicator and comparing them to the QoS 498a and 498b field offered by a particular policy, it can be determined whether the policy should be added to those under consideration or rejected due to poor or insufficient quality. Finally, an enabled/disabled field 499a, 499b can also be used to set a particular policy attribute as enabled or disabled.

A successful SIP invitation comprises two requests, an "invite" followed by an "ack." The "invite" request asks the callee to join a particular conference or establish a two-party conversation. After the callee has agreed to participate in the call, the caller confirms that it has received that response by sending an "ack" request. If the caller no longer wants to participate in the call, it sends a "bye" request instead of an "ack."

The "invite" request typically contains a session description, for example written in SDP format, that provides the called party with enough information to join the session. For multicast sessions, the session description enumerates the media types and formats that are allowed to be distributed to that session. For a unicast session, the session description enumerates the media types and formats that the caller is willing to use and where it wishes the media data to be sent. In either case, the callee wishes to accept the call, it responds to the invitation by returning a similar description listing the media it wishes to use. For a multicast session, the callee should only return a session description if it is unable to receive the media indicated in the caller's description or wants to receive data via unicast.

Figure 4:
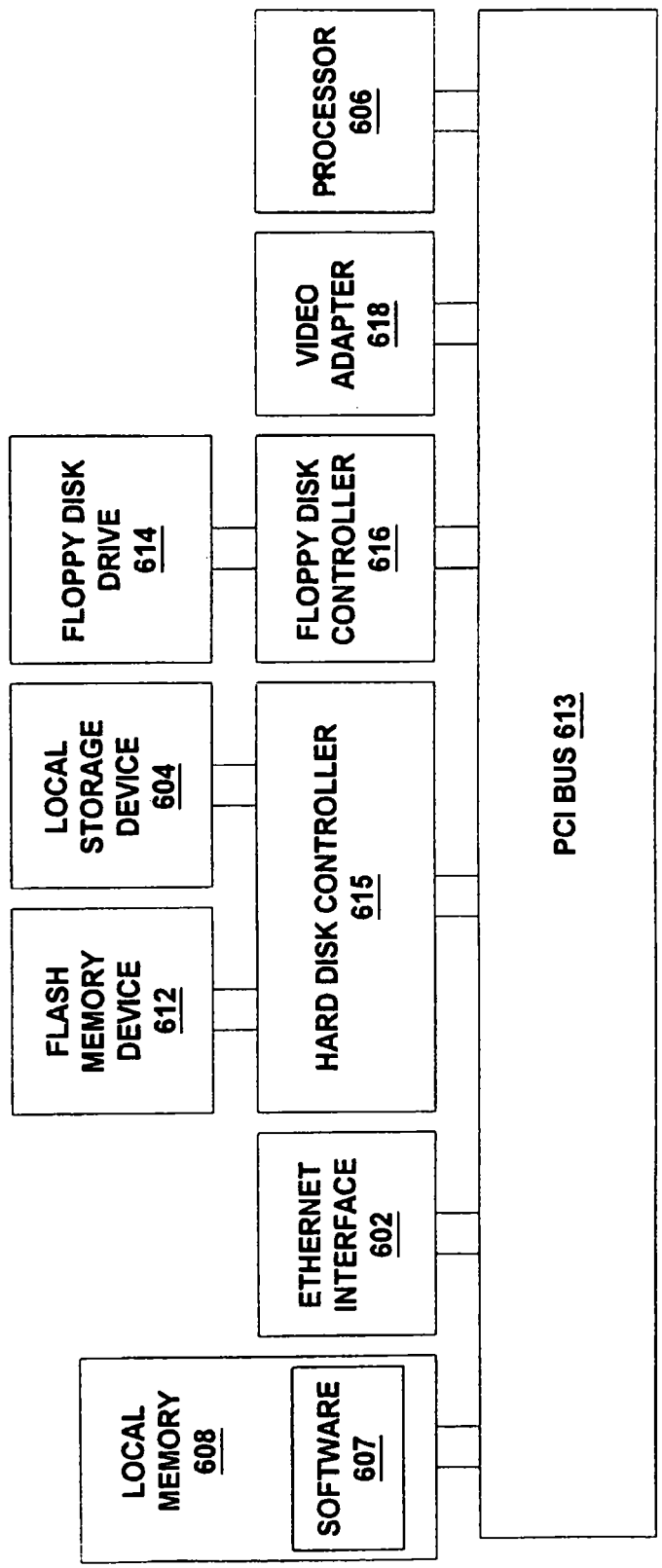
FIG. 4 is a block diagram that illustrates the structure of the session router apparatus that is located within the network of FIG. 1.

Having described the policy stored on a session router (FIG. 3), FIG. 4 is a block diagram that illustrates the structure of the session router apparatus. The session router 122, 124, 126, 128 (FIG. 1) is an computer having at least one Ethernet interface 602, or any other packet interface that are capable of sending and receiving TCP/IP data, or any other data. Preferably, the computer comprises two or more Ethernet interfaces. An example of the computer may be a Pentium III-based computer system packed in a 1U rack-mount unit. A 1U unit from a company such as International Business Machines Corporation (IBM) of Armonk, N.Y.; Compaq Computer Corporation of Houston, Tex.; or any other manufacturer of turnkey 1U computer systems is sufficient for the session router (SR). In an alternative embodiment, the SR could have additional dedicated Ethernet subsystems for media transport.

In another alternative embodiment, the SR comprises a PowerQUICC II processor using an embedded operating system such as, but not limited to, VxWorks.

The SR 122 (FIG. 1) comprises a local storage device 604 for storing any persistent data, computer operating system, and/or SR software, as provided herein. The SR 122 (FIG. 1) also comprises a processor 606, which executes software 607 provided within a local memory 608. A flash memory device 612 may be provided for storing configuration data for backup/restore functionality. A hard disk controller 615 may be provided within the SR 122 (FIG. 1) for communicating with the local storage device 604 and flash memory device 612. A floppy disk drive 614 and floppy disk controller 616 may be provided within the SR 122 (FIG. 1) for maintenance reasons. A video adapter 618 may also be provided within the SR 122 (FIG. 1) for local maintenance. It is conceivable that other structural elements may be provided within the SR 122 (FIG. 1), including computational elements known to one skilled in the art, including, as an example, a level-2 cache, numeric co-processor, or a network processor. Preferably, the local memory 608, Ethernet interface 602, hard disk controller 612, floppy disk controller 616, video adapter 618, and processor 606 communicate within the SR 122 (FIG. 1) via a PCI bus 613. Alternative bus structures could be used, including a power PC bus when PowerQUICC processors are used.

Figure 5:
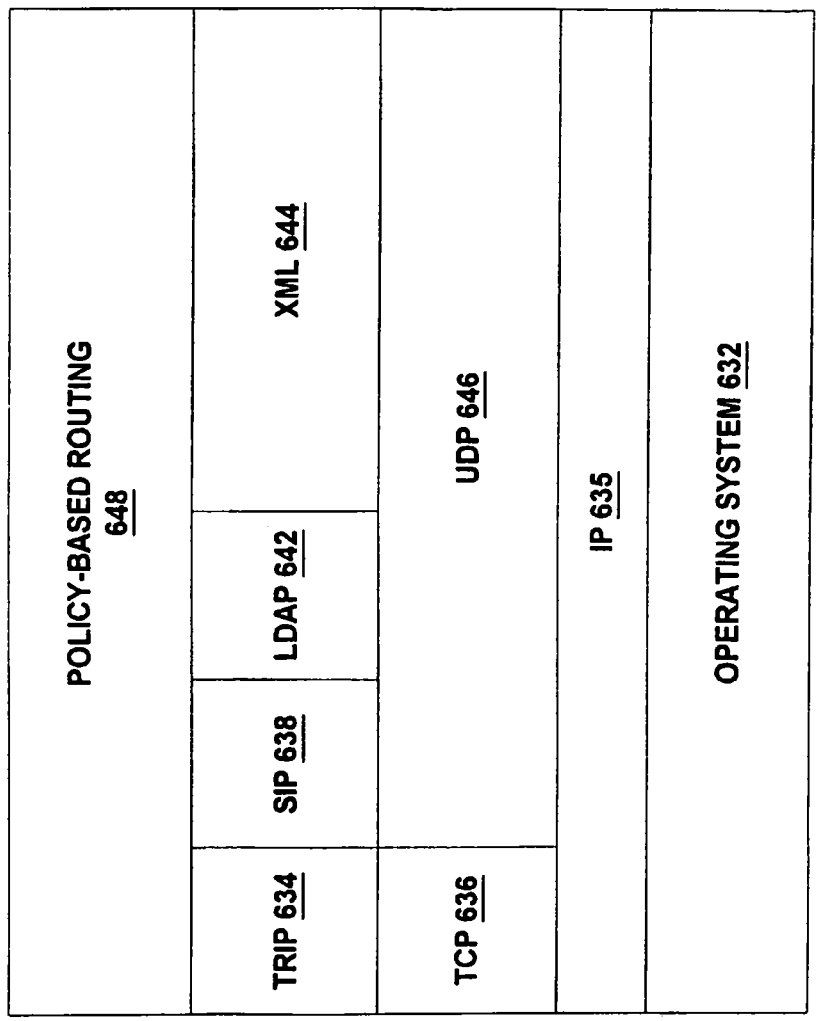
FIG. 5 is a block diagram that illustrates software systems, or protocols, that may be resident within the local memory of the session router of FIGS. 1 and 4.

FIG. 5 is a block diagram illustrating the software 607, or protocols, that may be resident within the local memory 608 (FIG. 4) of the SR. An operating system 632 is provided to control the functions of the SR. Any operating system may be provided within the SR. While Linux is preferred as the operating system provided within the memory 608 (FIG. 4), other operating systems, including, but not limited to, real-time embedded operating systems such as Lynx, PSOS, Solaris, or VxWorks, may be provided in the alternative. Preferably, the software protocols provided within the memory 608 (FIG. 4) utilize the IP 635. TRIP 634 processing (performed by a TRIP location server) may be performed by the SR over a socket-based transmission control protocol (TCP) 636. SIP 638 processing (performed by a SIP proxy server), the lightweight directory access protocol (LDAP) 642, and extensible markup language (XML) 644 preferably utilize the user/universal datagram protocol (UDP) 646, which is connectionless. Proprietary policy-based routing algorithms may also be provided, which are based on TRIP 634, SIP 638, and LDAP 642, but may include statistical techniques as well. Preferably, to manage the policies, the management stations 112, 114 (FIG. 1) communicate with the SR 122 (FIG. 1) using XML 644 in a UDP 646 datagram.

Figure 6:
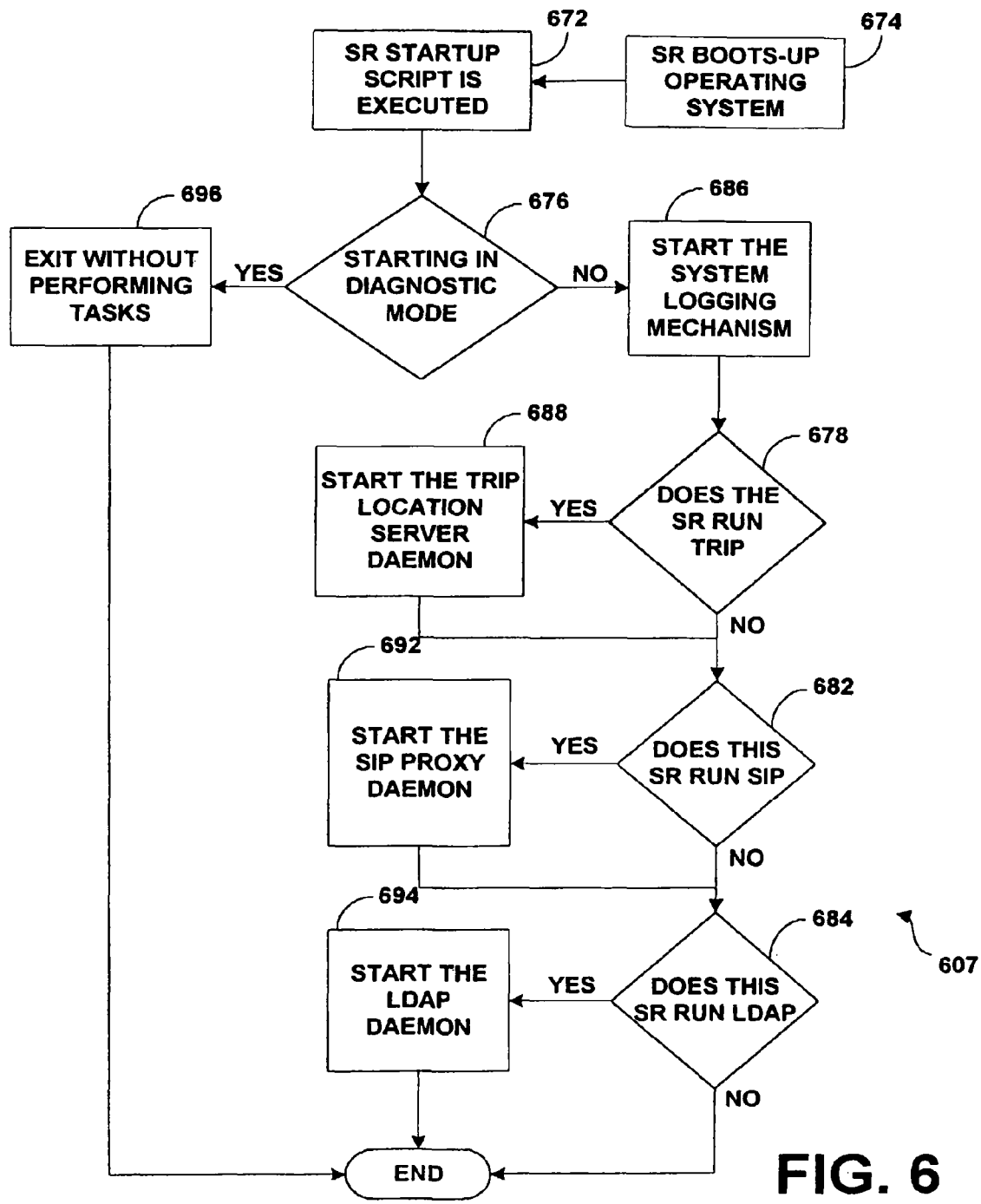
FIG. 6 is a flow chart that illustrates operations performed during the startup of the session router of FIGS. 1 and 4.

FIG. 6 is a flow chart illustrating operations performed by the session router at startup, as defined by the software 607 (FIG. 4). With regard to all flow charts described herein, each block represents a module, segment, or portion of code, which comprises one or more executable instructions for implementing the specified logical function(s). It should also be noted that in some alternative implementations, the functions noted in the blocks may occur out of the order noted. For example, two blocks shown in succession may in fact be executed substantially concurrently, or the blocks may sometimes be executed in the reverse order, depending upon the functionality involved.

As shown by block 672, upon being turned on, the SR boots-up the operating system 632 (FIG. 5). Preferably, the operating system is Linux; however, the operating system may be any other operating system such as, but not limited to, Lynx, PSOS, Solaris, or VxWorks. As shown by block 674, an SR startup script is then executed as part of the operating system boot-up process. To permit starting the SR in diagnostic mode (a mode where no action is taken until an operator intervenes), a test for diagnostic mode (block 676) is completed. If the SR does not start in diagnostic mode, systematically checking (blocks 678, 682, 684) for whether a particular daemon, or process, is configured to run is performed. Specifically, after starting a system logging mechanism (block 686), a determination is made as to whether, the SR runs TRIP (block 678), the SR runs SIP (block 682), and the SR runs LDAP (block 684). Each of the respective daemons is then started if SR runs the daemon (blocks 688, 692, 694 respectively).

When the startup script starts a TRIP location server (LS) 634 (block 688), the TRIP LS 634 processes and provides routing information for the SR. One of the TRIP LS 634 first steps is to read each adjacent router record 342 (FIG. 3A) from the stored configuration. Essentially, a TRIP LS 634 serves endpoint lookup requests based on routing information received from other TRIP LSs. For each adjacent router 342

(FIG. 3A) record, there is an examination to see if they are internal or external routers. Internal implies that the ITAD identifier 348 (FIG. 3A) is equal to this SR's ITAD identifier 368. If the two ITAD identifiers are not equal, then the adjacent router is classified as external.

The TRIP LS 634 then begins initializing specific TRIBs. Each of the TRIBs contains temporary data that is frequently modified. A mechanism to store these databases, which have dynamic properties, could be an in-memory doubly linked list, an indexed sequential access method (ISAM) database, or any other mechanism that would provide rapid access and provide for each insertion and deletion. In accordance with the preferred embodiment of the invention, a standard template library list is used. The initialization of the TRIBs, when using a library list, includes the instantiation of an empty list. When initialization is complete, a TRIB exists for each external adjacent router, a TRIB exists for each internal adjacent router, an output TRIB exists, and a local TRIB exists, all of which are empty and ready for entries.

The persistently stored (local) policy database, which holds individual policies, is then opened. The database could be any form of persistent storage, including a structured query language (SQL) database server or an ISAM database; it could also be stored as a flat file or as XML data. In accordance with the preferred embodiment, a SQL server is used. Once the client (in this case, the TRIP LS 634) opens the SQL database through the SQL client interface, the local policies 462 (FIG. 3A) are read one by one. The policies are first checked to see if they are currently active; this check compares the current date and time with the activate date/time 468 (FIG. 3A) located in the local policy data object 462 (FIG. 3A). If the activate date/time field 468 (FIG. 3A) in the policy is less than the current date/time, then the policy is determined to be active; otherwise, the policy is pending future activation. If the policy is active, then that policy will be included in the processing. If the policy is pending future activation, then a wake-up timer is established to activate the policy at a specific date/time. Once the timer is set, the process skips the rest of the processing and goes directly to the next policy. When the timer expires, the policy will be processed at that future time.

The timers used in accordance with the preferred embodiment are typical timeout queue mechanisms. The address of a data object can be added to a unified timeout list and, when the timer expires, the data object can be referenced in the future. It should be noted that an activate date/time 468 (FIG. 3A) value of zero (0) implies that the policy is immediately active. If the deactivate date/time 472 in the local policy data object 462 is non-zero (0), then the policy has a deactivation that needs to be queued. Note that when the policy is deactivated, it is removed from the stored local policies managed by the SQL database to prevent policies that could never be valid from being considered. If the deactivate date/time 472 (FIG. 3A) value is non-zero (0) and the deactivate date/time 472 (FIG. 3A) value is less than the current date/time, the record is deleted and processing for this record is skipped. When the deactivate date/time 472 is greater than the current date/time, a timer is set to automatically deactivate the policy in the future. Once the timers have been set for a policy and the policy is currently active, the policy is added to the local TRIB. Policies are then checked against a configuration to determine if they should be shared externally. To better understand this check, a detailed description of ITAD-based policies is provided herein below.

As described herein above, the TRIB is used by a TRIP LS to 'remember' what changes have been made to raw policy information as it is run through the decision process. The following provides information regarding implementation of TRIBs and the TRIP decision process in accordance with the preferred embodiment of the invention. Preferably, each TRIB contains all, or a portion of the following.

TABLE 5

TRIB Entry Data

| Element | Description |
|---|---|
| TRIB origin list links | Links members of the same TRIB ordered by the from address first. |
| TRIB ITAD list links | Links members of the same TRIB that belong to the same ITAD To isolate local policy contributions to the Ext-TRIB, following ITAD links for the TRIP LS's ITAD should suffice. |
| TRIB TRIP ID list links | May be required to link route entries from the same peer together in a TRIB This is not useful in any Adj-TRIB-In or the Ext-TRIB for that matter. |
| TRIB entry state | Indicated whether the TRIB entry is active or withdrawn (waiting for expiration of a purge timer prior to deletion). |
| originating node ID | ITAD + TRIP ID. |
| modified entry links | Forms a linked list with other TRIB entries that have been changed as a result of the current decision process This allows the TRIP LS to efficiently consider only the entries pertinent to the current decision process. |
| same received policy links | A policy may incorporate a number of routes with different from and to addresses, but the same next hop server and carrier attributes When this policy is entered into a TRIB, the multiple individual routes represented by that policy must be separated out so that they can be entered into the TRIB in the appropriate order This field is used to link all routes that were part of a single local policy or received via a single "update" message. |
| aggregated route links | Used primarily between the local-TRIB and the Adj-TRIB Out for each external ITAD to link together routes related by aggregation This list that stretches across TRIBs will allow access to all routes involved in an instance of aggregation. |
| aggregate class | May be necessary to identify the aggregate class this entry belongs to (used in addition to the links) This could be efficiently expressed as an integer offset into the from address and another offset into the to address where the common sub-string shared by members of the same aggregate class terminates. |
| originating address | The first order search and sort key for a TRIB entry. This field is a sort key. |

TABLE 5-continued

TRIB Entry Data

| Element | Description |
| --- | --- |
| destination address | The second order search and sort key for a TRIB entry. This field is a sort key. |
| next hop server | The third order search and sort key for a TRIB entry. This field contains the next hop server advertised to other TRIP LS's (regardless of whether they are local or foreign) The TRIP LS always replaces itself as the next hop server when advertising a local policy (or performing aggregation) A local route is always preferred over a route involving another SR This can be a TRIP address URI object. |
| SIP agent group | This field is used when the co-resident SIP proxy sends a lookup request to its corresponding TRIP LS It represents the SIP agent or agents that this SR services. |
| carrier data | This is one of the carrier entries in the carrier attribute This is disentangled from the policy received in an "update" message as described in TRIB processing. |
| atomic aggregate flag | If set, indicates that this route's routed path is not necessarily complete. |
| advertisement path | For routes of external origin, this indicates some notion of the paths through which the advertisement has traveled. |
| routed path | Advertisement paths are typically the same as routed paths, however, in a mixed TRIP LS topology, it is possible that these attributes will differ, and thus this attribute is maintained distinctly in the TRIB It could potentially use a smart pointer to the advertisement path data since most times they will be the same. |
| multi-exit discriminator | Value of received (or generated) multi-exit discriminator If this value is 0 than the field is considered unpopulated. |
| TRIB entry timer | When a route is withdrawn, it is not actually removed from a TRIB; instead a purge timer is started after which time the route is removed Auto-activation and deactivation also require a timer. |
| active period start | If inbound and outbound screens are cached internally as TRIB entries, then this field and the next can be used instead of an activation timer. |
| active period end | If inbound and outbound screens are cached internally as TRIB entries, then this field and the previous one can be used instead of a deactivation timer. |

It should be noted that the TRIB TRIP ID list links, same received policy links, aggregate class, active period start and active period end entries may or may not be useful depending on a specific implementation.

Figure 7:
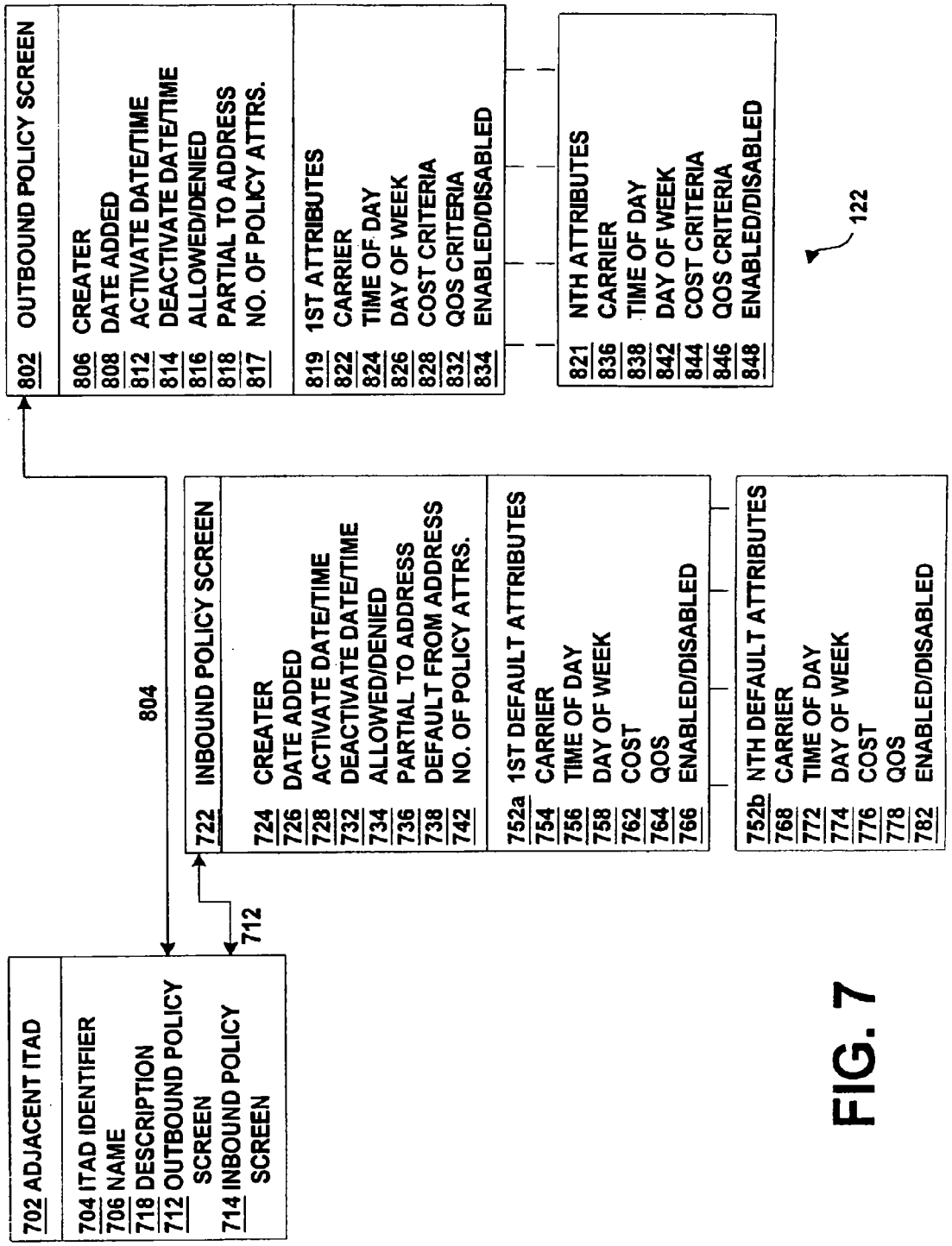
FIG. 7 is a block diagram that illustrates policy screens used by the session router of FIGS. 1 and 4.

Not all policies are to be shared externally. To test whether a policy is to be shared externally, policy screens are checked to make sure as to whether the policy is to be shared externally or accepted from an external ITAD. FIG. 7 is a block diagram illustrating the policy screens in accordance with the preferred embodiment of the invention These policy screens are also referred to as policy information bases (PIBs). These data objects are provisioned in the same manner as the SR data is provisioned in FIGS. 3A and 3B. These data objects are used, however, to screen inbound or outbound data policies that are either arriving or destined for a foreign ITAD. The data table is configured for each cluster of SRs in the manner in which the SR is configured in FIGS. 3A and 3B.

Each ITAD is preferably defined by a 32-bit integer that is assigned by the Internet assigned numbers authority (IANA). Each SR (cluster) has a configured set of policy screens that are used to manage collections of advertised routes received from, and transmitted to, foreign ITADs. Referring to FIG. 7, an adjacent ITAD 702 data object contains a foreign ITAD identifier 704, which is similar to the ITAD identifier 348 (FIG. 3A) contained in the adjacent router 342 (FIG. 3A) data object. If there is no configured adjacent ITAD 702 data object, then no routes will be advertised outside the ITAD and no received routes from the foreign ITAD will be used. This provides a high degree of security over routing algorithms, if required. For each adjacent ITAD 702 configuration, there are name 706 and description 708 fields to describe the ITAD; these fields are used for descriptive purposes only and have no algorithmic consequence.

Each adjacent ITAD 702 has an array of inbound policy screen 714 data objects referenced by a pointer 712. This array has some of the same attributes as a policy, including creator 724, date added 726, activate date/time 728, deactivate date/time 732, allowed/denied 734, partial to address 736, and number of policy attributes 742 fields. When an "update" message is received from a foreign TRIP server, the longest match on the reachable route address, compared to the partial to address 736, will result in one of the following situations: no partial match found; partial match found with allowed/denied 734 set to denied; or partial match found with allowed/denied 734 set to allowed.

In the first and second situations, the "update" message is discarded and no changes are made to the local routing databases (i.e., TRIB). In the third situation, the advertised route is accepted and is added to the TRIB databases. When a partial match occurs, all of the settings for all of the default (policy) attributes 752a and 752b that include carrier 754, 768, time of day 756, 772, day of week 758, 774, cost 762, 776, and QoS 764, 778, are all taken as defaults for the routes when the policy attribute is enabled 766, 782. In addition, a default from address 738 field is used to assign default from addresses (e.g., URIs). This provides enhanced source-based routing by ensuring that every routing decision can have completely equivalent routing data. Examples of this type of routing policy in action are provided herein below.

There are two kinds of partial matches possible in accordance with the preferred embodiment of the invention. In the first kind of partial match, the advertised reachable route address in a received "update" message from a TRIP peer server is longer than the partial to address 736. In the second kind of partial match, the advertised reachable route address in a received "update" message from a TRIP peer server is shorter than or equal to the partial to address 736. In accordance with the second kind of partial match, a situation occurs in which the policy is narrower than the policy received from a foreign ITAD. In this case, using the partial to address 736 (which is narrower) as the route policy, in place of the wider value received in the "update" message, results in narrowing the policy.

When an SR has an adjacent router 342 (FIG. 3A) provision with a foreign ITAD identifier 348 (FIG. 3A) (a foreign ITAD is an ITAD that does not equal the ITAD identifier 368 (FIG. 3B) in an SR's base configuration 362 (FIG. 3B)), special rules exist for controlling the advertisements that are exported to that foreign ITAD. These rules are defined within the outbound policy screen 802 data object of FIG. 7. This data is provisioned in the SR in much the same manner as the SR data in FIGS. 3A and 3B is provisioned. The adjacent ITAD 702 data object has an array of outbound policy screen 802 records for each ITAD identifier 704 that is pointed to by pointer 804. This array has some of the same attributes as a policy, including the creator 806, date added 808, activate date/time 812, and deactivate date/time 814 fields. An allowed/denied 816 parameter is used to control whether or not the policies are to be advertised to the peer.

Three possibilities may occur, upon comparing the TRIB policies to be advertised with outbound policy screens 802. A first possibility is that there is no partial match of the reachable route ($T_0$) in the TRIB with the screen's partial to address 818. A second possibility is that there is a best (partial) match of the reachable route ($T_0$) in the TRIB with the screen's partial to address 818 and the allowed/denied 816 field is set to denied. A third possibility is that there is a best (partial) match of the reachable route ($t_0$) address in the TRIB with the screen's partial to address 818 and the allowed/denied 816 field is set to allowed. A number of policy attributes 817 field is also included for purposes similar to the number of policy attributes 742 field included in the inbound policy screen 722.

In the first and second cases, no advertisements related to the TRIB policy will be made to the foreign ITAD. However, in the third case there are two possibilities. A first possibility is that the to address is longer than or equal to the partial to address 818. In this situation, the advertised policy to the foreign ITAD includes the aggregated reachable route. A second possibility is that the to address is shorter than the partial to address 818. In this situation, the advertised policy to the foreign ITAD includes a partial to address 818 that is narrower (i.e., more limiting).

It should be noted that the best match (for POTS or routing number addresses) of a policy to an outbound policy screen is one in which the policy's reachable route attribute address shares the most contiguously matching characters, starting from the left, with the attributes of the outbound policy screen 802. The attributes 819, 821 of the outbound policy screen 802, which are defined by a carrier 822, 836, time of day 824, 838, day of week 826, 842, cost criteria 828, 844, and QoS criteria 832, 846, are also matched against the attributes of the route. For each carrier in the route, there should be a match with the outbound screen attributes (i.e., carrier, time of day, day of week, cost criteria, and QoS criteria). When the match is not exact, the narrower (i.e., more specific) attributes of the outbound screen will apply. For example, a route may define M-F, 0000-2400 for a given carrier, but the outbound screen defines T-F, 0700-1700; given that, the narrower attribute defined by the outbound screen is the route that will be used.

The route is used if the attributes match and the set of matched attributes is marked enabled, within the enabled/disabled fields 834, 848, to ensure that the policy attributes advertised to the external ITAD are a subset of those in the outbound screen. Additionally, as described above, the partial to address 818 itself may influence the externally advertised reachable route attribute address. This functionality presents some inventive options to control route advertisement based on the attributes specified in an outbound screen.

For each adjacent internal router, a TCP/IP socket is opened, and adjacent routers begin negotiating versions through the use of the "open" message. In addition to a fixed-size TRIP header, an "open" message contains the following fields: version; hold time; my ITAD; TRIP identifier; an optional parameters length; and an optional parameter. A detailed description of these fields is provided in "Telephony Routing over IP (TRIP)," by Rosenberg et al., section 4.2, which is an Internet draft having draft number draft-ieff-iptel-trip-04.txt, dated November 2000, the disclosure of which is incorporated herein by reference.

At this point, a valid communication socket exists between all available local peers, or session routers within the same ITAD. The exchanging of policies occurs after a valid connection is made. The policies are then exchanged using the "update" message. In addition to a TRIP header, the "update" message comprises a list of routing attributes. These attributes comprise the following: withdrawn route; reachable route; next hop server (SIP proxy address); advertisement path; routed path; atomic aggregate; local preference; communities; multi-exit discriminator; ITAD topology; and authentication. In accordance with the preferred embodiment of the invention, the following attributes are also included in the "update" message list of routing attributes: from address (URI); carrier; time of day; day of week; cost; and QoS.

The withdrawn route, reachable route, and next hop server (SIP proxy address) attributes are utilized as the primary means of policy communication, along with the additional attributes: from address (URI); carrier; time of day; day of week; cost; and QoS. The following identifies how a TRIP "update" message can be processed and how it can generate a local policy 462 (FIG. 3A).

The advertisement path, routed path, atomic aggregate, ITAD topology and authentication attributes are all attributes used to manage the acceptance or rejection of an "update" message. The advertisement path and routed path attributes are used to detect duplicate advertisements and circular references. This is similar to the BGP-4 duplicate detection method. The atomic aggregate attribute indicates to external ITADs that the advertisements are refined from other discrete advertisements received by the originator. In accordance with the preferred embodiment of the invention, aggregation is not performed in the manner provided by the atomic aggregate attribute. However, if the attribute is received, it is passed on to the next router. The ITAD topology attribute included in the "update" message is used to assist in flooding information to local servers within the same ITAD. The sender performs authentication and the receiver understands the authentication, thereby guaranteeing that no changes were made to the advertisement and that the advertisement should be accepted. None of these parameters affect the actual stored policy.

In accordance with the preferred embodiment of the invention, the local preference, communities, and multi-exit discriminator attributes, while used by TRIP to provide some form of policy management, are not suited for the kind of routing that is planned by the present network 100 (FIG. 1) Also, these parameters are not generally shared across ITAD boundaries.

A detailed description of the routing attributes is provided in "Telephony Routing over IP (TRIP)," by Rosenberg et al.", section 4.3, which is an Internet draft having draft number draft-ietf-iptel-trip-04.txt, dated November 2000, the disclosure of which is incorporated herein by reference. Examples of the TRIBs being exchanged are provided herein below. A review of the current ITAD-based screening mechanism described above is used to determine if the policy is to be shared. The above process of obtaining a valid communication session via TCP/IP and then exchanging policies via the "update" message is repeated for adjacent external routers.

All of the TRIBs are then initialized and populated. The TRIP server then processes the received routes and computes a local TRIB for the SIP proxy server to use for routing session requests. Additionally, an external TRIB is created for each foreign ITAD peer.

Figure 8:
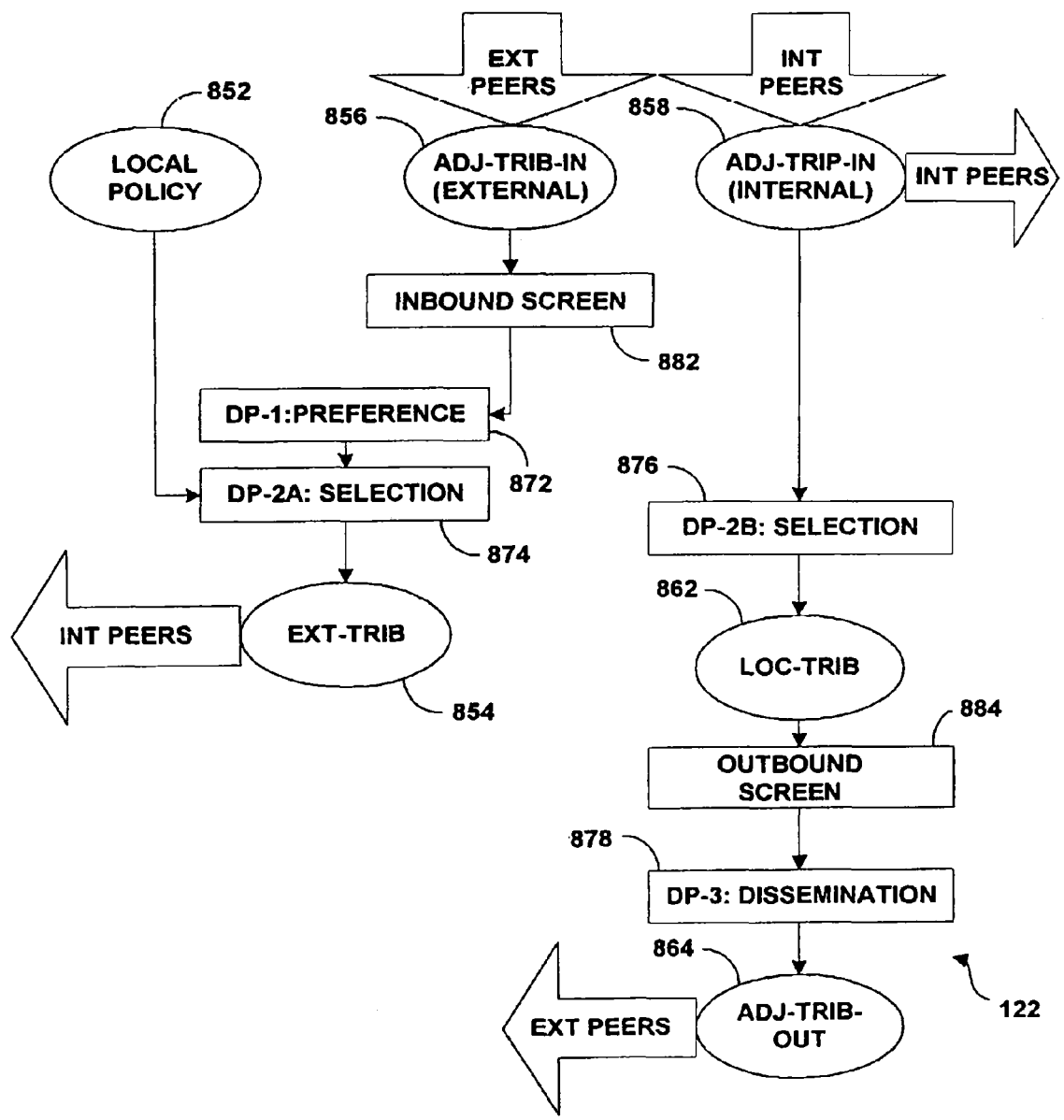
FIG. 8 is a block diagram that illustrates logic defined by the TRIP decision process as performed by the session router of FIGS. 1 and 4.

FIG. 8 is a block diagram that illustrates logic defined by the TRIP decision process. As shown by FIG. 8, ovals 852, 854, 856, 858, 862, and 864 represent various TRIBs, and blocks 872, 874, 876, and 878 represent the various phases of the decision process defined by TRIP. Oval 852 represents the local policy, which is the set of routes defined in the local SR Oval 856 represents the Adj-TRIB-In (external), which is the set of route advertisements received from external TRIP peers. It should be noted that there is preferably one Adj-TRIB-In (external) 856 for each external peer.

Oval 858 represents the Adj-TRIB-In (internal), which is the set of route advertisements received from internal TRIP peers. Preferably, there is one Adj-TRIB-In (internal) 858 for each TRIP instance within the ITAD (populated by the TRIP flooding mechanism). The contents of these internal TRIBs are advertised to all internal peers, which are represented in FIG. 8 by the int peers arrow out of Adj-TRIB-In (internal) 858. Oval 854 represents the Ext-TRIB, which is the set of routes from the local policy 852 and received from foreign ITADs to be advertised to internal peers. Oval 862 represents the Loc-TRIB, which is the set of routes used to make routing decisions within the SR. Oval 864 represents the Adj-TRIB-Out, which is the set of routes that will be advertised to an external peer. Preferably, there is an Adj-TRIB-Out 864 for each external peer.

TRIP defines local preference as a numeric value, which is configured into local routes and passed on to internal peers. This preference assists in choosing between sets of routes to the same destination. In accordance with the preferred embodiment of the invention, TRIP has been enhanced by adding a number of attributes to the routes, including from address, carrier, day of week, time of day, cost, and QoS. The application of these attributes to session invitations is preferably done at run-time since it involves matching the attributes of a session invitation to the route attributes. All distinct routes (i.e., from address, to address, and next hop server) are retained in the TRIB (instead of applying a preference value to the routes and selecting only those routes with the highest degree of preference). Essentially, the degree of preference for all routes is the same.

A first phase of the TRIP decision process involves using the PIB defined in the SR to determine a preference value. However, instead of applying a preference value, inbound screening is performed using inbound screen data, which is provided within the inbound policy screen 722 (FIG. 7) to select acceptable received routes and add default attributes to them. It should be noted that it is only necessary for phase one to be run when an Adj-TRIB-In (external) 856 is changed. In addition, outbound screening 802 (FIG. 7) is performed using outbound screen data, which is provided within the outbound policy screen 802 (FIG. 7).

The resulting set of screened external routes, in addition to the local policy screening, is input into a first part of a second phase of the decision process. According to the prior TRIP specification, this phase selects the routes with the highest degree of preference. Since all routes have equal preference in the SR, this phase adds the screened external routes to the local policy in order to load the Ext-TRIB 854. This phase will also take into account whether or not the SIP Agent(s) referred to by the local policy are in service. Only routes for SIP Agent(s) that are active and in service are included. This set of routes is then advertised to all internal peers. It should be noted that it is only necessary for the first part of the second phase to be run when the local policy 852 changes or an Adj-TRIB-In (external) 856 is changed.

The Ext-TRIB 854 and the Adj-TRIB-In (internal) 858 comprise the input for a second part of the second phase of the decision process. According to the TRIP specification, this phase selects the routes with the highest degree of preference. For the SR, the input TRIBs are merged to create the Loc-TRIB 862 output. This set of routes is used to route session invitations.

A third phase of the decision process operates on the Loc-TRIB 862 to produce sets of routes to advertise to external peers. This phase applies an outbound screen 884 defined in the PIB to select a set of routes for each external peer (i.e., Adj-TRIB-Out 864). This phase also aggregates routes. It should be noted that the three phases of the decision process should be run each time an input route is added, changed, or removed from either the local policy 852 or one of the Adj-TRIB-In(s) 856 and 858.

To avoid running this decision process too often, which may be a burden on system resources, the TRIP LS preferably sets a short timer (on the order of, for example, a few seconds) when one of the input TRIBs changes. The decision process runs when this timer expires. If another change occurs before the timer expires, the timer is reset. Another timer, that is longer than the first timer, is set when the first change occurs. This second timer is cancelled if the shorter timer expires and the decision process runs. If the short timer is repeatedly reset because of continual updates, the longer timer eventually expires and causes the decision process to run. The longer timer forces the decision process to run within an adequate amount of time and prevents the short timer from continuously delaying the decision process from running. The same thread of execution that processes changes to the input TRIBs runs the decision process so that the input TRIBs cannot be changed while the decision process is running.

Figure 9A:
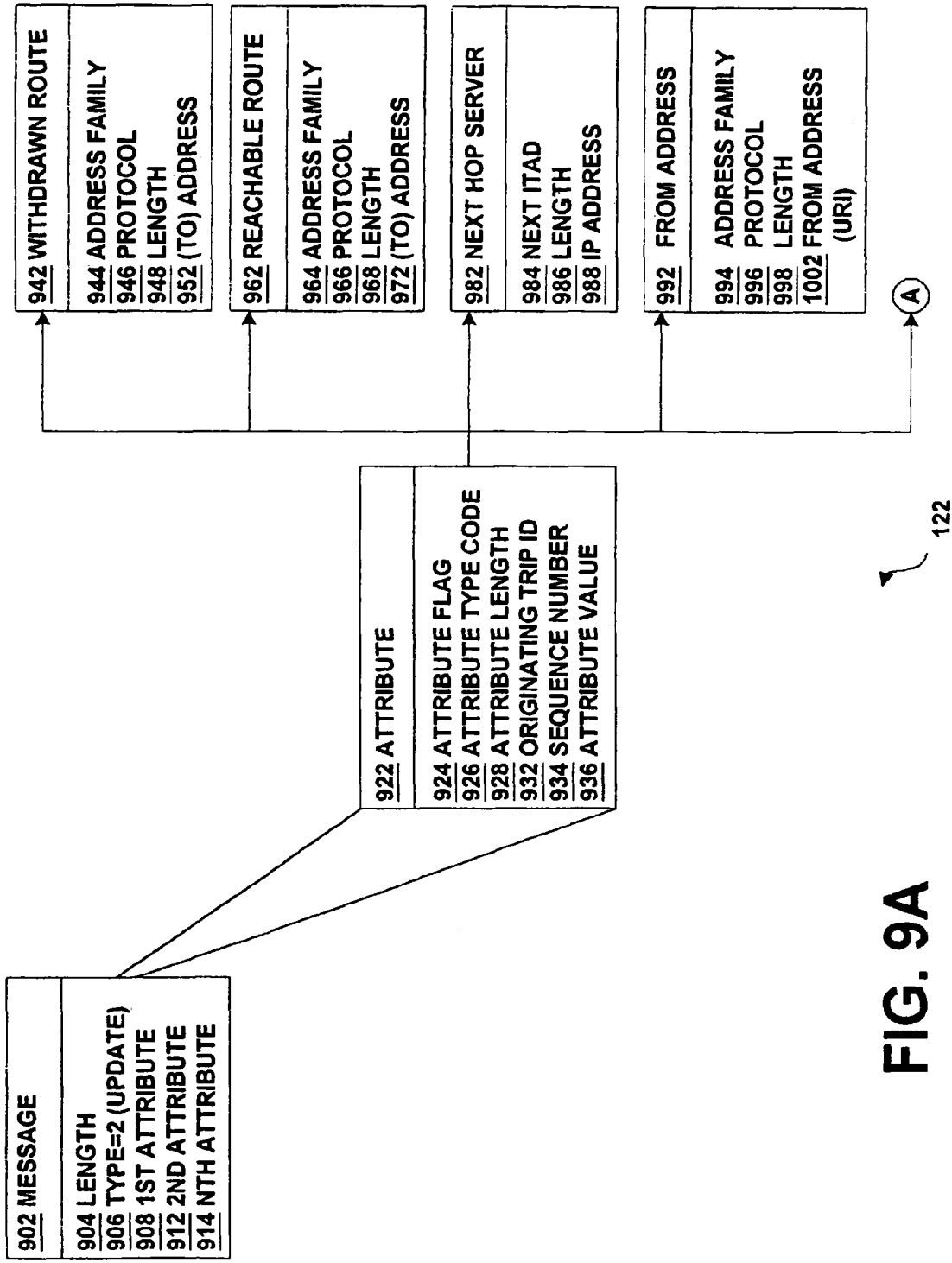
FIG. 9A is a block diagram that illustrates the major components of a TRIP "update" message that may be received or transmitted from or to the session router of FIGS. 1 and 4.
Figure 9B:
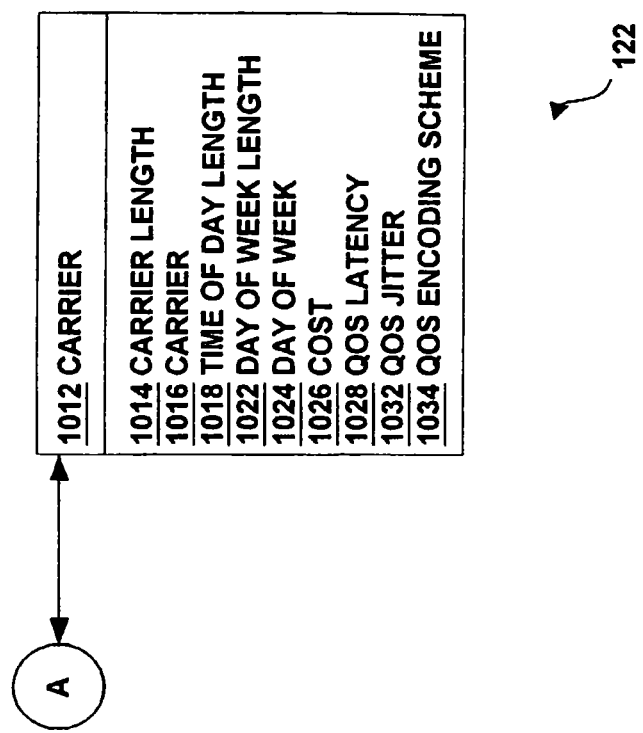
FIG. 9B is a block diagram that is a continuation of FIG. 9A.

FIGS. 9A and 9B are block diagrams that illustrate the major components of a TRIP "update" message, in accordance with the preferred embodiment of the invention. The message 902 contains several attributes (908, 912, 914). The entire length of the message is defined in a length field 904, and the message type is defined in a type field 906. Preferably, there is no limit to the number of attributes, but the maximum message size is eventually reached. Each message is intended to communicate a set of attributes that are part of a single policy.

When the message arrives at the TRIP server daemon, it is parsed. Preferably, C++ software is used to parse the messages and their attributes. Once the attributes are parsed, which is performed by examining an attribute flag 924 and an attribute type code 926, the attributes are extracted into one of the types identified in FIGS. 9a and 9B, including the withdrawn route 942, reachable route 962, next hop server 982, from address 992, and carrier 1012 types. An attribute length field 928 is used to determine the length of the attribute that follows so that the parser can accommodate variable-length attributes or skip unknown attributes.

The parsed attributes are then processed in the order received. Therefore, the withdrawn route 942 attribute is preferably processed before the reachable route 962 attribute. The withdrawn route 942, reachable route 962, and from address 992 attributes all have the same format. The address family fields 944, 964, and 994 refer to POTS or routing numbers. The address family code of 254 has been added to indicate a URI address. The protocol field 946, 966, and 996 is usually set to SIP or a value of 1. The length field 948, 968, and 998 is the actual length (preferably, in bytes) of the address portion 952, 972, and 1002. As mentioned previously, the address portion can be either a partial telephone number or a partial URI. It should be noted that the next hop server 982 and carrier 1012 types are preferably parsed in a similar fashion.

The following provides an example of a TRIP "update" message. It should be noted that to explain how "update" messages are processed, the disclosure provides the TRIB and "update" message content as simple text instead of the binary data of which the messages actually consists.

Example
TRIP Update
   withdrawn route: none
   reachable route: 1 [seq. Num.: 1, origin TRIP ID: 111]
   next hop server:.sip:server.com
   ITAD topology: 222
   from address: tel:1-617
   carrier: NextGen/0000-2400/U-S/0.50/SHQ, G.711

In accordance with the present example, it should be noted that the from address 992 is a URI and the reachable route 962 is a partial telephone number. Further, it should be noted that the carrier 1012 has five parts, in the format of: name/hours/days/cost/quality. The text within the brackets next to the reachable route attribute 962 indicates the link state attribute's sequence number and originating TRIP ID. There are no withdrawn routes specified in this example, so, in this case, the text is omitted.

As policies are loaded and as decisions and advertisements are made, changes to each of the TRIBs are preferably made according to the format depicted below. Local-TRIB:

| From | To | Next Hop | Carrier |
| --- | --- | --- | --- |
| Tel: 1-617 | 1 | sip: server.com | NextGen<br>0000-2400<br>U-S<br>0.50<br>SHQ, G.711 |

Before discussing this processing example any further, it is necessary to define its router topology. The topology comprises the following SRs:
   sr.acme.com with TRIP ID 111 in ITAD 2024
   sr2.acme.com with TRIP ID 222 in ITAD 2024
   sr3.acme.com with TRIP ID 333 in ITAD 2024
   external.carrier.com with TRIP ID 789 in ITAD 2055

FIG. 10 is a block diagram illustrating the example of an ITAD topology. When necessary, the combination of ITAD and TRIP ID is herein represented as <ITAD>: <TRIP ID> Therefore, ITAD 1024, TRIP ID 111 may be written as 1024:111. Throughout this example, SRs are identified either by their domain address 364 (FIG. 3B) or their TRIP identifier 366 (FIG. 3B) and ITAD identifier 368 (FIG. 3B). SRs 1024:222 and 555:789 are adjacent to 1024:111, and SRs 1024:222 and 1024:333 are adjacent to each other.

The present example describes TRIB initialization and processing from the perspective of the SR sr.acme.com 2000 in ITAD 2024 with TRIP ID 111. SR sr.acme.com 2000 has two adjacent peers (SRs 1024:222 and 555:789), one external peer (external.carrier.com 2003 in ITAD 2055 with TRIP ID 789), and one internal peer (sr2.acme.com 2001 with TRIP ID 222). It should be noted that since SR sr.acme.com and SR sr2.acme.com are internal TRIP peers, they have the same ITAD number. Additionally, ITAD 2024 contains one additional SR, namely, SR sr3.acme.com 2002 with TRIP ID 333, that is adjacent only to sr2.acme.com 2001 having TRIP ID 222.

The local policy information for SR sr.acme.com 2000 is discussed below as part of the router initialization. For the purpose of this example:
   sr2.acme.com 2001 has no local policy information.
   sr3.acme.com 2002 has a local policy that allows access from any address to any number beginning with 1-978 via gateway D 2006 that uses a faraway carrier anytime on Saturday or Sunday at a cost of 0.10
   external.carrier.com 2003, which is unknown to sr.acme.com 2000 at this point in the example since it is external, has a local policy that allows access from any address to any number beginning with 1 via gateway E 2007 that uses the external carrier anytime Monday through Friday at a cost of 0.50.

In the present example, there are five TRIBs, each of which is described relative to SR 2000. An adjacent TRIB input (Adj-TRIB-In) is split into external adjacent TRIB Input (Ext-Adj-TRIB-In) and internal adjacent TRIB input (Int-Adj-TRIB-In). This allows for further granularity in discussing how various policy inputs are processed. There is one Ext-Adj-TRIB-In per external (to the ITAD) peer, so the SR will have one Ext-Adj-TRIB-In. Likewise, there is also one Int-Adj-TRIB-In per internal SR, so the example starts with one Int-Adj-TRIB-In. There is one external TRIB (Ext-TRIB) containing the processed external and local route information for advertisement to internal peers, one local-TRIB containing the routing information used by this router to make routing decisions, and one adjacent TRIB output (Adj-TRIB-Out) containing routes processed for advertisement to external peers.

At this point, all of the TRIBs are initialized. Given that the SR has two peers (one external and one internal), the initialized TRIBs are as follows:

Ext-Adj-TRIB-In (555:789):

| From | To | Next Hop | Carrier |
| --- | --- | --- | --- |
| | | | |

Int-Adj-TRIB-In (1024:222):

| From | To | Next Hop | Carrier |
| --- | --- | --- | --- |
| | | | |

Ext-TRIB:

| From | To | Next Hop | Carrier |
| --- | --- | --- | --- |
| | | | |

Local-TRIB:

| From | To | Next Hop | Carrier |
|------|----|----|------|
|      |    |    |      |

Adj-TRIB-Out (555:789):

| From | To | Next Hop | Carrier |
|------|----|----|------|
|      |    |    |      |

At initialization, the server reads all of its stored polices and populates the local-TRIB, Ext-TRIB and the Adj-TRIB-Out. This example assumes that the following local configuration data:

Carrier: NextGen
  Name: NextGen
  Description: Local NextGen Carrier
  Service State Enabled
  ID: 10107654
Carrier: LastGen
  Name: LastGen
  Description: Local LastGen Carrier
  Service State Enabled
  ID: 10107655
Carrier: Enterprise
  Name: Enterprise
  Description: Local Enterprise Carrier
  Service State Enabled
  ID: 10107656
Carrier: External
  Name: External
  Description: Default Carrier associated with Inbound Updates from ITAD 2055
  Service State Enabled
  ID: 10109999
Administrative Account
  UserID: Cliff
  Password: Rocket
  Access Rights Super User
Adjacent Routers
  1st Entry
  Name: external
  Domain Address: external.carrier.com
  TRIP Identifier: 789
  ITAD Identifier: 2055
  2nd Entry
  Name: sr2
  Domain Address: sr2.acme.com
  TRIP Identifier: 222
  ITAD Identifier: 2024
SIP Agents
  1st Entry
  Domain Address: gateway1.acme.com
  Name: Gateway A
  Description: Gateway to NextGen Carrier
  Registration Interval: 30
  Carriers[ ]: {NextGen}
  2nd Entry
  Domain Address: gateway2.acme.com
  Name: Gateway B
  Description: Gateway to NextGen and LastGen Carriers
  Registration Interval: 30
  Carriers[ ]: {LastGen, NextGen}
  3nd Entry
  Domain Address: gateway3.acme.com
  Name: Gateway C
  Description: Gateway to Business
  Registration Interval: 30
  Carriers[ ]: {Enterprise}
SIP Agent Group: Group A
  Strategy: Hunt
  Number of Agents: 1
  Agent Type: SIP Endpoint
  SIP Agent: Gateway A
SIP Agent Group: Group B
  Strategy: Hunt
  Number of Agents: 1
  Agent Type: SIP Endpoint
  SIP Agent: Gateway B
SIP Agent Group: Group C
  Strategy: Hunt
  Number of Agents: 1
  Agent Type: SIP Endpoint
  SIP Agent: Gateway C
SIP Agent Group: Group A+B:
  Strategy: Hunt
  Number of Agents: 2
  Agent Type: SIP Endpoint
  SIP Agent: Gateway A
  Agent Type: SIP Endpoint
  SIP Agent: Gateway B
SR
  Domain Address: sr.acme.com
  TRIP Identifier: 111
  ITAD Identifier: 2024
  Name: Acme SR
  Description: SR for Acme Packet
  Location: 130 New Boston Street; Woburn Mass.
  TRIP Version: 1.0
  SIP Version: 2.0
  Router Version: 0.1
  Administrative Accounts[ ]: {Cliff}
  Adjacent Routers[ ]: {external.carrier.com, sr2.acme.com}
  SIP Agents[ ]: {Gateway A, Gateway B, Gateway C}
Local Policy
  1st Entry
  Creator: Cliff
  Date Added Oct. 1, 2000
  Activate Date/Time: 0
  Deactivate Date/Time: 0
  From Address (URI): *
  To Address (URI): tel:1-781
  Next Hop: Group B
  Service State Enabled
  No. of Route Attrs.: 2
  1st Attribute
    Carrier: NextGen
    Service State Enabled
    Time of Day: 0000-2400
    Day of Week: S
    Cost: 0.10
    QoS: SHQ, G.711
  2nd Attribute
    Carrier: LastGen
    Service State Enabled
    Time of Day: 0000-2400

Day of Week: U
Cost: 0.15
QoS: SHQ, G.711
2nd Entry
Creator: Cliff
Date Added Oct. 1, 2000
Activate Date/Time: 0
Deactivate Date/Time: 0
From Address (URI): *
To Address (URI): tel:1-781
Next Hop: Group A
Service State Enabled
No. of Route Attrs.: 2
1st Attribute
   Carrier: NextGen
   Service State Enabled
   Time of Day:0000-0700, 1700-2400
   Day of Week: M-F
   Cost: 0.20
   QoS: SHQ, G.711
2nd Attribute
   Carrier: NextGen
   Service State Enabled
   Time of Day:0700-1700
   Day of Week: M-F
   Cost: 0.30
   QoS: SHQ, G.711
3rd Entry
Creator: Cliff
Date Added Oct. 1, 2000
Activate Date/Time: 0
Deactivate Date/Time: 0
From Address (URI): *
To Address (URI): tel: 1-781-933
Next Hop: Group C
Service State Enabled
No. of Route Attrs.: 1
1st Attribute
   Carrier: Enterprise
   Service State Enabled
   Time of Day: 0000-0700, 1700-2400
   Day of Week: M-F
   Cost: 0.25
   QoS: SHQ, G.711
4rth Entry
Creator: Cliff
Date Added Oct. 1, 2000
Activate Date/Time: 0
Deactivate Date/Time: 0
From Address (URI): *
To Address (URI): acme.com
Next Hop: Group C
Service State Enabled
No. of Route Attrs.: 1
1st Attribute
   Carrier: Enterprise
   Service State Enabled
   Time of Day: 0000-2400
   Day of Week: M-F
   Cost: 0.25
   QoS: SHQ, G.711
5th Entry
Creator: Cliff
Date Added Oct. 1, 2000
Activate Date/Time: 0
Deactivate Date/Time: 0
From Address (URI): *
To Address (URI): tel:1-617
Next Hop: Group A+B
Service State Enabled
No. of Route Attrs.: 1
1st Attribute
   Carrier: NextGen
   Service State Enabled
   Time of Day: 0000-2400
   Day of Week: U-S
   Cost: 0.25
   QoS: SHQ, G.711
Adjacent ITADs
   ITAD Identifier: 555
   Name: External Network
   Description: External ITAD
   Inbound Screens:
   Screen #1:
     Creator: Cliff
     Date Added Oct. 1, 2000
     Activate Date/Time: 0
     Deactivate Date/Time: 0
     Allowed
     Partial To Address: *
     No. of Policy Attrs.: 1
     1st Policy Attribute
       Carrier: External
       Service State Enabled
       Time of Day: 0000-2400
       Day of Week: U-S
       Cost: 0.20
       QoS: SHQ, G.711
   Outbound Screens:
   Screen #1:
     Creator: Cliff
     Date Added Oct. 1, 2000
     Activate Date/Time: 0
     Deactivate Date/Time: 0
     Allowed
     Partial To Address (URI): 1-781
     No. of Policy Attrs.: 2
     1st Policy Attribute
       Carrier: Enterprise
       Service State Enabled
       Time of Day: 0000-2400
       Day of Week: U-S
       Cost Criteria: 0.00-0.50
       QoS Criteria: SHQ, G.711
     2nd Policy Attribute
       Carrier: LastGen
       Service State Enabled
       Time of Day: 0000-2400
       Day of Week: U-S
       Cost Criteria: 0.00-0.50
       QoS Criteria: SHQ, G.711
   Screen #2:
     Creator: Cliff
     Date Added Oct. 1, 2000
     Activate Date/Time: 0
     Deactivate Date/Time: 0
     Allowed
     Partial To Address (URI): 1-978
     No. of Policy Attrs.: 0

The following provides an explanation of the local policies defined above prior to a more complex explanation of "update" message processing that will be provided herein below. It should be noted that local policies may be focused on other attributes besides carriers. The first three carriers defined (i.e., NextGen, LastGen, and Enterprise) are used for local SR policy definition. The last carrier (i.e., External) is used as a default carrier that is assigned to any routes entering ITAD 2024 via "update" messages from ITAD 2055.

The adjacent router(s) contain information about sr.acme.com's 2000 TRIP internal and external peers that is used to open connections and validate message content. The adjacent SIP agents indicate the three gateways to which this SR controls access. The three SIP agent groups defined (i.e., groups A, B, and C) are simply single-agent groups; there is one for each gateway. The last SIP agent group, group A+B 2009, includes both gateway A 2004 and gateway B 2005. Configuring a group with more than one agent allows for gateways servicing the same policies to be accessed using different strategies (e.g., hunt, round robin, etc.) and criteria (e.g., constraints such as the number of active sessions).

The SR describes data unique to this session router (i.e., data used for startup, message validation, and "update" message processing). Local policy preferably pertains to gateways adjacent to the SR. The carriers NextGen, LastGen, and Enterprise have been defined for SR sr.acme.com 2000. The first through fourth policies indicate routes through adjacent gateways by which sessions from a particular from address and to a particular to address can be sent, depending on associated timeframes and cost. The adjacent ITAD's entry indicates external ITADs with which the present router exchanges policy.

Screens (inbound 722, FIG. 7 and outbound 802, FIG. 7) are used to filter information between this ITAD 2024 and any external ITADs to which this SR 2000 may communicate. The default carrier external is established to extend policy received from ITAD 2055 because, at this time, external ITADs will not be sending or processing carrier attributes. The example's ITAD 2024 will process these attributes. An inbound screen is established to accept policies destined to any number (denoted by a *). When these policies are accepted, they are associated with the carrier external, regardless of the policy's time of day or day of week restrictions. This routed network provides policy-based routing between the business gateway named gateway C 2008, two carrier gateways named gateway A 2004 and gateway B 2005, and gateway E 2007 (which is in the external ITAD represented by the external carrier). One outbound screen is established such that only policies to numbers beginning with 1-781 and using the carriers LastGen and Enterprise within the specified timeframes are advertised to ITAD 2055. It should be noted that each ITAD entry preferably has only one screen with a given partial to address; although different ITAD entries may have a screen with the same partial to address, but different policy attributes.

Another outbound screen is defined such that only policies to numbers beginning with 1-978 and using any carrier are advertised to ITAD 2055. The absence of any specific carrier entries indicates that any carrier is allowed through the screen. The use of screens adds additional flexibility and control to the route decision phases and route dissemination. After the TRIP server opens the local policy database and begins loading the policies, the following situation, detailed below, occurs.

The first policy in the stored local policy database is:
    $1^{st}$ Entry
    Creator: Cliff
    Date Added Oct. 1, 2000
    Activate Date/Time: 0
    Deactivate Date/Time: 0
    From Address (URI): *
    To Address (URI): tel: 1-781
    Next Hop: Group B
    Service State Enabled
    No. of Route Attrs.: 2
        1st Attribute
            Carrier: NextGen
            Service State Enabled
            Time of Day: 0000-2400
            Day of Week: S
            Cost: 0.10
            QoS: SHQ, G.711
        $2^{nd}$ Attribute
            Carrier: LastGen
            Service State Enabled
            Enabled
            Time of Day: 0000-2400
            Day of Week: U
            Cost: 0.15
            QoS: SHQ, G.711

The first policy is reviewed to see if it was active, which is accomplished by comparing the activate date/time value with the current time. If a policy is not currently active, a timer is set to re-inject this policy from the stored local policy database at a particular time in the future. If a policy is not currently active, there is no point in processing it beyond this determination. If a policy is preferred and selected over others with the same from address 474 (FIG. 3A) and to address 476 (FIG. 3A) fields, a deactivate timer can be started to cause the route to be withdrawn at a particular time in the future. Because the activate date/time 468 (FIG. 3A) value is zero (0) and the deactivate date/time 472 (FIG. 3A) value is zero (0), the policy is always active. The policy should then be added immediately to the Ext-TRIB.

The TRIP LS does not prefer one route to another during decision phase one. These decisions are left to the SIP proxy server when an "invite" message is processed, which allows for more complicated route choices based on criteria such as time of day or a distribution pattern over routes deemed equivalent. Preferably, the local preference attribute is set to a value of one. It should be noted that the TRIP SR startup scenario is a specific case of decision phase one and the first part of decision phase two, where all Adj-TRIB-Ins are empty since peer connections have not yet been opened. In accordance with the preferred embodiment of the invention, since routes as described herein may contain more information than standard TRIP or BGP-4 routes, it is not likely that a route will be more or less specific in the destination address only.

Ext-TRIB:

| From | To | Next Hop | Carrier |
| --- | --- | --- | --- |
| * (anywhere) | Tel: 1-781 | Group B | NextGen |
| | | | Enabled |
| | | | 0000-2400 S |
| | | | 0.10 |
| | | | SHQ, G.711 |
| | | | LastGen |
| | | | Enabled |
| | | | 0000-2400 U |
| | | | 0.15 |
| | | | SHQ, G.711 |

Because the SR is in the process of starting up, the entries in the Ext-TRIB are not advertised to internal peers since there are none to talk to yet. Furthermore, there is no input from the Int-Adj-TRIB-In so the second part of the second phase yields a local-TRIB that is the same as the Ext-TRIB.

The decision phases used in accordance with the preferred embodiment of the invention depart from those used by standard TRIP implementation.
Local-TRIB:

| From | To | Next Hop | Carrier |
|------|------|----------|---------|
| * | Tel: 1-781 | Group B | NextGen Enabled 0000-2400 S 0.10 SHQ, G.711 LastGen Enabled 0000-2400 U 0.15 SHQ, G.711 |

It should be noted that there can be as many carrier entries as may be required to provide multi-carrier routing for this route, as long as the other attributes are the same. Again, because no peer connections have been opened yet, each Int-Adj-TRIB-In is empty and can be ignored. The next step, then, is to see if this policy is to be shared externally. To do this, we review our outbound policy screens for ITAD 2055 (the only other ITAD with which we exchange policies):
Screen #1:
   Creator: Cliff
   Date Added Oct. 1, 2000
   Activate Date/Time: 0
   Deactivate Date/Time: 0
   Allowed
   Partial To Address: 1-781
   No. of Policy Attrs.: 2
   $1^{st}$ Policy Attribute
   Carrier: Enterprise
   Service State Enabled
   Time of Day: 0000-2400
   Day of Week: U-S
   Cost Criteria: 0.00-0.50
   QoS Criteria: SHQ, G.711
   $2^{nd}$ Policy Attribute
   Carrier: LastGen
   Service State Enabled
   Time of Day: 0000-2400
   Day of Week: U-S
   Cost Criteria: 0.00-0.50
   QoS Criteria: SHQ, G.711
Screen #2:
   Creator: Cliff
   Date Added Oct. 1, 2000
   Activate Date/Time: 0
   Deactivate Date/Time: 0
   Allowed
   Partial To Address: 1-978
   No. of Policy Attrs.: 0

Figure 11:
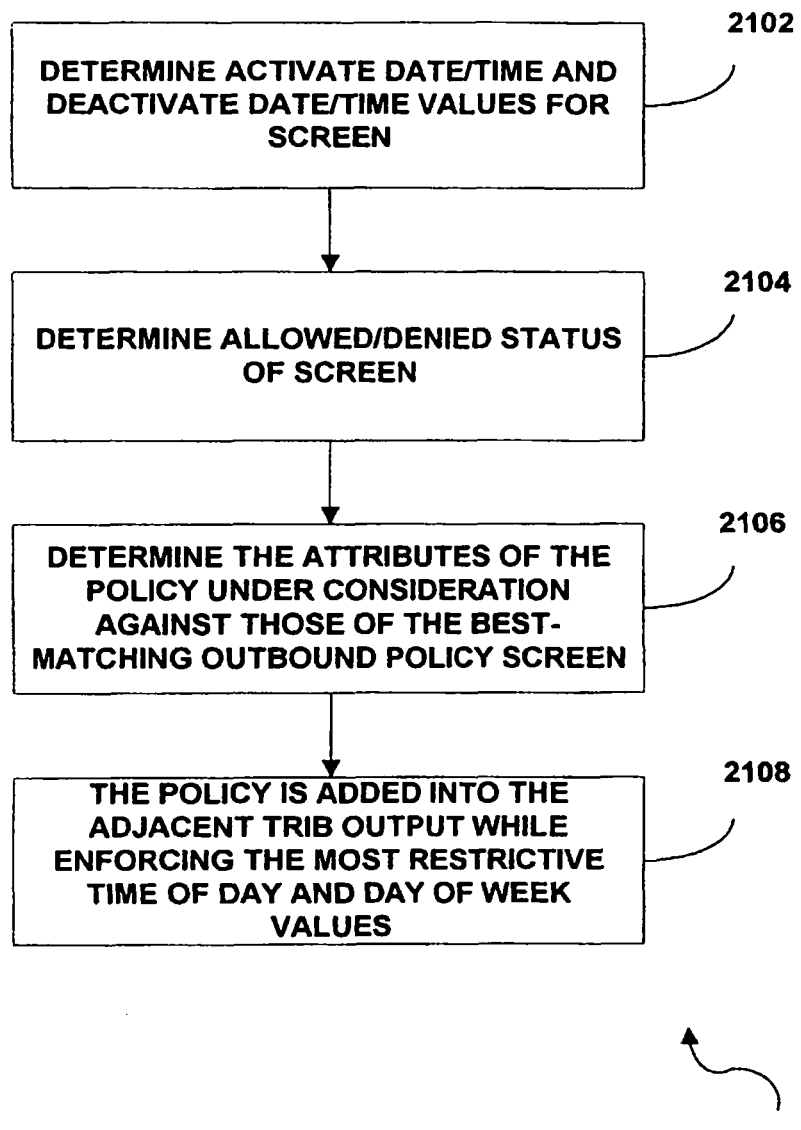
FIG. 11 is a flow chart that illustrates the process of using a best matching screen to determine is a given policy should be advertised externally, as performed by the session routers of FIGS. 1 and 4.

Because the partial to address of the first screen matches the first four bytes of the first local policy's to address, this outbound policy screen is selected to determine if this policy is to be shared externally because it is the longest and best match. (The second screen's partial to address fails to match at the second digit.) FIG. 11 is a flow chart illustrating the process of using the best matching screen to determine if a given policy should be advertised externally. As shown by block 2102, a check is made to determine the screen's activate date/time and deactivate date/time values. Since the activate date/time and deactivate date/time values are both zero (0), the policy under consideration remains active. As shown by block 2104, a check is then made to determine the screen's allowed/denied status. Since the allowed/denied attribute is set to allowed, the policy under consideration remains active.

As shown by block 2106, a check is then made to determine the attributes of the policy under consideration against those of the best-matching outbound policy screen for the external ITAD 2055. Because the best-matching screen has the LastGen carrier in its carrier list and the LastGen carrier is enabled, the policy under consideration remains active. The NextGen carrier is not present in the selected outbound policy screen for ITAD 2055. Therefore, the route remains active and would be externally advertised without any carrier attributes. If IANA approves the carrier attribute, the policy under consideration would be advertised with the LastGen carrier, but without the NextGen carrier.

As shown by block 2108, the policy is added into the adjacent TRIB output, while enforcing the time of day and day of week values if they are more restrictive. In the present case, the time of day, day of week, cost, and QoS attributes are less restrictive in the outbound policy screen. Therefore, the carrier attributes of the policy are extended unchanged to the adjacent router.

The resulting policy, given that the external TRIP peer can process the carrier attribute, is:
Creator: Cliff
Date Added Oct. 1, 2000
Activate Date/Time: 0
Deactivate Date/Time: 0
From Address (URI): *
To Address (URI): tel:1-781
Next Hop: gateway2.acme.com
Service State Enabled
No. of Route Attrs.: 1
   1st Attribute
   Carrier: LastGen
   Service State Enabled
   Time of Day: 0000-2400
   Day of Week: U
   Cost: 0.15
   QoS: SHQ, G.711

It should be noted that the service state fields for policies and carrier entries are preferably not advertised policy, instead they are part of the local configuration. If a policy or one of its carriers is disabled, that policy or portion thereof is not entered into any TRIBs and is not advertised. Because the SR needs to be aware of the traffic flows to the gateways that it controls, a local gateway next hop server address is replaced with an SR when an advertisement (i.e., external or internal) is made.

The following screening scenario is provided as a contrast to the previous screening example.

Assume that the first outbound policy screen for ITAD 2055 is:
Screen #1:
   Creator: Cliff
   Date Added Oct. 1, 2000
   Activate Date/Time: 0
   Deactivate Date/Time: 0
   Allowed
   Partial To Address: 1-781
   No. of Policy Attrs.: 2
   $1^{st}$ Policy Attribute
   Carrier: Enterprise
      Service State Enabled
      Time of Day: 0700-1500
      Day of Week: U-S Cost Criteria: 0.00-0.50
QoS Criteria: SHQ, G.711
$2^{nd}$ Policy Attribute
  Carrier: LastGen
  Service State Enabled
  Time of Day: 0700-1500
  Day of Week: U-S
  Cost Criteria: 0.00-0.50
  QoS Criteria: SHQ, G.711

In this case, the resulting policy would be changed to conform to the allowed hours of operation that are more restrictive. Therefore, the policy, as extended to external TRIP servers, would include the following carrier attribute. (Note that the service state field is deliberately omitted because the following is an advertised policy.)

$1^{st}$ Attribute
  Carrier: LastGen
  Time of Day: 0700-1500
  Day of Week: U
  Cost: 0.15
  QoS: SHQ, G.711

Outbound policy screening is a powerful tool for controlling which policies are exported Since, to be exported, this policy has to pass all of these tests, it provides a great deal of flexibility. It should be noted that it is also possible to narrow the reachable route or the to address attributes. Therefore, the native policy could refer to 1-781, but the outbound screen could be for 1-781-933. In this case, the exported policy would have the narrower 1-781-933 advertised, and not 1-781.

The following expands upon the above example and refers to an entry in the Adj-TRIB-Out:

Adj-TRIB-Out (2055:789):

| From | To | Next Hop | Carrier |
|---|---|---|---|
| * | tel: 1-781 | sr.acme.com | LastGen<br>0000-2400 U<br>0.15<br>SHQ, G.711 |

It should be noted that the from and carrier columns illustrated above would not be sent to an external peer until IANA approves the carrier and QoS attribute extensions to TRIP After applying the same process to the other four routes, the TRIBs for sr.acme.com appear, as follows.

Ext-Adj-TRIB-In (2055:789):

| From | To | Next Hop | Carrier |
|---|---|---|---|

Int-Adj-TRIB-In (2024:222):

| From | To | Next Hop | Carrier |
|---|---|---|---|

Ext-TRIB:

| From | To | Next Hop | Carrier |
|---|---|---|---|
| * | tel: 1-781 | Group B | NextGen<br>0000-2400 S<br>0.10<br>SHQ, G.711<br>LastGen<br>0000-2400 U<br>0.15<br>SHQ, G.711 |
| * | tel: 1-781 | Group A | NextGen<br>0000-0700, 1700-2400<br>M-F<br>0.20<br>SHQ, G.711<br>NextGen<br>0700-1700<br>M-F<br>0.30<br>SHQ, G.711 |
| * | tel: 1-781-933 | Group C | Enterprise<br>0000-0700, 1700-2400<br>M-F<br>0.25<br>SHQ, G.711 |
| * | acme.com | Group C | Enterprise<br>0000-2400<br>M-F<br>0.25<br>SHQ, G.711 |
| * | tel: 1-617 | Group A + B | NextGen<br>0000-2400<br>U-S<br>0.10<br>SHQ, G.711 |

Local-TRIB:

| From | To | Next Hop | Carrier |
|---|---|---|---|
| * | tel: 1-781 | Group B | NextGen<br>0000-2400 S<br>0.10<br>SHQ, G.711<br>LastGen<br>0000-2400 U<br>0.15<br>SHQ, G.711 |
| * | tel: 1-781 | Group A | NextGen<br>0000-0700, 1700-2400<br>M-F<br>0.20<br>SHQ, G.711<br>NextGen<br>0700-1700<br>M-F<br>0.30<br>SHQ, G.711 |
| * | tel: 1-781-933 | Group C | Enterprise<br>0000-0700, 1700-2400<br>M-F<br>0.25<br>SHQ, G.711 |
| * | acme.com | Group C | Enterprise<br>0000-2400<br>M-F<br>0.25<br>SHQ, G.711 |
| * | tel: 1-617 | Group A + B | NextGen<br>0000-2400<br>U-S<br>0.10<br>SHQ, G.711 |

Adj-TRIB-Out (2055:789):

| From | To | Next Hop | Carrier |
|---|---|---|---|
| * | tel: 1-781 | sr.acme.com | LastGen 0000-2400 U 0.15 SHQ, G.711 |
| * | tel: 1-781-933 | sr.acme.com | Enterprise 0000-0700, 1700-2400 M-F 0.25 SHQ, G.711 |

Note that group A+B 1009 actually refers to two gateways. When an "invite" arrives and the best policy chosen for it has group A+B 2009 as the next hop server, statistical information about each gateway's current and previous sessions may be used to determine to which gateway the session request is directed. The initialization of Ext-TRIB, local-TRIB, and Adj-TRIB-Out, with the locally stored policies, is then complete.

The next step is to open connections to the peers. Preferably, there are two kinds of peers: local peers and external peers. Local peers use a flooding scheme, to share their local policies with sr.acme.com 2000. TRIP's flooding process may be described as follows. When a TRIP LS receives an "update" message from an internal peer, the TRIP LS floods the new information from that message to all of its other internal peers. Flooding is used to efficiently synchronize all of the TRIP LSs within a domain without putting any constraints on the internal topology of the domain.

A connection to the internal SR peer is opened. After the socket is opened and the TRIP "open" message and version negotiation is performed, the "update" messages start to flood in both directions. Messages from sr2.acme.com 2001 will begin flowing towards sr.acme.com 2000, sharing with sr.acme.com 2000 all of its Ext-TRIB entries. Conversely, sr.acme.com begins sending all of its Ext-TRIB entries to sr2.acme.com 2001. In this manner, internal SRs exchange Ext-TRIB entries and propagate any entries in the Int-Adj-TRIB-Ins for the other internal peers to the newly accessible peer. Similarly, externally adjacent SRs exchange Adj-TRIB-Out entries. At this point, "update" messages are sent for the entries in the Ext-TRIB, to internal peers with the following contents:

TRIP Update:
  Withdrawn: None
  Reachable: 1-781 [Sequence Number: 1,TRI P ID: 111]
  Next Hop Server: sr.acme.com
  ITAD Topology: 222
  From Address: *
  Carrier: NextGen/0000-2400/S/0.10/SHQ, G.711
  Carrier: NextGen/0000-0700, 1700-2400/M-F/0.20/SHQ, G.711
  Carrier: NextGen/0700-1700/M-F/0.30/SHQ, G.711
  Carrier: LastGen/0000-2400/U/0.15/SHQ, G.711
TRIP Update:
  Withdrawn: None
  Reachable: 1-781-933 [Sequence Number: 1,TRIP ID: 111]
  Next Hop Server: sr.acme.com
  From Address: *
  Carrier: Enterprise/0000-0700, 1700-2400/M-F/0.25/SHQ, G.711
TRIP Update:
  Withdrawn: None
  Reachable: acme.com [Sequence Number: 1, TRIP ID: 111]
  Next Hop Server: sr.acme.com
  From Address: *
  Carrier: Enterprise/0000-2400/M-F/0.25/SHQ, G.711
TRIP Update:
  Withdrawn: None
  Reachable: 1-617 [Sequence Number: 1,TRIP ID: 111]
  Next Hop Server: sr.acme.com
  From Address: *
  Carrier: NextGen/0000-2400/U-S/0.10/SHQ, G.711

Note that in the "update" message header, a generation/version number, referred to as a sequence number, is included. As defined by TRIP, the sequence number is used to determine when one version of a route is newer than another version of a route. A larger sequence number indicates a newer version. The sequence number is assigned by the TRIP LS originating the route into the local ITAD.

Whenever an SR originates a new instance of a route (e.g., with a carrier that has a new rate), the version number is incremented by one. This number is used in combination with the TRIP ID to detect duplicates during flooding, wherein SRs within the same ITAD receive the instance of the route. Also note that since this is the first "update" message sent to this adjacent agent, the current ITAD topology, which is a complete list of all known internal adjacent routers, is included. This is preferably included when an SR's perception of its local topology changes.

The SR itself (sr.acme.com 2000) replaces the actual gateways in internal advertisements. In the second "update" message above, instead of a next hop server of gateway3.acme.com 2008, the next hop server is set to sr.acme.com 2000. Nevertheless, the TRIP LS uses the true next hop server (gateway) for its decisions. Only four "update" messages (i.e., routes) are sent (even though there are five "update" messages in the Ext-TRIB) because the first two routes have the same from address and the same to address value. When the next hop server is replaced with the TRIP LS's domain address, these two routes are combined into one, since all three of the key fields are now the same.

With the new carrier and from address attributes, it is less likely that the TRIP LS will be able to use an "update" message to send more than one route at a time. In addition to the restrictions placed on "update" message content, each route included in the "update" message has the same from address and carrier entries. It is possible, however, that the withdrawn route and reachable route attributes can be present in the same "update" message. Another possibility is the withdrawal of a more general route and its replacement with one or more specific routes with exactly the same attributes.

SR sr2.acme.com 2001 begins flooding its Ext-TRIB entries for the use of sr.acme.com 2000. After connections with local peers are established, connections with external peers proceed.

Consider the following "update" message from sr2.acme.com 2001:
TRIP Update:
  Withdrawn: None
  Reachable: 1-978 [Sequence Number: 1, TRIP ID: 333]
  Next Hop Server: sr3.acme.com
  ITAD Topology: 111, 333
  From Address: *
  Carrier: Faraway/0000-2400/U,S/0.10/SHQ, G.711

When this "update" message is received from sr2.acme.com 2001, it identifies its version as one, which indicates that the route originator just created it. It also sends the ITAD topology, which indicates the presence of a new local router (e.g., not adjacent to sr.acme.com) with TRIP ID 333. The presence of this topology change is significant, in that sr.acme.com now receives a flood of Ext-TRIB policies from TRIP ID 333 (via TRIP ID 222 or sr2.acme.com). SR sr.acme.com 2000 then creates a new Adj-TRIB-In for the newly discovered internal SR sr3.acme.com 2002.

Int-Adj-TRIB-In (2024:333):

| From | To | Next Hop | Carrier |
|---|---|---|---|
| * | 1-978 | sr3.acme.com | Faraway 0000-2400 U, S 0.10 SHQ, G.711 |

It should be noted that if an unknown carrier name were received, an entry would have to be added to the list of local, supported carriers with intelligent defaults. This event is trapped and forwarded to a management station.

As sr2.acme.com 2001 (TRIP ID 222) receives a flood of "update" messages from sr.acme.com 2000, they are forwarded on to sr3.acme.com 2002. Likewise, any additional "update" message sent from sr3.acme.com 2002 to sr2.acme.com 2001 is forwarded to sr.acme.com 2000. Once again, each TRIP LS replaces the true next hop server with itself in its local policy before originating route advertisements to local peers.

At this point, this new policy information from the newly created Int-Adj-TRIB-In is run through the modified decision phases. Because the Ext-TRIB and the In-Adj-TRIB-In (for TRIP ID 222 and for TRIP ID 333) contain no other polices that have matching to address or from address fields, there is no issue of selection. Even if a match occurs, all policies are still selected and the TRIP LS makes a final selection when queried by a SIP proxy server. The content of the Ext-TRIB does not change during this process because the local policy has already been consumed and the Ext-Adj-TRIB-In for 2055:789 is still empty.

The contents of the local-TRIB for sr.acme.com are now:
Local-TRIB:

| From | To | Next Hop | Carrier |
|---|---|---|---|
| * | tel: 1-781 | Group B | NextGen 0000-2400 S 0.10 SHQ, G.711 LastGen 0000-2400 U 0.15 SHQ, G.711 |
| * | tel: 1-781 | Group A | NextGen 0000-0700, 1700-2400 M-F 0.20 SHQ, G.711 NextGen 0700-1700 M-F 0.30 SHQ, G.711 |
| * | tel: 1-781-933 | Group C | Enterprise 0000-0700, 1700-2400 M-F 0.25 SHQ, G.711 |
| * | acme.com | Group C | Enterprise 0000-2400 M-F 0.25 SHQ, G.711 |
| * | tel: 1-617 | Group A + B | NextGen 0000-2400 U-S 0.10 SHQ, G.711 |
| * | 1-978 | sr3.acme.com | Faraway 0000-2400 U, S 0.10 SHQ, G.711 |

The local-TRIB then goes through decision phase three. As part of phase three, the outbound screen configuration is reviewed to see if it is possible to advertise this local policy to the external peers. This process was previously disclosed within this example when local policies were accepted; and, if the same process is followed, it can be shown that this route should now be advertised (which is more specific than the screen) to all external peers of the SR.

Adj-TRIB-Out now appears as it does in the following table.

Adj-TRIB-Out (2055:789):

| From | To | Next Hop | Carrier |
|---|---|---|---|
| * | tel: 1-781 | sr.acme.com | LastGen 0000-2400 U 0.15 SHQ, G.711 |
| * | tel: 1-781-933 | sr.acme.com | Enterprise 0000-0700, 1700-2400 M-F 0.25 SHQ, G.711 |
| * | 1-978 | sr3.acme.com | Faraway 0000-2400 U, S 0.10 SHQ, G.711 |

The following is a brief review of screen #1 for ITAD 2055.
Screen #1:
    Creator: Cliff
    Date Added Oct. 1, 2000
    Activate Date/Time: 0
    Deactivate Date/Time: 0
    Allowed
    Partial To Address: 1-781
    No. of Policy Attrs.: 2
    $1^{st}$ Policy Attribute
        Carrier: Enterprise
        Service State Enabled
        Time of Day: 0000-2400
        Day of Week: U-S
        Cost Criteria: 0.00-0.50
        QoS Criteria: SHQ, G.711

2nd Policy Attribute
  Carrier: LastGen
  Service State Enabled
  Time of Day: 0000-2400
  Day of Week: U-S
  Cost Criteria: 0.00-0.50
  QoS Criteria: SHQ, G.711

Screen #1 allows the policy from: *, to: tel:1-781, group B, but preferably with carrier LastGen. The from: *, to: tel:1-781, group A policy is excluded from the Adj-TRIB-Out for ITAD 2055 because it has no matching carriers. The from: *, to: tel:1-781-933, group C policy is added in its entirety because the carrier, enterprise, is the only one allowed through the screen.

Policies from: *, to: acme.com, group C and from: *, to: tel:1-617, group A+B are excluded because no defined screens have a matching partial to address. The following is information regarding screen #2 for ITAD 2055.

Screen #2:
  Creator: Cliff
  Date Added Oct. 1, 2000
  Activate Date/Time: 0
  Deactivate Date/Time: 0
  Allowed
  Partial To Address: 1-978
  No. of Policy Attrs.: 0

Screen #2 allows the from: *, to: 1-978, group C policy because the second outbound screen does not explicitly specify any carriers with which to match. Therefore, even though the faraway carrier is unknown to sr.acme.com 2000 at this time, this policy is permitted through the screen. A screen without any carriers in it will allow any matching policy through, regardless of which carriers that policy might contain. Likewise, a policy without any carriers in it represents free session access (i.e., access that costs nothing to use and is available all of the time).

Although not detailed here, when creating the Adj-TRIB-Out, it would be possible to aggregate routes for efficiency. A detailed description of this procedure is provided in "Telephony Routing over IP (TRIP)," the IPTEL Working group Internet draft, by J. Rosenberg, et al. (November 2000), which is herein incorporated by reference in its entirety. As an example, if a route of 1-978 and a route of 1-978-246 are received, with all other attributes the same, they are combined into the less-restrictive route of 1-978 If policies for 1-978-240, 1-978-241, 1-978-242, 1-978-243, 1-978-244, 1-978-245, 1-978-247, 1-978-248, and 1-978-249 are present, and the previously missing 1-978-246 is received, they could be aggregated. If an aggregation occurs, the following changes to the policies are made: the entries that are no longer required are removed/replaced by the newer entry; the next hop server is changed to this server; and the atomic aggregate attribute is set.

For this aggregation to occur, the externally sharable policies should be equal. If the carrier, time of day, day of week, cost, and QoS attributes are not used in communicating with the external peer, then these are not considered in the aggregation.

Once internal initialization is complete, assuming that all of the flooding is completed from all local peers, all of the TRIB contents are now reviewed.

Ext-Adj-TRIB-In (2055:789):

| From | To | Next Hop | Carrier |
|------|----|----|----|
|      |    |    |    |

Int-Adj-TRIB-In (2024:222):

| From | To | Next Hop | Carrier |
|------|----|----|----|
|      |    |    |    |

Int-Adj-TRIB-In (2024:333):

| From | To | Next Hop | Carrier |
|------|----|----|----|
| * | 1-978 | sr3.acme.com | Faraway<br>0000-2400<br>S, U<br>0.10<br>SHQ, G.711 |

Ext-TRIB:

| From | To | Next Hop | Carrier |
|------|----|----|----|
| * | tel: 1-781 | Group B | NextGen<br>0000-2400 S<br>0.10<br>SHQ, G.711<br>LastGen<br>0000-2400 U<br>0.15<br>SHQ, G.711 |
| * | tel: 1-781 | Group A | NextGen<br>0000-0700, 1700-2400<br>M-F<br>0.20<br>SHQ, G.711<br>NextGen<br>0700-1700<br>M-F<br>0.30<br>SHQ, G.711 |
| * | tel: 1-781-933 | Group C | Enterprise<br>0000-0700, 1700-2400<br>M-F<br>0.25<br>SHQ, G.711 |
| * | acme.com | Group C | Enterprise<br>0000-2400<br>M-F<br>0.25<br>SHQ, G.711 |
| * | tel: 1-617 | Group A + B | NextGen<br>0000-2400<br>U-S<br>0.10<br>SHQ, G.711 |

Local-TRIB:

| From | To | Next Hop | Carrier |
|---|---|---|---|
| * | tel: 1-781 | Group B | NextGen<br>0000-2400 S<br>0.10<br>SHQ, G711<br>LastGen<br>0000-2400 U<br>0.15<br>SHQ, G.711 |
| * | tel: 1-781 | Group A | NextGen<br>0000-0700, 1700-2400<br>M-F<br>0.20<br>SHQ, G.711<br>NextGen<br>0700-1700<br>M-F<br>0.30<br>SHQ, G.711 |
| * | tel: 1-781-933 | Group C | Enterprise<br>0000-0700, 1700-2400<br>M-F<br>0.25<br>SHQ, G.711 |
| * | acme.com | Group C | Enterprise<br>0000-2400<br>M-F<br>0.25<br>SHQ, G.711 |
| * | tel: 1-617 | Group A + B | NextGen<br>0000-2400<br>U-S<br>0.10<br>SHQ, G.711 |
| * | 1-978 | sr3.acme.com | Faraway<br>0000-2400<br>U, S<br>0.10<br>SHQ, G.711 |

Adj-TRIB-Out (2055:789):

| From | To | Next Hop | Carrier |
|---|---|---|---|
| * | tel: 1-781 | sr.acme.com | LastGen<br>0000-2400 U<br>0.15<br>SHQ, G.711 |
| * | tel: 1-781-933 | sr.acme.com | Enterprise<br>0000-0700, 1700-2400<br>M-F<br>0.25<br>SHQ, G.711 |
| * | 1-978 | sr3.acme.com | Faraway<br>0000-2400<br>U, S<br>0.10<br>SHQ, G.711 |

It should be noted that the Ext-TRIB and the local-TRIB are identical except for the last route (i.e., from: *, to: 1-978, sr3.acme.com) because the policies received from adjacent peers only enter the local-TRIB; they are propagated to all other local peers before any decision processing is applied. When all of the local TRIB entries have been sent to all of the local peers (within the same ITAD), the next step is to begin the process of exchanging foreign policies. The exchanging of foreign policies is similar to the flooding process, except that no sequence numbers are included, and each of the policies that survive the screening process are sent to the external peer, removing any attributes that are used locally. If the external SR has connected to SR 2000, the following "update" messages flow from sr.acme.com 2000 to the external SR with the address external.carrier.com 2003.

TRIP Update:
  Withdrawn: None
  Reachable: 1-781 [ ]
  Next Hop Server: sip:sr.acme.com
  AdvertisementPath: 2024
  RoutedPath: 2024
TRIP Update:
  Withdrawn: None
  Reachable: 1-781-933 [ ]
  Next Hop Server: sip:sr.acme.com
  AdvertisementPath: 2024
  RoutedPath: 2024
TRIP Update:
  Withdrawn: None
  Reachable: 1-978 [ ]
  Next Hop Server: sip:sr3.acme.com
  AdvertisementPath: 2024
  RoutedPath: 2024

There is one Adj-TRIB-Out for each external peer that contains the routes shared with that peer. It should be noted that because the IANA has not yet adopted the present extensions to TRIP, the from address and carrier attributes are excluded from the "update" messages. Furthermore, if the address family code of the policy's to address (URI) was 254 with the "tel:<number>" format, it would have to be converted to the POTS or routed number format before it could be added to the reachable route attribute. If the policy's to address contained an Internet address that was not of the "tel:<number>" format, the reachable route attribute could not be populated. If no reachable route attribute can be populated, the "update" message is not sent. During the version negotiation described in the prior TRIP specification, if it were detected that this peer is capable of these parameters, they would be sent as well.

When a carrier attribute is removed to send a policy to an external ITAD (which does not understand this attribute), the originating ITAD's SR undergoes additional processing to ensure that the permitted timeframes defined by this attribute are somehow communicated to its external peer. This processing involves advertising the policy to the external ITAD when the current time enters a carrier attribute defined timeframe or withdrawing the policy from that ITAD when the current time exits a carrier attribute defined timeframe.

With regard to the first "update" message above, the policy advertised to ITAD 2055 is reachable: 1-781, but the actual internal policy upon which that was based has a carrier entry (LastGen) that is only valid on Saturday (all day). Therefore, at 12:00 A.M. on Saturday, this policy would be advertised to ITAD 2055 and, at 12:00 A.M. on Sunday, this policy would be withdrawn. IANA approval of the carrier attribute would eliminate the need for this additional processing. Upon approval, there will have to be some way of distinguishing carriers defined in different ITADs that have the same name (e.g., by using the ITAD and carrier name to identify a carrier).

The advertisement path and routed path attributes are detailed in the TRIP "update" message below (they were omitted previously, since they are meaningless in local policy management). Basically, the advertisement path attribute identifies the ITADs through which routing information carried in an advertisement has passed, while the routed path attribute identifies the ITADs through which messages sent using this route would pass. Essentially, the ITADs in this path are a subset of those in the advertisement path.

Upon receipt of these policies, the external.carrier.com TRIP server can direct the network to send calls with matching addresses to the servers of sr.acme.com. In addition, policies from the external carrier will be sent to our SR, sr.acme.com. It is assumed that the SR receives the following "update" message:

TRIP Update:
   Withdrawn: None
   Reachable: 1
   Next Hop Server: sip:external.carrier.com
   AdvertisementPath: 2055
   RoutedPath: 2055

Processing this external or foreign policy comprises the following steps:

1. Adding the policy (in raw form) to the appropriate Ext-Adj-TRIB-In.
2. Scanning for circular references and/or references to the current SR 2000.
3. Comparing the information to the inbound policy screen and accepting or limiting the received policy, as required.
4. If accepted, adding all of the default parameters (e.g., default from address, carrier, time of day, day of week, cost, and QoS) to the policy, as specified, to add the local policy to the received routes. The carrier, time of day, day of week, cost, and QoS default parameters are only added if the default attributes of the policy are enabled.
5. Adding the policy to the Ext-TRIB of the SR 2000.
6. Sending the policy to all of the SR's 2000 current internal peers.

In the first step above, the policy (in raw form) is added to the Ext-Adj-TRIB-In for SR 2055:789 2003. Since there are no sequence numbers to detect duplicates, it is quite possible that the policy is already in the Ext-Adj-TRIB-In. The first step is to scan the Ext-Adj-TRIB-In to be certain there is no duplicate entry. All elements received from the external peer should be identical for this policy to be declared a duplicate. Any detected duplicates are discarded. Otherwise, the policy is added to the Ext-Adj-TRIB-In, as shown below:

Ext-Adj-TRIB-In for external.carrier.com (2055:789):

| From | To | Next Hop | Carrier | Advertisement Path | RoutedPath |
|---|---|---|---|---|---|
| * | 1 | external.carrier.com | (no carrier because inbound screen not yet applied) | 2055 | 2055 |

The advertisement path and routed path attributes, are also stored in the Ext-TRIB. The second step examines these attributes to detect circular paths; it looks for the presence of the present ITAD in the list, which would indicate that the route has looped. If a loop is detected, the route is removed from the Ext-TRIB. Other types of scanning could be performed to select the shortest path. If a shorter path to a particular ITAD is found, the advertisement path in the longer entry can be updated to be the shorter path. This update reduces the number of routing entries processed internally and has no effect on the routing policy.

In the third step, a review of the input-screening configuration for this SR is performed. The inbound policy screen data for ITAD 2055 is as follows:

Inbound Screen #1
   Creator: Cliff
   Date Added Oct. 1, 2000
   Activate Date/Time: 0
   Deactivate Date/Time: 0
   Allowed
   Partial To Address: *
   No. of Policy Attrs.: 1
   $1^{st}$ Policy Attribute
      Carrier: External
      Service State Enabled
      Time of Day: 0000-2400
      Day of Week: U-S
      Cost: 0.20
      QoS: SHQ, G.711

In processing the stored policies received against this inbound policy screen, the following tasks are preferably performed:

Perform a partial to address match. If there is no partial match, do not add the policy to the Ext-TRIB.

Check the allowed/denied parameter in the inbound policy. If the parameter is set to denied, do not add the policy to the Ext-TRIB.

If a non-null carrier, arriving with the policy, is not listed in the inbound screen attributes, do not add the policy to the Ext-TRIB.

If a from address is not present (which will usually be the case unless the external peer uses TRIP enhanced in the same fashion), set the from address in the policy to the from address in the inbound policy screen and, if a from address value is not present, set it to the wildcard indicator of *.

Fill in the activate date/time, deactivate date/time, and default attributes fields from the inbound policy if they are not already established in the received policy.

If the received policy does have some of these parameters, resolve to use the most restrictive (i.e., the latest activate date/time, the earliest deactivate date/time, the highest QoS, the most restrictive time of day/day of week parameters, and the highest cost.)

After the stored policy is reviewed against the inbound policy screen, with default settings (including the carrier attribute) and most restrictive processing, the policies are added to the Ext-TRIB.

Ext-TRIB:

| From | To | Next Hop | Carrier | Advertisement Path | RoutedPath |
|---|---|---|---|---|---|
| * | Tel: 1-781 | Group B | NextGen 0000-2400 S 0.10 SHQ, G.711 LastGen 0000-2400 U 0.15 SHQ, G.711 | | |

-continued

| From | To | Next Hop | Carrier | Advertisement Path | RoutedPath |
|---|---|---|---|---|---|
| * | Tel: 1-781 | Group A | NextGen 0000-0700, 1700-2400 M-F 0.20 SHQ, G.711 NextGen 0700-1700 M-F 0.30 SHQ, G.711 | | |
| * | Tel: 1-781-933 | Group C | Enterprise 0000-0700, 1700-2400 M-F 0.25 SHQ, G.711 | | |
| * | Acme.com | Group C | Enterprise 0000-2400 M-F 0.25 SHQ, G.711 | | |
| * | Tel: 1-617 | Group A + B | NextGen 0000-2400 U-S 0.10 SHQ, G.711 | | |
| * | 1 | external.carrier.com | External 0000-2400 U-S 0.20 SHQ, G.711 | 555 | 555 |

As each of these polices are added to the Ext-TRIB, it is also forwarded, via an "update" message, to each of the internal peers using the flooding mechanism with this SR replaced as the next hop. The local-TRIB, which is used by the TRIP LS on this SR to fill route queries made by SIP proxy servers, contains processed routes from external peers and from internal peers.

Local-TRIB:

| From | To | Next Hop | Carrier | Advertisement Path | Routed Path |
|---|---|---|---|---|---|
| * | tel: 1-781 | Group B | NextGen 0000-2400 S 0.10 SHQ, G.711 LastGen 0000-2400 U 0.15 SHQ, G.711 | | |
| * | tel: 1-781 | Group A | NextGen 0000-0700, 1700-2400 M-F 0.20 SHQ, G.711 NextGen 0700-1700 M-F 0.30 SHQ, G.711 | | |
| * | tel: 1-781-933 | Group C | Enterprise 0000-0700, 1700-2400 M-F 0.25 SHQ, G.711 | | |
| * | acme.com | Group C | Enterprise 0000-2400 M-F 0.25 SHQ, G.711 | | |

-continued

| From | To | Next Hop | Carrier | Advertisement Path | Routed Path |
|---|---|---|---|---|---|
| * | tel: 1-617 | Group A + B | NextGen 0000-2400 U-S 0.10 SHQ, G.711 | | |
| * | 1-978 | sr3.acme.com | Faraway 0000-2400 U, S 0.10 SHQ, G.711 | | |
| * | tel: 1-781 | Group B | NextGen 0000-2400 S 0.10 SHQ, G.711 LastGen 0000-2400 U 0.15 SHQ, G.711 | | |
| * | tel: 1-781 | Group A | NextGen 0000-0700, 1700-2400 M-F 0.20 SHQ, G.711 NextGen 0700-1700 M-F 0.30 SHQ, G.711 | | |
| * | tel: 1-781-933 | Group C | Enterprise 0000-0700, 1700-2400 M-F 0.25 SHQ, G.711 | | |
| * | acme.com | Group C | Enterprise 0000-2400 M-F 0.25 SHQ, G.711 | | |
| * | tel: 1-617 | Group A + B | NextGen 0000-2400 U-S 0.10 SHQ, G.711 | | |
| * | 1-978 | sr3.acme.com | Faraway 0000-2400 U, S 0.10 SHQ, G.711 | | |
| * | 1 | external.carrier.com | External 0000-2400 U-S 0.20 SHQ, G.711 | 555 | 555 |

If there are external peers, then the policy is added to the Adj-TRIB-Out of each external peer that did not originate from the external policy based on outbound screening criteria, as described above. In this example, because there is only one external ITAD, external ITAD 2055's policy from: *, to: 1, external.carrier.com is not added to the Adj-TRIB-Out for ITAD 2055.

Adj-TRIB-Out (2055:789):

| From | To | Next Hop | Carrier |
|---|---|---|---|
| * | tel: 1-781 | sr.acme.com | LastGen 0000-2400 U 0.15 SHQ, G.711 |
| * | tel: 1-781-933 | sr.acme.com | Enterprise 0000-0700, 1700-2400 M-F 0.25 SHQ, G.711 |
| * | 1-978 | sr3.acme.com | Faraway 0000-2400 U, S 0.10 SHQ, G.711 |

Two additional policy changes that may be included in the present system include a withdrawing a route policy and an adjacency communication error policy. The withdrawing a route policy change is identical to adding a route, except that the route is removed from service. The process of aggregation and the updating of peers occurs identically, as with the advertisement of new routes. An administrator can withdraw routes at any time.

The adjacency communication error policy change removes routes because a TRIP server was unable to communicate with a peer for a period long enough to declare the routes unavailable. This situation results in the removal of all routes utilizing or passing through the next hop server managed by this adjacent router.

The following provides a detailed description of the SIP proxy server and functionality. As previously shown in FIG. 6, a check is performed to see if the SIP proxy server is configured. The SIP proxy server is configured and enabled if the SR is to manage any communication sessions. The SIP proxy server is generally accepted as a standard in the industry.

The SIP proxy server receives SIP messages and processes them. Special processing that takes place that is related to the preferred embodiment of the invention is the mechanism for processing "invite" and "bye" messages based on the collected TRIB data. Additionally, further disclosure of a method and apparatus for controlling the flow of the subsequent RTP packets once the communication session is established, is provided. Another inventive feature is the implementation of statistical methods, which are enumerated in this disclosure for managing constrained routes, and other defined methods of intelligent routing and route-around behavior. Further, the following describes a method of managing clustered configurations of SIP proxy servers to minimize downtime, maximize scalability, and prevent route flapping during maintenance.

Figure 12A:
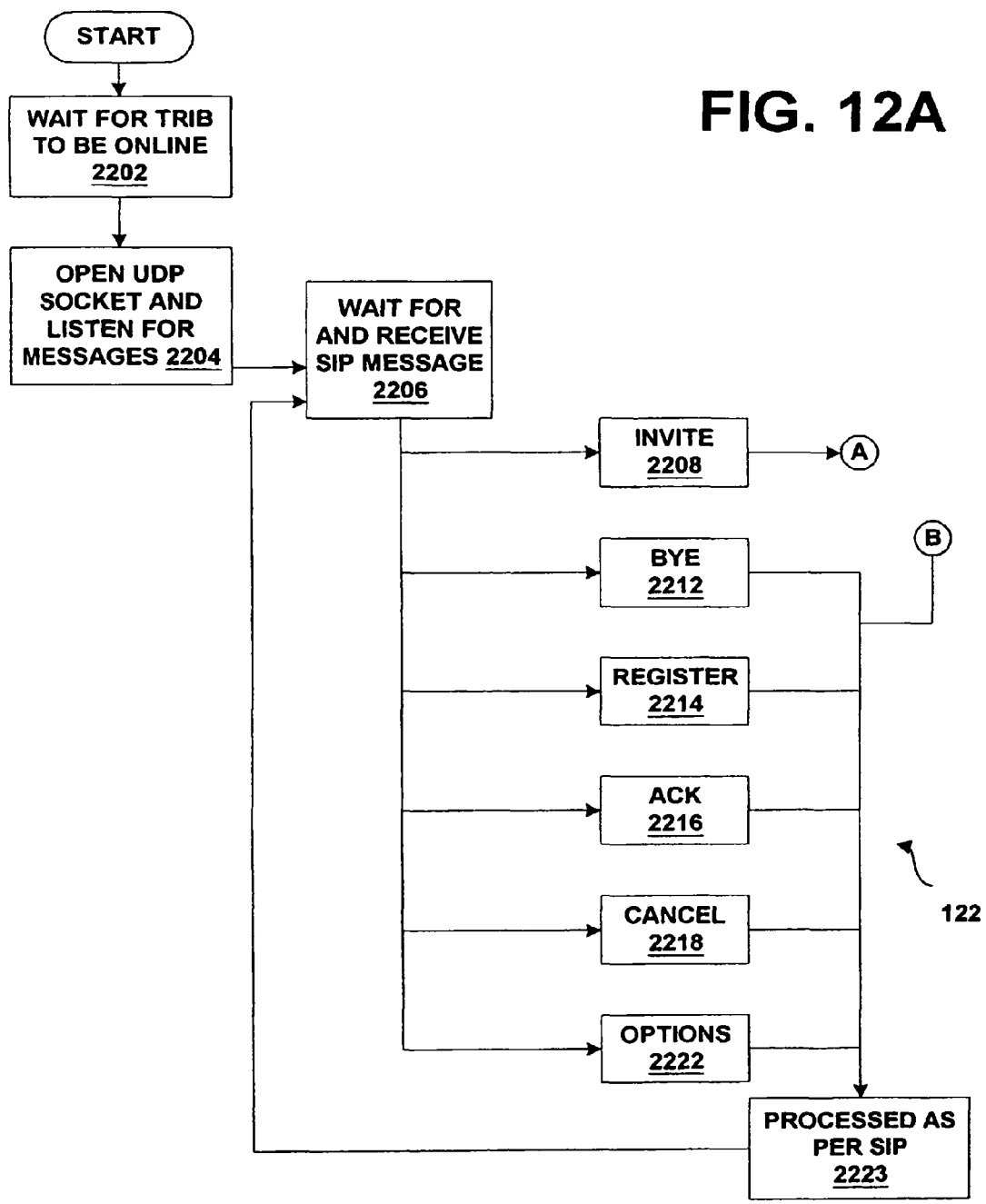
FIG. 12A is a flow chart that illustrates steps taken by a SIP proxy to analyze a SIP message.
Figure 12B:
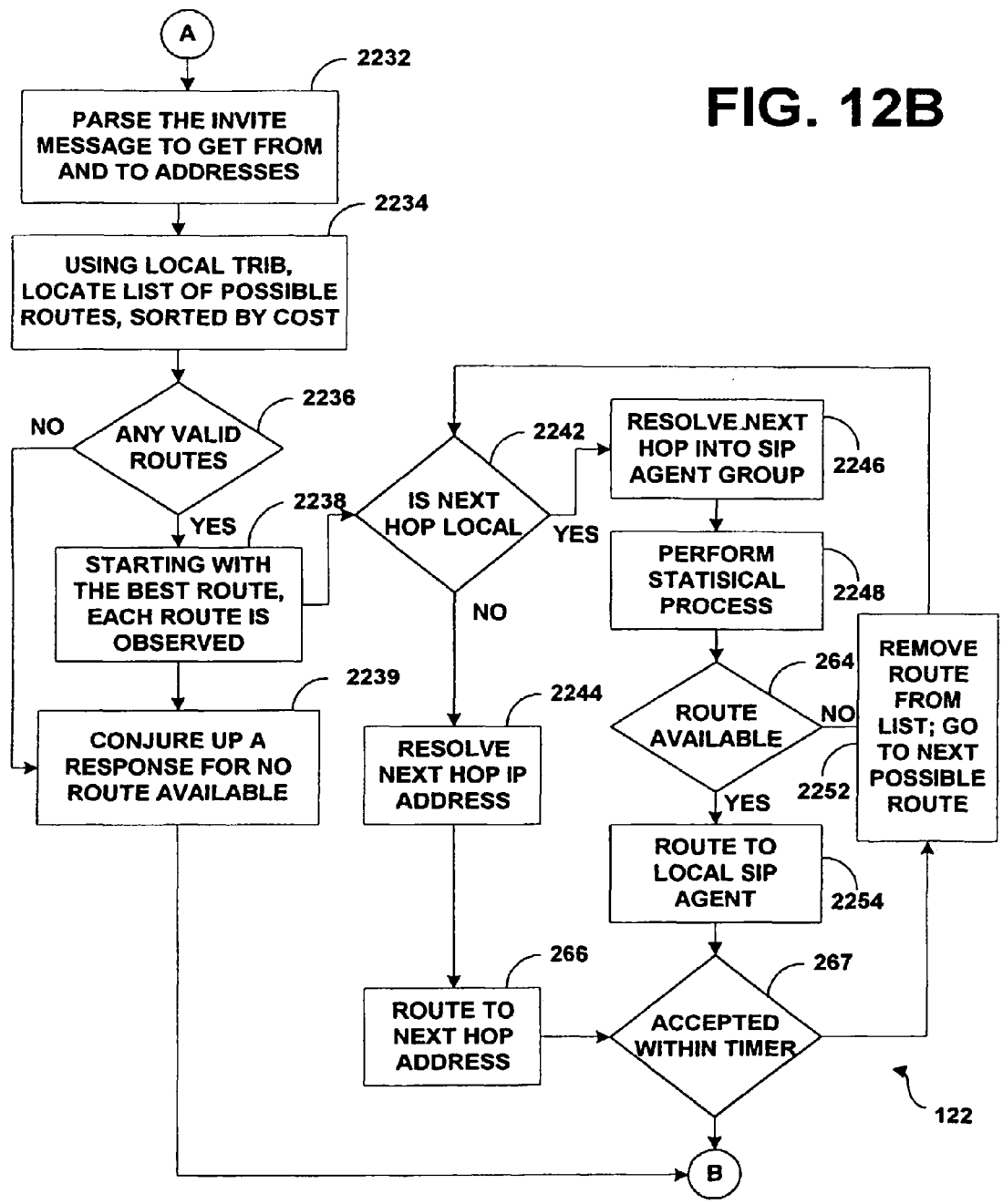
FIG. 12B is a flow chart that is a continuation of FIG. 11A.

FIGS. 12a and 12b are flowcharts that illustrate high-level processing steps used by the SIP proxy server contained within the SR. In accordance with the preferred embodiment of the invention, the SR waits for a fixed amount of time that is programmable via an end_of_startup_guard_time parameter (block 2202). Preferably, there is a default of sixty seconds, in case a fixed amount of time is not specified. This delay permits the TRIP LS to receive any routes that are being flooded from other internal peers that have not already been received.

As shown by block 2204, once the TRIBs have been received and processed, and the SR has waited for the amount of time specified, the SR's SIP proxy server opens its UDP socket and listens. Preferably, requests received before the SR is ready are returned with a response stating that service is unavailable. After the SR is ready, the SR begins listening for SIP messages to arrive 247 (block 2206).

Upon receipt of a SIP message, a branch is performed based on the type of SIP message received. The message types include "invite" (block 2208), "bye" (block 2212), "register" (block 2214), "ack" (block 2216), "cancel" (block 2218), and "options" (block 2222). As shown by block 2223, messages other than the "invite" message are processed in accordance with standard SIP. One of the major objectives of the present invention is to route SIP "invite" messages. The "invite" branch continues onto FIG. 12b. Referring to FIG. 12b, the next step is to parse the SIP "invite" message into all of its components that will be used for routing (block 2232). Specifically, the from address and the to address are extracted. Other information that may also be used in the selection of a route includes data from the SDP portion of the "invite" message, the type of media flow requested, the type of desired encoding, etc.

As shown by block 2234, a scan is then performed of the local-TRIB to find a list of acceptable routes. Acceptable routes may include those that meet the following criteria: routes with a partial from address match; routes with a partial to address match; routes that include either no carriers or routes that have at least one of the carriers with a valid time of day/day of week entry; and/or routes that meet the minimum required QoS. At this point, all of the possible routes that could be taken are obtained. The possible routes are then sorted in order of preference.

The sorting of the possible routes into a preferential order is based on the following set of rules:

1. The routes with the best or longest match in the from address field are sorted to the top. According to this rule, either an address-/URI-matching scheme that matches dot-separated domain names in reverse order or a partial telephone number match may be used to obtain the longest match. The following provides an example of this matching scheme.

If an "invite" from tel:1-617-246-1234 arrives and the configured policies include:
tel:1
tel:1-617
tel: 1-617-24
tel:1-617-247
the 1-617-24 would be the best and longest match.

For domain addresses, the best or longest match is based on equal domains (in reverse order).

Therefore, if an "invite" has a from indication that was sip:patrick@acmepacket.com and the configured policies include:
sip:com
sip:acme.com
sip:acmepacket.com
sip:sales.acmepacket.com
the sip:acmepacket.com address would be the best and longest match, since the base domain of "com" is equal and the next higher part of "acmepacket" is also equal.

If the from address is:
1-781-933-6166@acme.com
then acme.com is used to sort this from address.

If the from address of the "invite" message has a combination of an originating telephone number that has a partial match and a domain address that has a partial match, then the domain address match is preferably used for sorting purposes.

2. Within each set of routes with identical from address values, the routes with the best or longest match in the to address field are sorted. If the to address of the "invite" message has a combination of an originating telephone number that has a partial match and a domain address that has a partial match, then the domain address match will be used for sorting purposes.

3. Within routes with identical from address and to address field values, the routes are sorted by cost, from lowest to highest.

4. Within each set of routes with identical from address(es), to address(es), and cost(s), the routes that have this SR as the next hop server are sorted; these are the local routes that terminate at one of this SR's gateways. By always selecting local routes first, a potential ping-pong scenario is avoided in which two SRs would route a session request back and forth without ever trying to route the request locally.

5. Routes that are associated with SRs that have already been involved in processing the "invite" request are eliminated. This prevents an "invite" from being sent back to an SR that may have already forwarded it because local constraints were exceeded. Otherwise, another ping-pong scenario could occur in which the best-choice SR, which is overburdened, forwards the "invite" to another SR that does not know that it (i.e., the forwarding SR) is overburdened and, therefore, forwards it back, etc.

There is then a list of potential routes that are sorted in preferential order. Each route in this list is a valid route (block 2236), but some may offer different levels of quality or cost than others. As an example, consider the following list of possible routes resulting from a route search for a session originating at (from address) 1-781-933-6166, terminating at (to address) 1-617-555-1212, using carrier MCI, and being processed on sr4.1tad.com.

From: 1-781 To: 1 Next Hop: sr4.1tad.comMCI/U-S/0000-2400/$0.02/SHQ-G711

From: 1-78 To: 1-617 Next Hop: sr2.1tad.comMCI/U-S/0000-2400/$0.01/SHQ-G711

From: 1-78 To: 1-617 Next Hop: sr4.1tad.comMCI/U-S/0000-2400/$0.02/SHQ-G711

From: 1-78 To: 1-617 Next Hop: sr3.1tad.comMCI/U-S/0000-2400/$0.02/SHQ-G729

For example, if the hunt strategy is used and there are two or more SIP Agent(s) in the SIP agent group, the first SIP agent in the group should be completely filled to its constraint before hunting to the second SIP agent in the group. The constraints 416 (FIG. 3b) are defined as advisory limitations that are not necessarily tied to physical limitations, but are tied to configured limits based on network planning. For example, a gateway with 24 ports of capacity configured for one-way outbound calling might have an advisory constraint value of 24, while the same gateway configured for two-way calling might have an advisory constraint value of 12. The constraint is an integer limit of supportable sessions on this SIP agent.

To determine the number of sessions on a specific SIP agent, the SR must maintain statistics about how many sessions are established across a specific SIP agent; therefore, a data table must be kept within each SR.

TABLE 6

| | | | | | | | Date/ | Total |
| | | | | | Current | Burst | Time of | Sessions |
| | | | Number of | Number of | Sustained | Rate in | last No- | when No- |
| | | | Outbound | Inbound | Rate in | last 30 | Resource | Resource |
| SIP | Time to | | | | last 5 | | Available | Available |
| Agent | Resume | Last Use | Sessions | Sessions | minutes | seconds | Detected | Detected |
| --- | --- | --- | --- | --- | --- | --- | --- | --- |
| Gateway.acme.com | 0 | 2000/11/10 9:53 A.M. | 5 | 8 | 120 | 3 | 2000/01/01 10:00 A.M. | 19 |
| Gateway2.acme.com | 9:56 A.M. | 9:55 A.M. | 12 | 19 | 180 | 4 | 0 | 0 |

From: 1-78 To: 1 Next Hop: sr4.1tad.comMCI/U-S/0000-2400/$0.02/SHQ-G711

From: 1 To: 1-6 Next Hop: sr4.1tad.comMCI/U-S/0000-2400/$0.02/SHQ-G711

From: 1 To: 1 Next Hop: sr4.1tad.comMCI/U-S/0000-2400/$0.02/SHQ-G711

In accordance with the above list, the route that matched the from address (i.e., originating number) best in addition to having a partial match on the destination was sorted to the top. Note that the second and third entries in the above table have the same exact from address and to address, but have different next hop server(s); the local next hop server is sorted to the top of the list. Also note that if this session "invite" request had previously been at sr3.1tad.com, then the third entry in the table would have been discarded.

In the event that there are no routes available after the above sorting process, the session "invite" is returned to the originator with an indication that there is no route available. FIG. 12B depicts this scenario as blocks 2242 and 2244. If there are one or more routes left after the available routes are scanned, then the process is advanced to step 2238.

As shown by block 2238, starting with the best route (the order in which they have been sorted), each route is observed one at a time. Each route is analyzed to determine if the route is local (block 2242), which means that this SR is directly managing the SIP agent. If the next hop server has the SIP agent group in it, then the route is local and control transfers as shown by block 2246; otherwise, the route is remote and control transfers as shown by block 2244.

The above table provides statistics about the capacities of specific SIP agent(s). Note that the advisory constraint is used to skip a particular SIP agent. So, if any of the constraints are reached, the SIP agent is no longer considered until the constraint is no longer exceeded. Possible constraints were identified previously, but include combinations of the statistics in table 6. If there are no constraints configured and the first SIP agent in the SIP agent group returns an indication that there are no resources available, then the SIP agent group is disabled for a period of time. This period of time is programmable and is indicated in the table above within the time to resume column. The process of reviewing the statistics (in the table above) to determine if a route should be selected is depicted as block 2248 in FIG. 12b.

Figure 13A:
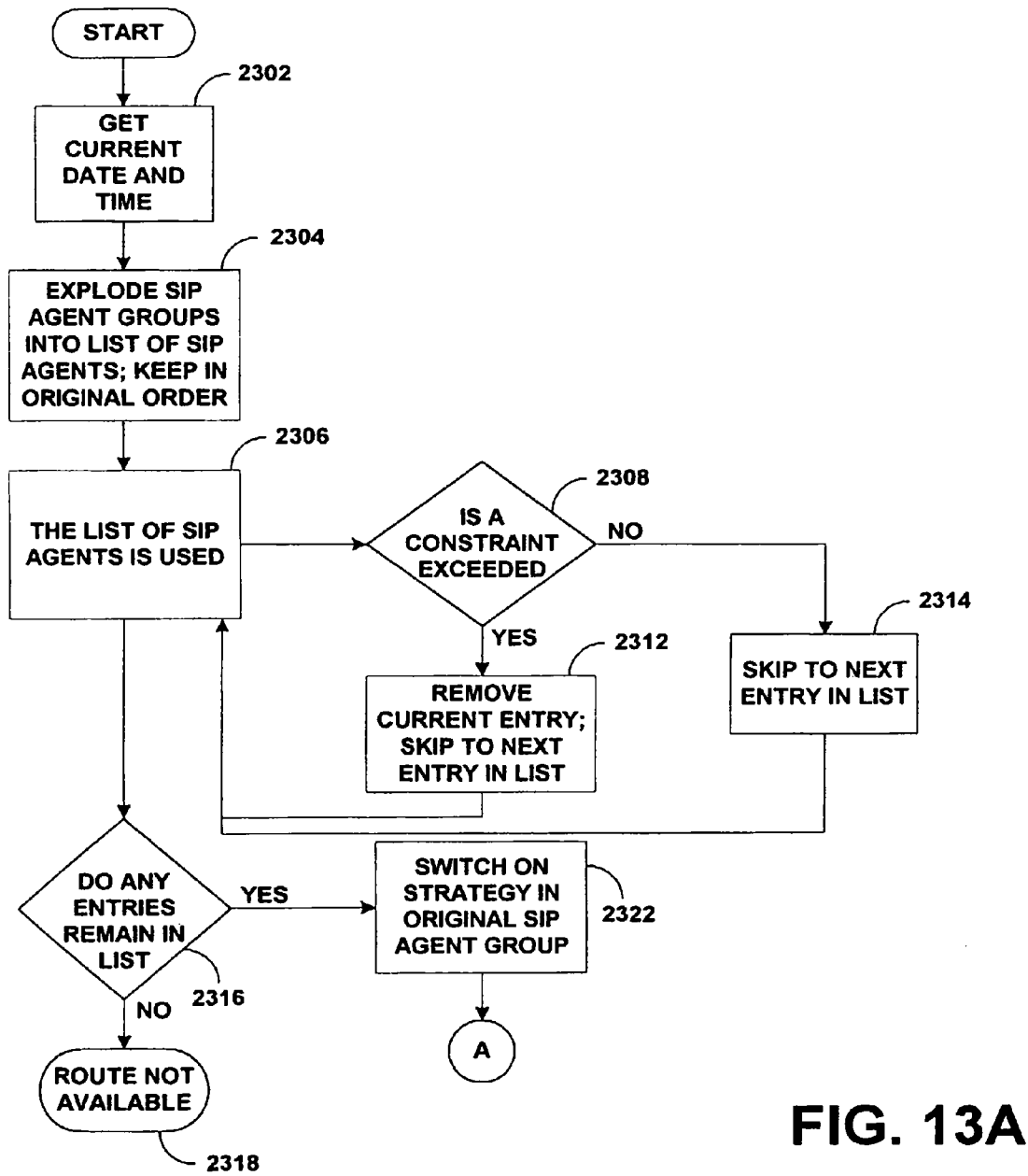
FIG. 13A is a flowchart that illustrates steps taken to determine a particular SIP agent within a group of SIP agents to forward a route.
Figure 13B:
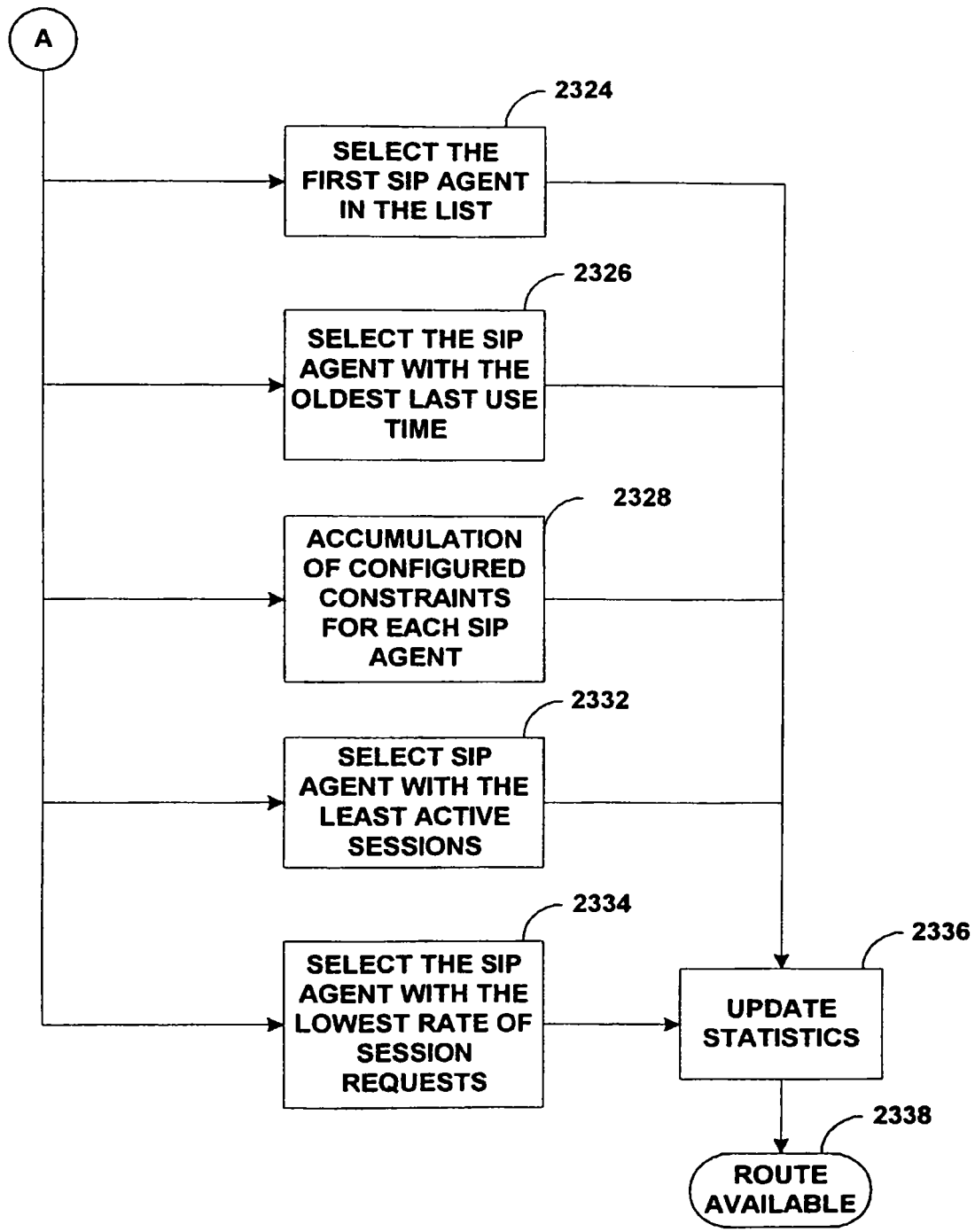
FIG. 13B is a flow chart that is a continuation of FIG. 13A.

FIGS. 13A and 13B are flowcharts that further illustrate an algorithm for determining a particular SIP agent within a group of SIP agents to forward a route, in accordance with the preferred embodiment of the invention. As shown by block 2302, the current date and time are obtained. The current time is employed for two separate uses. The first use of the current time is to compare it to the time to resume column in the session router data table for information regarding the inclusion or exclusion of a particular SIP agent. The second use of the current time is to stamp the last use column value in the session router data table for a particular SIP agent after that SIP agent has been selected. As shown by block 2304, the next step is to "explode" the SIP agent group into a fully resolved list of SIP agent(s). Each group contains either additional groups or SIP agent(s). This list of SIP agent(s) is preferably kept in the order in which the SIP agent(s) appear within the SIP agent group's agent lists. If a SIP agent is referenced in several groups, it is listed only once.

Example
- Group 1: Hunt
  1. Gateway 1
  2. Gateway 2
  3. Gateway 3
- Group 2: Proportional Distribution
  1. Gateway 1
  2. Gateway 2
- Group 3: Least Busy
  1. Group 1
  2. Group 2

In the above-listed theoretical groups, group one employs the hunt strategy and has three gateways; group two employs the proportional distribution (use oldest) strategy and has two gateways; and group three employs the least busy strategy and contains two groups. When fully resolving group three, the following would result in an explosion of the SIP agent group:

- Group 3: Least Busy
  1. Gateway 1
  2. Gateway 2
  3. Gateway 3

In the example above, gateway one and gateway two are not repeated. Note that only the initial SIP agent group strategy is used, no matter how much nesting of groups occurs. Given this, at the end of process performed in block 2304, there is a complete list of SIP agent group(s) (listed in the order in which the groups are referenced in the SIP agent group(s) that encapsulate them). As shown by block 2306, the list of SIP agent(s) is then used. For each SIP agent in the ordered list, a confirmation of the configured constraints is performed (block 2308). This confirmation includes verifying the following possible constraints: the time to resume value is later than or equal to the current time; the burst rate for the SIP agent exceeds or equals the limit established; the sustained session request rate for the SIP agent exceeds or equals the limit established; and the total session count exceeds or equals the session count limit established. It should be noted that there are other types of constraints that could be applied for each SIP agent. As an example, constraints such as maximum observed jitter, maximum observed latency, and round trip packet times could be used to set constraints that should be confirmed on each session setup.

If any constraint in the pool of possible constraints is reached, the current SIP agent is removed from the list of SIP agent(s) (block 2312). After the SIP agent is removed, the functionality of block 2306 is repeated to look at the next SIP agent, until such time as there are no more SIP agent(s) in the list. If the constraint is not exceeded, then the SIP agent remains on the list, and the process continues looking at the next SIP agent (block 2314). When all SIP agent(s) are verified for constraints, the result is a list of SIP agent(s) that do not exceed any of the established constraints. As shown by block 2316, a check is then performed to determine if there is at least one SIP agent that has passed the constraint checking. If all SIP agent(s) have failed the constraint test, control is transferred to block 2318, which states that the route is not available. Block 2318 relates to block 2252 in FIG. 12B. This scenario results in removal of the route and use of the next possible route 2252 (FIG. 12*b*). If a SIP agent remains on the list, control is transferred based upon the type of strategy in place (block 2322). If using the hunt strategy, then the first SIP agent is chosen, as shown in block 2324. If using the round robin strategy, then the SIP agent with the lowest or oldest last use time is selected (block 2326). For the proportional distribution strategy, each SIP agent has a configured constraint for maximum simultaneous sessions, which are accumulated to provide a maximum cumulative session (block 2328).

Example
- Gateway 1: 10-session limit; Cumulative Sessions: 10
- Gateway 2: 20-session limit; Cumulative Sessions: 30
- Gateway 3: 15-session limit; Cumulative Sessions: 45

In accordance with the above example, the above-described process continues, until all of the SIP agent(s) in the list have been added to the cumulative list. SIP agent(s) that appear more than once are counted as many times as they are present. The maximum cumulative session number is preferably the cumulative sessions attributed to the last SIP agent in the list. A random number between one and the maximum cumulative session number is chosen. In the example provided above, this is a random number from one to forty-five, with each possible number having equal probability. For one through ten, gateway one is chosen; for eleven through thirty, gateway two is chosen; and for thirty-one through forty-five, gateway three is chosen.

The above mentioned process provides a proportional distribution based on the number of configured sessions. This allows for a distribution of session requests that is proportional to the number of ports on each SIP agent. Block 2332 illustrates the least busy strategy, in which all of the SIP agent(s) in the list are reviewed for the SIP agent that has the lowest ratio of active sessions to total sessions allowed. The ratio is preferably determined by adding the inbound and outbound sessions and dividing the result by the total sessions allowed.

Block 2334 illustrates the lowest sustained rate strategy. In this strategy, all of the SIP agent(s) in the list are reviewed for the SIP agent that has the lowest sustained rate of sessions being established. As shown by block 2336, since a SIP agent has been selected to use based on a strategy, the statistics in the SIP agent are updated so that they reflect the SIP agent being chosen for the attempt. Specifically, the statistics may be as follows:

Time to Resume: No Change
Last Use: Set to Current Time
Number of Outbound Sessions: Incremented
Current Sustained Rate in last 5 minutes: Add to Sliding Window
Burst Rate in last 30 seconds: Add to Sliding Window
Date/Time of Last No Resource Available Detected: No Change
Total Sessions when No Resource Available Detected: No Change As shown by block 2338, after updating the statistics, control is transferred back to FIG. 12B wherein the available route is selected. Specifically, block 2338 relates to block 2254 of FIG. 12B wherein an available route was returned. As a result, a route is made to a local SIP agent block 2254 (FIG. 12B). The SIP proxy server forwards the "invite" message to the SIP proxy server associated with the SIP agent returned. It should be noted that the invite message may be transmitted via multiple SIP agents on a path to the SIP proxies on a linear path to the destination SIP agent.

When a "bye" message is received for a session that was previously established, the counters for active sessions are decremented. Through the use of route record capabilities, it is ensured that the "bye" message will be returned via the same linear path taken by the "invite" message.

In summary, the above disclosure teaches the ability to select multiple routes and process them in order, selecting from a set of SIP agent(s) that are otherwise equal using various distribution strategies. This process leads to managing the path of the resulting RTP flow.

Media Flow Routing

Now that selecting a path through a multi-domain network has been described, it is possible to guide the resulting real-time packet flows through certain thresholds, which is required to create a high-quality border between various IP networks. Without this mechanism, the packets would flow whichever way the networks would allow. There are several techniques for controlling the actual route that packets take. The most promising mechanism to use is multi-protocol label switching (MPLS).

One of the problems encountered by MPLS is that it is usually tied to the forward equivalence class (FEC) at network ingress points. As known in the art, the forward equivalence class (FEC) is a representation of a group of packets that share the same requirements for their transport. All packets in such a group are provided the same treatment en route to the destination. As opposed to conventional IP forwarding, in MPLS, the assignment of a particular packet to a particular FEC is done once, as the packet enters the network.

Many of the communications devices supported by the present system may be used for other purposes. For example, a computer could be used to make real-time session oriented communications, as well as 'surf' the Web. Unfortunately, it may not be clear in which cases the MPLS tags should be applied. The application-specific nature of tagging packets is therefore one of the many benefits of the present system. In addition, the system also provides solutions for non-MPLS-based networks.

Figure 14:
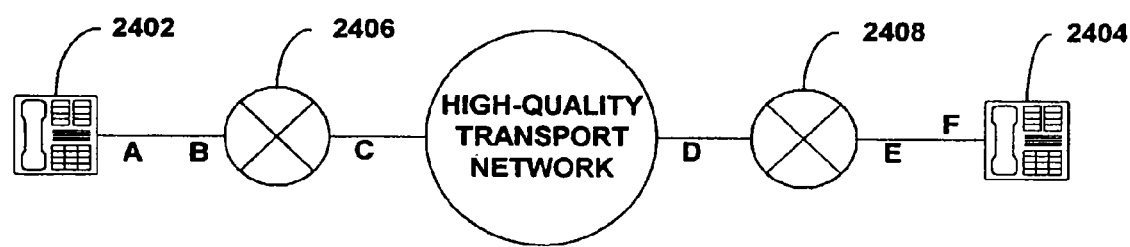
FIG. 14 is a block diagram illustrating how RTP flows are managed through the use of media routing in the SR of FIGS. 1 and 4.

To understand how the RTP flows can be managed, the ability to perform network address translations based on SIP-signaled session requests should also be understood. FIG. 14 is a block diagram illustrating how RTP flows are managed through the use of media routing in the SR. Media routing provides the equivalent of network address translations (NATs) and port address translations (PATs) based on SIP-signaled session requests. There is an end-to-end communication that goes through each SR. The selection of the SRs and gateways to use is performed in accordance with the disclosure provided herein above.

In order to route the media flows for sessions across a separate high-quality network, the SR is connected to two separate networks. One network communicates with the SIP proxy server, while the other network interface is connected to the high-quality transport network. Within the SR, a set of TCP/IP ports is configured that will be used for media flows. Preferably, there are sets of ports for each network. These ports are allocated to send and receive RTP media flows for sessions established through the SIP proxy server.

FIG. 14 illustrates the media flow between a first 2402 and second 2404 endpoint (i.e.: SIP phones), via respective SRs 2406, 2408 to direct the flow across a high-quality transport network. Note that there is preferably a SIP proxy server in each SR 2406, 2408. Labels A, B, C, D, E, and F represent the RTP ports used to send and receive RTP packets. These ports are TCP/IP ports that are defined by an IP address and port number. When an endpoint sends an "invite" message, the "invite" includes an SDP body that contains the RTP port of the originating endpoint 2402. The response to the "invite" from the destination endpoint will include an SDP body, which identifies the destination RTP port F.

If the endpoints communicated directly, there would be one RTP flow between the first endpoint 2402 and the second endpoint 2404. Packets preferably flow between the endpoints via normal IP routing (e.g., across the public Internet). When media routing is involved, there are three RTP flows: 1) between A and B; 2) between C and D; and 3) between E and F. Assuming the session originated at the first endpoint 2402, the SIP "invite" specifies the RTP port as A. When the SIP proxy server of the first SR 2406 processes the "invite," it allocates RTP ports B and C on the first SR 2406 for the media flow. The RTP port in the "invite" that is forwarded from the SIP proxy server of the first SR 2406 to SIP proxy server of the second SR 2408 is set to C. When the SIP proxy server of the second SR 2408 processes the "invite" request, RTP ports D and E are allocated on the second SR 2408. The "invite" that is forwarded from the SIP proxy server of the second SR 2408 and arrives at the second endpoint 2404 specifies the RTP port as E. The second endpoint 2404 indicates an RTP port of F in response to the "invite" message. The SIP proxy server of the second SR 2408 then passes the response back to the SIP proxy server of the first SR 2406 and changes the RTP port to D. The SIP proxy server of the first SR 2406 then passes the response back to the first endpoint 2402 and changes the RTP port to B. From the perspective of the first endpoint 2402, the flow is between A and B. However, from the perspective of second endpoint 2404, the flow is between E and F. Therefore, the endpoints 2402, 2404 are unaware that the SRs are involved.

It should be noted that the SRs monitor the RTP flows and measure the latency and jitter. They also detect when RTP flow stops and, as a result, notify the SIP proxy server, which, in turn, sends a "bye" message.

Clustering

By employing database servers, multiple SRs can share configuration and policy data. An SR can "subscribe" to specific sets of configuration and policy data in the database server. Network redundancy, reliability, and scalability can be achieved by clustering SRs that share the same local policy. Therefore, when multiple SRs are serving a set of SIP agent(s) (i.e., gateways), the loss of a single SR will not affect the routing capability of the network.

Figure 15:
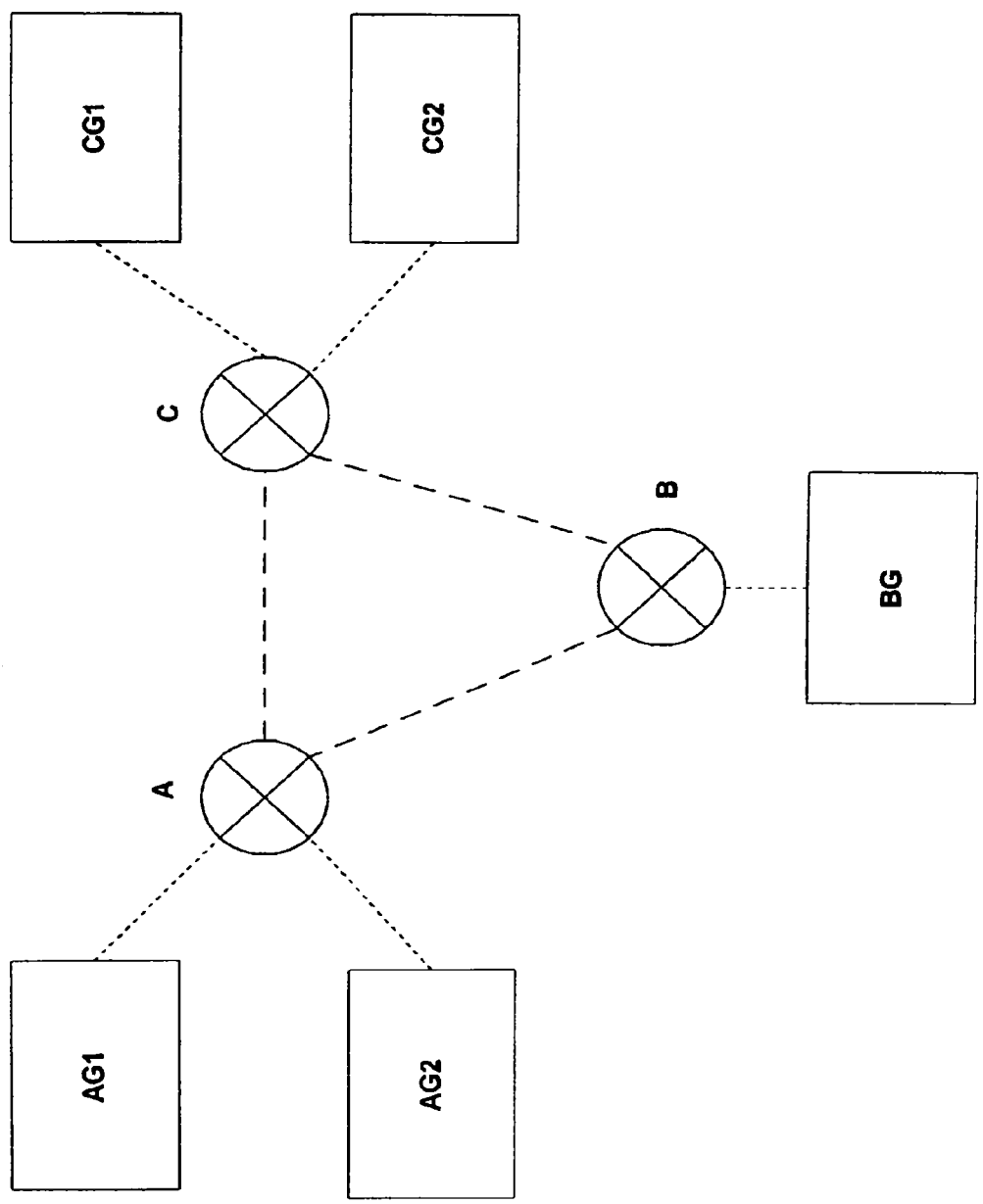
FIG. 15 is a block diagram that illustrates a network comprising singular session routers such as those illustrated by FIGS. 1 and 4.
Figure 16:
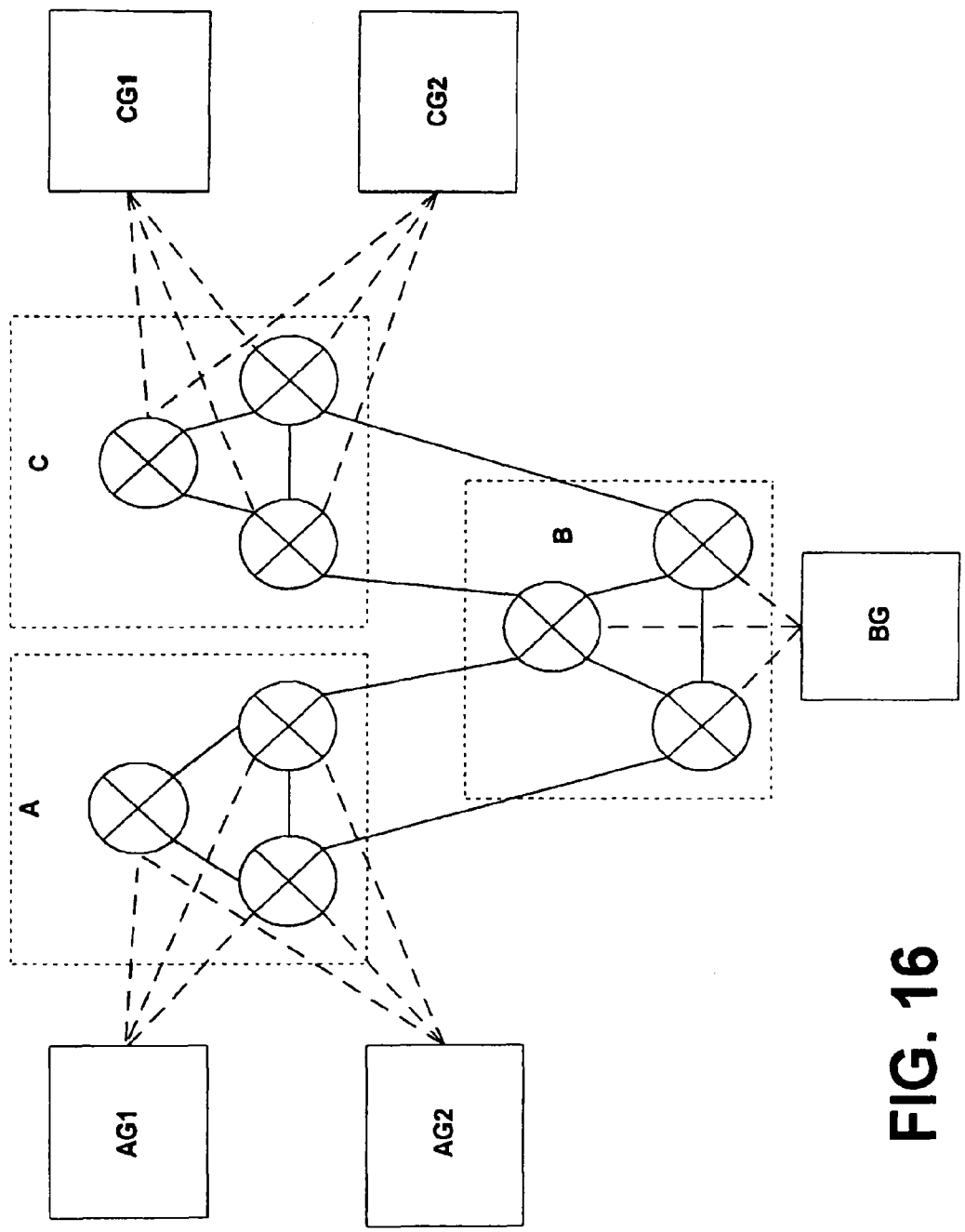
FIG. 16 is a block diagram that illustrates a network comprising clusters of routers such as those illustrated by FIGS. 1 and 4.

FIG. 15 is a block diagram that illustrates a network comprising singular SRs A, B, C. SR A is connected to gateways AG1 and AG2; SR B is connected to gateway BG; and SR C is connected to gateways CG1 and CG2. FIG. 16 is a block diagram that illustrates the same network using clusters of routers A, B, C. In FIG. 16, cluster A is connected to gateways AG1 and AG2; cluster B is connected to gateway BG; and cluster C is connected to gateways CG1 and CG2. In summary, in accordance with the illustrations provided, FIG. 15 comprises three SRs A, B, C and FIG. 16 comprises three clusters A, B, C of three SRs. It should be noted, however, that there is no limitation to the number of SRs in a network or in a cluster, instead FIGS. 15 and 16 are merely provided as examples.

The SRs in a cluster preferably share a database server (not shown by FIG. 16) where the policy for the cluster is stored. The SRs in a cluster are essentially identical, but still function as independent SRs within the SIP and TRIP framework. In accordance with FIG. 16, all three SRs are TRIP peers of each other, however, with four or more SRs in a cluster, there need only be enough TRIP connectivity so that there are at least two paths for route advertisements to flow within the cluster to ensure redundancy. It should be noted that there are two TRIP connections between each cluster so that there are two paths for route advertisements to flood the internal TRIP LSs.

The gateways and SRs in a cluster are preferably set up to use a method that is similar to DNS round robin so that the gateways have a singular domain address for the cluster. When a SIP proxy server receives a round robin request, it responds to the gateway with its specific address so that future requests for the session go to the appropriate SR.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method, performed in a session router, for routing call signaling messages, the method comprising:
   maintaining a telephony route information base (TRIB) stored in the session router as a result of participation of the session router in telephony routing over internet protocol (TRIP), the TRIB allowing multiple routes to the same destination;
   using the TRIB to route the received call signaling messages to another session router;
   receiving a signaling message that establishes a session between an originating endpoint and a terminating endpoint;
   responsive to the received signaling message:
   searching the TRIB for more than one route having a destination field matching the terminating endpoint in the received signaling message;
   comparing at least one attribute of each matching TRIB route with a field in the received signaling message to determine a degree of match for the attribute;
   selecting, based at least on the comparison, one of the matching TRIB routes; and
   forwarding the signaling message to a second session router identified by a next hop attribute in the selected TRIB route;
   wherein the signaling message comprises a session-layer header containing a From: field corresponding to the originating endpoint and a To: field corresponding to the terminating endpoint and the forwarding further comprises:
      replacing the To: field in the session-layer header of the signaling message with the next hop attribute in the selected TRIB route; and
      transmitting the signaling message to the another session router; and
   wherein the signaling message comprises a session description containing a connection field corresponding to the originating endpoint and the forwarding further comprises:
      replacing the connection field in the session description of the signaling message with a next hop attribute from the selected TRIB route.

2. The method of claim 1, further comprising:
   sorting the matching TRIB routes by the degree of match; and
   selecting the matching TRIB route with the highest degree of match.

3. The method of claim 2, wherein the comparing further comprises comparing a From: field in the signaling message with a corresponding attribute in each matching TRIB route, and the sorting further comprises sorting the matching TRIB routes so that the longest match on the From: field is ranked highest.

4. The method of claim 3, wherein the comparing further comprises comparing a To: field in the signaling message with a corresponding attribute in each matching TRIB route, and the sorting further comprises sorting the matching TRIB routes so that the longest match on the To: field is ranked highest if more than one matching TRIB route has the same From: field.

5. The method of claim 4, wherein the sorting further comprises:
   sorting the matching TRIB routes so that the matching TRIB route with a lowest cost is ranked highest if more than one matching TRIB route has the same To: field.

6. The method of claim 1, wherein the signaling message comprises a network-layer header containing a source address field corresponding to the originating endpoint and a destination address field corresponding to the terminating endpoint and the forwarding further comprises:
   replacing the destination address field in the network-layer header of the signaling message with a next hop attribute from the selected TRIB route.

7. The method of claim 1, wherein the signaling message comprises a session-layer header containing a From: field corresponding to the originating endpoint and a To: field corresponding to the terminating endpoint, the method further comprising:
   replacing the From: field in the session-layer header of the signaling message with an address of the session router.

8. The method of claim 1, wherein the signaling message comprises a network-layer header containing a source address field corresponding to the originating endpoint and a destination address field corresponding to the terminating endpoint, the method further comprising:
   replacing the destination address field in the network-layer header of the signaling message with an address of the session router.

* * * * *